US011722513B2

(12) United States Patent
Jakobsson et al.

(10) Patent No.: US 11,722,513 B2
(45) Date of Patent: *Aug. 8, 2023

(54) USING A MEASURE OF INFLUENCE OF SENDER IN DETERMINING A SECURITY RISK ASSOCIATED WITH AN ELECTRONIC MESSAGE

(71) Applicant: Agari Data, Inc., San Mateo, CA (US)

(72) Inventors: Bjorn Markus Jakobsson, Portola Valley, CA (US); Siobhán McNamara, Mountain View, CA (US); Patrick Richard Peterson, San Francisco, CA (US); Jacob Rudee Rideout, Raleigh, NC (US)

(73) Assignee: AGARI DATA, INC., San Mateo, CA (US)

( * ) Notice: Subject to any disclaimer, the term of this patent is extended or adjusted under 35 U.S.C. 154(b) by 223 days.

This patent is subject to a terminal disclaimer.

(21) Appl. No.: 17/317,468

(22) Filed: May 11, 2021

(65) Prior Publication Data

US 2022/0014543 A1 Jan. 13, 2022

Related U.S. Application Data

(63) Continuation of application No. 16/219,284, filed on Dec. 13, 2018, now Pat. No. 11,044,267, which is a
(Continued)

(51) Int. Cl.
*H04L 29/06* (2006.01)
*H04L 9/40* (2022.01)
*H04L 51/00* (2022.01)

(52) U.S. Cl.
CPC ........ *H04L 63/1433* (2013.01); *H04L 63/123* (2013.01); *H04L 63/1483* (2013.01); *H04L 51/00* (2013.01); *H04L 2463/121* (2013.01)

(58) Field of Classification Search
CPC ............ H04L 63/1433; H04L 63/1425; H04L 9/3202; H04L 63/20; H04L 63/123; H04L 63/126
(Continued)

(56) References Cited

U.S. PATENT DOCUMENTS

| 6,073,142 A | 6/2000 | Geiger et al. |
| 6,161,130 A | 12/2000 | Horvitz et al. |

(Continued)

FOREIGN PATENT DOCUMENTS

| JP | 2011100489 A | 5/2011 |
| WO | 2018213457 A1 | 11/2018 |

OTHER PUBLICATIONS

A. Whitten and J. D. Tygar. Why Johnny Can't Encrypt: A Usability Evaluation of PGP 5.0. In Proceedings of the 8th Conference on USENIX Security Symposium—vol. 8, SSYM'99, Berkeley, CA, USA, 1999. USENIX Association.

(Continued)

*Primary Examiner* — Longbit Chai
(74) *Attorney, Agent, or Firm* — Fredrikson & Byron, P.A.

(57) ABSTRACT

A measure of influence of a sender entity is determined for a message receiving entity based at least in part on an analysis of previous electronic messages sent by the sender entity. An electronic message associated with the sender entity is received. The measure of influence of the sender entity is utilized to determine a security risk associated with the received electronic message.

20 Claims, 21 Drawing Sheets

Related U.S. Application Data continuation-in-part of application No. 15/823,196, filed on Nov. 27, 2017, now Pat. No. 10,715,543.

(60) Provisional application No. 62/599,475, filed on Dec. 15, 2017, provisional application No. 62/490,309, filed on Apr. 26, 2017, provisional application No. 62/428,328, filed on Nov. 30, 2016.

(58) Field of Classification Search
USPC ........................................................ 726/25
See application file for complete search history.

(56) References Cited

U.S. PATENT DOCUMENTS

| | | | |
|---|---|---|---|
| 6,574,658 B1 | 6/2003 | Gabber et al. |
| 6,721,784 B1 | 4/2004 | Leonard et al. |
| 7,194,618 B1 | 3/2007 | Suominen |
| 7,293,063 B1 | 11/2007 | Sobel |
| 7,299,261 B1 | 11/2007 | Oliver et al. |
| 7,464,408 B1 | 12/2008 | Shah et al. |
| 7,631,193 B1 | 12/2009 | Hoffman |
| 7,644,274 B1 | 1/2010 | Jakobsson et al. |
| 7,668,951 B2 | 2/2010 | Lund et al. |
| 7,748,038 B2 | 6/2010 | Olivier et al. |
| 7,797,752 B1 | 9/2010 | Vaidya et al. |
| 7,809,795 B1 | 10/2010 | Cooley et al. |
| 7,809,796 B1 | 10/2010 | Bloch et al. |
| 7,814,545 B2 | 10/2010 | Oliver et al. |
| 7,831,522 B1 | 11/2010 | Satish et al. |
| 7,854,007 B2 | 12/2010 | Sprosts et al. |
| 7,890,358 B2 | 2/2011 | Dutta et al. |
| 7,899,213 B2 | 3/2011 | Otsuka et al. |
| 7,899,866 B1 | 3/2011 | Buckingham et al. |
| 7,917,655 B1 | 3/2011 | Coomer et al. |
| 7,941,842 B2 | 5/2011 | Prince |
| 8,010,614 B1 | 8/2011 | Musat et al. |
| 8,131,655 B1 | 3/2012 | Cosoi et al. |
| 8,214,490 B1 | 7/2012 | Vos et al. |
| 8,230,505 B1 | 7/2012 | Ahrens et al. |
| 8,255,572 B1 | 8/2012 | Coomer |
| 8,365,258 B2 | 1/2013 | Dispensa |
| 8,489,689 B1 | 7/2013 | Sharma et al. |
| 8,560,962 B2 | 10/2013 | Wang et al. |
| 8,566,938 B1 | 10/2013 | Prakash et al. |
| 8,572,184 B1 | 10/2013 | Cosoi |
| 8,583,915 B1 | 11/2013 | Huang |
| 8,667,069 B1 | 3/2014 | Connelly et al. |
| 8,667,074 B1 | 3/2014 | Farkas |
| 8,667,581 B2 | 3/2014 | Steeves et al. |
| 8,676,155 B2 | 3/2014 | Fan et al. |
| 8,719,940 B1 | 5/2014 | Higbee et al. |
| 8,752,172 B1 | 6/2014 | Dotan et al. |
| 8,769,684 B2 | 7/2014 | Stolfo et al. |
| 8,813,228 B2 | 8/2014 | Magee et al. |
| 8,832,202 B2 | 9/2014 | Yoshioka |
| 8,880,604 B2 | 11/2014 | Chen et al. |
| 8,904,524 B1 | 12/2014 | Hodgman |
| 8,931,041 B1 | 1/2015 | Banerjee |
| 8,949,353 B1 | 2/2015 | Beguin |
| 8,959,163 B1 | 2/2015 | Ledet |
| 8,984,640 B1 | 3/2015 | Emigh et al. |
| 8,996,042 B1 | 3/2015 | Hannigan |
| 9,009,824 B1 | 4/2015 | Chen et al. |
| 9,009,829 B2 | 4/2015 | Stolfo et al. |
| 9,027,134 B2 | 5/2015 | Foster et al. |
| 9,060,057 B1 | 6/2015 | Danis |
| 9,118,653 B2 | 8/2015 | Nimashakavi et al. |
| 9,154,514 B1 | 10/2015 | Prakash |
| 9,203,791 B1 | 12/2015 | Olomskiy |
| 9,245,115 B1 | 1/2016 | Jakobsson |
| 9,258,314 B1 | 2/2016 | Xiao et al. |
| 9,277,049 B1 | 3/2016 | Danis |
| 9,332,022 B1 | 5/2016 | Ashley |
| 9,338,026 B2 | 5/2016 | Bandini et al. |
| 9,338,287 B1 | 5/2016 | Russo |
| 9,471,714 B2 | 10/2016 | Iwasaki et al. |
| 9,473,437 B1 | 10/2016 | Jakobsson |
| 9,491,155 B1 | 11/2016 | Johansson et al. |
| 9,501,639 B2 | 11/2016 | Stolfo et al. |
| 9,560,506 B2 | 1/2017 | Gudlavenkatasiva et al. |
| 9,602,508 B1 | 3/2017 | Mahaffey et al. |
| 9,613,341 B2 | 4/2017 | Shivakumar |
| 9,654,492 B2 | 5/2017 | Maylor et al. |
| 9,747,455 B1 | 8/2017 | Mcclintock et al. |
| 9,781,149 B1 | 10/2017 | Himler et al. |
| 9,800,589 B1 | 10/2017 | Asveren et al. |
| 9,847,973 B1 | 12/2017 | Jakobsson et al. |
| 9,906,554 B2 | 2/2018 | Higbee et al. |
| 9,910,984 B2 | 3/2018 | Valencia et al. |
| 9,940,482 B1 | 4/2018 | Nichols et al. |
| 10,122,715 B2 | 11/2018 | Dispensa |
| 10,129,194 B1 | 11/2018 | Jakobsson |
| 10,277,628 B1 | 4/2019 | Jakobsson |
| 10,694,029 B1 | 6/2020 | Jakobsson |
| 10,805,270 B2 | 10/2020 | Jakobsson et al. |
| 11,140,171 B1 | 10/2021 | Friedman et al. |
| 2002/0138271 A1 | 9/2002 | Shaw |
| 2002/0184315 A1 | 12/2002 | Earnest |
| 2003/0009694 A1 | 1/2003 | Wenocur et al. |
| 2003/0023736 A1 | 1/2003 | Abkemeier |
| 2003/0200108 A1 | 10/2003 | Malnoe |
| 2003/0225850 A1 | 12/2003 | Teague |
| 2003/0229672 A1 | 12/2003 | Kohn |
| 2003/0236845 A1 | 12/2003 | Pitsos |
| 2004/0073617 A1 | 4/2004 | Milliken et al. |
| 2004/0148358 A1 | 7/2004 | Singh et al. |
| 2004/0176072 A1 | 9/2004 | Gellens |
| 2004/0177120 A1 | 9/2004 | Kirsch |
| 2004/0203589 A1 | 10/2004 | Wang et al. |
| 2004/0215977 A1 | 10/2004 | Goodman et al. |
| 2005/0021649 A1 | 1/2005 | Goodman et al. |
| 2005/0033810 A1 | 2/2005 | Malcolm |
| 2005/0060643 A1 | 3/2005 | Glass et al. |
| 2005/0076084 A1 | 4/2005 | Loughmiller et al. |
| 2005/0076240 A1 | 4/2005 | Appleman |
| 2005/0080857 A1 | 4/2005 | Kirsch et al. |
| 2005/0091320 A1 | 4/2005 | Kirsch et al. |
| 2005/0097320 A1 | 5/2005 | Golan et al. |
| 2005/0182735 A1 | 8/2005 | Zager et al. |
| 2005/0188023 A1 | 8/2005 | Doan et al. |
| 2005/0188045 A1 | 8/2005 | Katsikas |
| 2005/0198173 A1 | 9/2005 | Evans |
| 2005/0216587 A1 | 9/2005 | John |
| 2005/0223076 A1 | 10/2005 | Barrus et al. |
| 2005/0235065 A1 | 10/2005 | Le et al. |
| 2005/0257261 A1 | 11/2005 | Shraim et al. |
| 2005/0283837 A1 | 12/2005 | Olivier et al. |
| 2006/0004772 A1 | 1/2006 | Hagan et al. |
| 2006/0015563 A1 | 1/2006 | Judge et al. |
| 2006/0018466 A1 | 1/2006 | Adelstein et al. |
| 2006/0026242 A1 | 2/2006 | Kuhlmann et al. |
| 2006/0031306 A1 | 2/2006 | Haverkos |
| 2006/0037075 A1 | 2/2006 | Frattura et al. |
| 2006/0053279 A1 | 3/2006 | Coueignoux |
| 2006/0053490 A1 | 3/2006 | Herz et al. |
| 2006/0085505 A1 | 4/2006 | Gillum et al. |
| 2006/0101334 A1 | 5/2006 | Liao et al. |
| 2006/0107323 A1 | 5/2006 | Mclean |
| 2006/0149821 A1 | 7/2006 | Rajan et al. |
| 2006/0153380 A1 | 7/2006 | Gertner |
| 2006/0161989 A1 | 7/2006 | Reshef et al. |
| 2006/0168024 A1 | 7/2006 | Mehr et al. |
| 2006/0168066 A1 | 7/2006 | Helsper et al. |
| 2006/0168329 A1 | 7/2006 | Tan et al. |
| 2006/0195542 A1 | 8/2006 | Nandhra |
| 2006/0206713 A1 | 9/2006 | Hickman et al. |
| 2006/0224677 A1 | 10/2006 | Ishikawa et al. |
| 2006/0230461 A1 | 10/2006 | Hauser |
| 2006/0253597 A1 | 11/2006 | Mujica |
| 2006/0259558 A1 | 11/2006 | Yen |
| 2006/0265498 A1 | 11/2006 | Turgeman et al. |
| 2006/0277259 A1 | 12/2006 | Murphy et al. |
| 2006/0282660 A1 | 12/2006 | Varghese et al. |

(56) References Cited

U.S. PATENT DOCUMENTS

| | | |
|---|---|---|
| 2007/0019235 A1 | 1/2007 | Lee |
| 2007/0027992 A1 | 2/2007 | Judge et al. |
| 2007/0035390 A1 | 2/2007 | Thomas et al. |
| 2007/0038718 A1 | 2/2007 | Khoo et al. |
| 2007/0067465 A1 | 3/2007 | Blinn et al. |
| 2007/0078936 A1 | 4/2007 | Quinlan et al. |
| 2007/0079379 A1 | 4/2007 | Sprosts et al. |
| 2007/0086592 A1 | 4/2007 | Ellison et al. |
| 2007/0100944 A1 | 5/2007 | Ford et al. |
| 2007/0101423 A1 | 5/2007 | Oliver et al. |
| 2007/0107053 A1 | 5/2007 | Shraim et al. |
| 2007/0130618 A1 | 6/2007 | Chen |
| 2007/0136573 A1 | 6/2007 | Steinberg |
| 2007/0136806 A1 | 6/2007 | Berman |
| 2007/0143407 A1 | 6/2007 | Avritch et al. |
| 2007/0143432 A1 | 6/2007 | Klos et al. |
| 2007/0162742 A1 | 7/2007 | Song et al. |
| 2007/0192169 A1 | 8/2007 | Herbrich et al. |
| 2007/0198642 A1 | 8/2007 | Malik |
| 2007/0208850 A1 | 9/2007 | Lin et al. |
| 2007/0214495 A1 | 9/2007 | Royer et al. |
| 2007/0239639 A1 | 10/2007 | Loughmiller et al. |
| 2007/0271343 A1 | 11/2007 | George et al. |
| 2007/0276907 A1 | 11/2007 | Maes |
| 2007/0289018 A1 | 12/2007 | Steeves et al. |
| 2007/0299916 A1 | 12/2007 | Bates et al. |
| 2008/0004049 A1 | 1/2008 | Yigang et al. |
| 2008/0022013 A1 | 1/2008 | Adelman et al. |
| 2008/0022107 A1 | 1/2008 | Pickles et al. |
| 2008/0046970 A1 | 2/2008 | Oliver et al. |
| 2008/0050014 A1 | 2/2008 | Bradski et al. |
| 2008/0098237 A1 | 4/2008 | Dung et al. |
| 2008/0104180 A1 | 5/2008 | Gabe |
| 2008/0104235 A1 | 5/2008 | Oliver et al. |
| 2008/0141374 A1 | 6/2008 | Sidiroglou et al. |
| 2008/0175266 A1 | 7/2008 | Alperovitch et al. |
| 2008/0178288 A1 | 7/2008 | Alperovitch et al. |
| 2008/0235794 A1 | 9/2008 | Bogner |
| 2008/0276315 A1 | 11/2008 | Shuster |
| 2008/0290154 A1 | 11/2008 | Barnhardt et al. |
| 2009/0037350 A1 | 2/2009 | Rudat |
| 2009/0064330 A1 | 3/2009 | Shraim et al. |
| 2009/0089859 A1 | 4/2009 | Cook et al. |
| 2009/0157708 A1 | 6/2009 | Bandini et al. |
| 2009/0210708 A1 | 8/2009 | Chou |
| 2009/0228583 A1 | 9/2009 | Pocklington et al. |
| 2009/0252159 A1 | 10/2009 | Lawson et al. |
| 2009/0260064 A1 | 10/2009 | Mcdowell et al. |
| 2009/0292781 A1 | 11/2009 | Teng et al. |
| 2009/0319629 A1 | 12/2009 | De Guerre et al. |
| 2010/0005191 A1 | 1/2010 | Drako et al. |
| 2010/0030798 A1 | 2/2010 | Kumar et al. |
| 2010/0043071 A1 | 2/2010 | Wang |
| 2010/0054443 A1 | 3/2010 | Bhattiprolu et al. |
| 2010/0070761 A1 | 3/2010 | Gustave et al. |
| 2010/0077483 A1 | 3/2010 | Stolfo et al. |
| 2010/0082758 A1 | 4/2010 | Golan |
| 2010/0094887 A1 | 4/2010 | Ye et al. |
| 2010/0095374 A1 | 4/2010 | Gillum et al. |
| 2010/0115040 A1 | 5/2010 | Sargent et al. |
| 2010/0145900 A1 | 6/2010 | Zheng et al. |
| 2010/0198928 A1 | 8/2010 | Almeida |
| 2010/0235636 A1 | 9/2010 | Cohen |
| 2010/0257222 A1 | 10/2010 | Hamilton, II et al. |
| 2010/0287246 A1 | 11/2010 | Klos et al. |
| 2010/0293382 A1 | 11/2010 | Hammad |
| 2010/0299399 A1 | 11/2010 | Wanser et al. |
| 2010/0313253 A1 | 12/2010 | Reiss |
| 2011/0061089 A1 | 3/2011 | O'Sullivan et al. |
| 2011/0066687 A1 | 3/2011 | Chen et al. |
| 2011/0087485 A1 | 4/2011 | Maude et al. |
| 2011/0145152 A1 | 6/2011 | Mccown |
| 2011/0191688 A1 | 8/2011 | Hasegawa et al. |
| 2011/0191847 A1 | 8/2011 | Davis et al. |
| 2011/0214187 A1 | 9/2011 | Wittenstein et al. |
| 2011/0271349 A1 | 11/2011 | Kaplan |
| 2011/0294478 A1 | 12/2011 | Trivi et al. |
| 2012/0030293 A1 | 2/2012 | Bobotek |
| 2012/0084866 A1 | 4/2012 | Stolfo |
| 2012/0102566 A1 | 4/2012 | Vrancken et al. |
| 2012/0136780 A1 | 5/2012 | El-Awady et al. |
| 2012/0167233 A1 | 6/2012 | Gillum |
| 2012/0191615 A1 | 7/2012 | Schibuk |
| 2012/0192258 A1 | 7/2012 | Spencer et al. |
| 2012/0204032 A1 | 8/2012 | Wilkins et al. |
| 2012/0204221 A1 | 8/2012 | Monjas Llorente et al. |
| 2012/0227104 A1 | 9/2012 | Sinha et al. |
| 2012/0242488 A1 | 9/2012 | Wilson |
| 2012/0246725 A1 | 9/2012 | Osipkov |
| 2012/0253810 A1 | 10/2012 | Sutton et al. |
| 2012/0278694 A1 | 11/2012 | Washio |
| 2012/0311703 A1 | 12/2012 | Yanovsky et al. |
| 2013/0036455 A1 | 2/2013 | Bodi et al. |
| 2013/0060905 A1 | 3/2013 | Mickens et al. |
| 2013/0067012 A1 | 3/2013 | Matzkel et al. |
| 2013/0081142 A1 | 3/2013 | Mcdougal et al. |
| 2013/0083129 A1 | 4/2013 | Thompson et al. |
| 2013/0086645 A1 | 4/2013 | Srinivasan et al. |
| 2013/0104198 A1 | 4/2013 | Grim |
| 2013/0128883 A1 | 5/2013 | Lawson et al. |
| 2013/0173712 A1 | 7/2013 | Monjas Llorente et al. |
| 2013/0185775 A1 | 7/2013 | Dispensa |
| 2013/0263226 A1 | 10/2013 | Sudia |
| 2013/0305318 A1 | 11/2013 | Deluca et al. |
| 2013/0318580 A1 | 11/2013 | Gudlavenkatasiva et al. |
| 2013/0340079 A1 | 12/2013 | Gottlieb et al. |
| 2013/0346528 A1 | 12/2013 | Shinde et al. |
| 2014/0007238 A1 | 1/2014 | Magee et al. |
| 2014/0082726 A1 | 3/2014 | Dreller et al. |
| 2014/0187203 A1 | 7/2014 | Bombacino et al. |
| 2014/0189808 A1 | 7/2014 | Mahaffey et al. |
| 2014/0214895 A1 | 7/2014 | Higgins et al. |
| 2014/0230061 A1 | 8/2014 | Higbee et al. |
| 2014/0245396 A1 | 8/2014 | Oberheide et al. |
| 2014/0250506 A1 | 9/2014 | Hallam-Baker |
| 2014/0258420 A1 | 9/2014 | Dent et al. |
| 2014/0259158 A1 | 9/2014 | Brown et al. |
| 2014/0317697 A1 | 10/2014 | Nimashakavi et al. |
| 2014/0340822 A1 | 11/2014 | Lal et al. |
| 2014/0366144 A1 | 12/2014 | Alperovitch et al. |
| 2015/0030156 A1 | 1/2015 | Perez |
| 2015/0033343 A1 | 1/2015 | Jiang et al. |
| 2015/0067833 A1 | 3/2015 | Verma et al. |
| 2015/0081722 A1 | 3/2015 | Terada et al. |
| 2015/0100896 A1 | 4/2015 | Shmarovoz et al. |
| 2015/0113627 A1 | 4/2015 | Curtis et al. |
| 2015/0148006 A1 | 5/2015 | Skudlark et al. |
| 2015/0156154 A1 | 6/2015 | Russell et al. |
| 2015/0172233 A1 | 6/2015 | She |
| 2015/0216413 A1 | 8/2015 | Soyao et al. |
| 2015/0236990 A1 | 8/2015 | Shan et al. |
| 2015/0288714 A1 | 10/2015 | Emigh et al. |
| 2015/0326510 A1 | 11/2015 | Tomlinson et al. |
| 2015/0334065 A1 | 11/2015 | Yan et al. |
| 2015/0363839 A1 | 12/2015 | Zolty |
| 2015/0371212 A1 | 12/2015 | Giordano et al. |
| 2015/0381653 A1 | 12/2015 | Starink et al. |
| 2016/0012222 A1 | 1/2016 | Stolfo et al. |
| 2016/0014151 A1 | 1/2016 | Prakash |
| 2016/0037270 A1 | 2/2016 | Polinske et al. |
| 2016/0087925 A1 | 3/2016 | Kalavagattu et al. |
| 2016/0094566 A1 | 3/2016 | Parekh |
| 2016/0104132 A1 | 4/2016 | Abbatiello et al. |
| 2016/0210662 A1 | 7/2016 | Duggal et al. |
| 2016/0225897 A1 | 8/2016 | Sridhar |
| 2016/0269437 A1 | 9/2016 | Mcdougal et al. |
| 2016/0277485 A1 | 9/2016 | Abrams et al. |
| 2016/0352840 A1 | 12/2016 | Negron et al. |
| 2016/0359790 A1 | 12/2016 | Zhang et al. |
| 2017/0005961 A1 | 1/2017 | Liebmann et al. |
| 2017/0078321 A1 | 3/2017 | Maylor et al. |
| 2017/0085584 A1 | 3/2017 | Goutal |
| 2017/0091274 A1 | 3/2017 | Guo et al. |
| 2017/0126661 A1 | 5/2017 | Brannon |

(56) References Cited

U.S. PATENT DOCUMENTS

| | | |
|---|---|---|
| 2017/0134423 A1 | 5/2017 | Sysman et al. |
| 2017/0195310 A1 | 7/2017 | Tyler et al. |
| 2017/0206545 A1 | 7/2017 | Gupta et al. |
| 2017/0223034 A1 | 8/2017 | Singh et al. |
| 2017/0230323 A1 | 8/2017 | Jakobsson |
| 2017/0251006 A1 | 8/2017 | Larosa et al. |
| 2017/0324767 A1 | 11/2017 | Srivastava |
| 2017/0331816 A1 | 11/2017 | Votaw et al. |
| 2017/0331824 A1 | 11/2017 | Pender et al. |
| 2018/0041491 A1 | 2/2018 | Gupta et al. |
| 2018/0041515 A1 | 2/2018 | Gupta et al. |
| 2018/0091453 A1 | 3/2018 | Jakobsson |
| 2018/0097841 A1 | 4/2018 | Stolarz et al. |
| 2018/0131686 A1 | 5/2018 | Brannon |
| 2018/0160387 A1 | 6/2018 | Chastain et al. |
| 2018/0184289 A1 | 6/2018 | Dudley |
| 2018/0343246 A1 | 11/2018 | Benayed |
| 2019/0012478 A1 | 1/2019 | Narayanaswamy et al. |
| 2019/0095498 A1 | 3/2019 | Srinivasan et al. |
| 2019/0095516 A1 | 3/2019 | Srinivasan et al. |
| 2019/0306237 A1 | 10/2019 | Srinivasan et al. |
| 2020/0067861 A1 | 2/2020 | Leddy et al. |
| 2020/0076817 A1 | 3/2020 | Gupta et al. |
| 2020/0092291 A1 | 3/2020 | Vempati et al. |
| 2020/0244638 A1 | 7/2020 | Gupta et al. |
| 2020/0264860 A1 | 8/2020 | Srinivasan et al. |
| 2020/0265062 A1 | 8/2020 | Srinivasan et al. |

OTHER PUBLICATIONS

Ahonen-Myka et al., "Finding Co-Occuring Text Phrases by Combining Sequence and Frequent Set Discovery", Proceedings of the 16th International Joint Conference on Artificial Intelligence IJCAI-99 Workshop on Text Mining: Foundations, Techniques, and Applications, (Jul. 31, 1999) 1-9.

Author Unknown, "Federal Court Denies Attempt By Mailblocks, Inc. To Shut Down Spamarrest LLC", downloaded from "http://www.spamarrest.com/pr/releases/20030611.jsp", Seattle, WA, Jun. 11, 2003.

Author Unknown, "Stop Spam Mail, Block Offensive Materials, Save Time and Money", iPermitMail Email Firewall Version 3.0, 2003.

Author Unknown, Boxsentry, an Advanced Email Validation Facility to Prevent Spam, Downloaded From "https://web.archive.org/web/20040803060108/http://www.boxsentry.com:80/workings.html", Aug. 3, 2004.

Author Unknown, Fairuce: a Spam Filter That Stops Spam by Verifying Sender Identity Instead of Filtering Content., Downloaded From "https://web.archive.org/web/20061017101305/https:/secure.alphaworks.ibm.com/tech/fairuce", posted Nov. 30, 2004, captured on Oct. 17, 2006.

Author Unknown, "An Effective Solution for Spam", downloaded from "https://web.archive.org/web/20050203011232/http:/home.nyc.rr.com/spamsolution/An%20Effective%20Solution%20for%20Spam.htm", Feb. 3, 2005.

Author Unknown, "Junk Mail Buffering Agent", downloaded from http://www.ivarch.com/programs/jmba.shtml, Jun. 2005.

Author Unknown, "SpamFry: Welcome to our Beta testers", downloaded from https://web.archive.org/web/20050404214637/http:www.spamfry.net:80/, Apr. 4, 2005.

Author Unknown, Mailduster, Tour 1: Show Me How Mailduster Blocks Spam, Downloaded From "https://web.archive.org/web/20070609210003/http://www.mailduster.com:80/tour1.phtml", Jun. 9, 2007.

Author Unknown, Mailduster, Tour 2: But How Do My Friends and Colleagues Send Me Email?, Downloaded From "https://web.archive.org/web/20070609210039/http://www.mailduster.com:80/tour2.phtml", Jun. 9, 2007.

Author Unknown, Mailduster, Tour 3: How Do I Manage This "Allow and Deny List"?, downloaded from "https://web.archive.org/web/20070610012141/http://www.mailduster.com:80/tour3.phtml", Jun. 10, 2007.

Author Unknown, Mailduster, User Guide, Downloaded From "https://web.archive.org/web/20070612091602/http://www.mailduster.com:80/userguide.phtml", Jun. 12, 2007.

Author Unknown, ASB Antispam Official Home Page, Downloaded From "https://web.archive.org/web/20080605074520/http://asbsoft.netwu.com:80/index.html", Jun. 5, 2008.

Author Unknown, Kens Spam Filter 1.40, Downloaded From "https://web.archive.org/web/20080317184558/http://www.kensmail.net:80/spam.html", Mar. 17, 2008.

Author Unknown, "Frequently asked questions regarding Spamboomerang: Test Drive how SPAM Boomerang treats unknown senders", downloaded from "https://web.archive.org/web/20080719034305/http:/www.triveni.com.au/Spamboomerang/Spam_Faq.html", Jul. 19, 2008.

Akin et al., "Efficient hardware implementations of high throughput SHA-3 candidates keccak, luffa and blue midnight wish for single- and multi-message hashing", SIN '10: Proceedings of the 3rd international conference on security of information and network, pp. 168-177 (Year: 2010.

Author Unknown, How Mail Unknown Works., Downloaded From "https://web.archive.org/web/20100123200126/http://www.mailunknown.com:80/HowMailUnknownWorks.asp#VerifyValidate", Jan. 23, 2010.

Author Unknown, "BABASTIK: AntiSpam Personal", downloaded from "https://web.archive.org/veb/20101031061734/babastik.com/AntiSpam-Personal/", Oct. 31, 2010.

Author Unknown, "No Software to Install", downloaded from "https://web.archive.org/web/201002095356/http://www.cleanmymailbox.com:80/howitworks.html", Oct. 2, 2010.

Author Unknown, Home: about.com, Downloaded From "https://web.archive.org/web/20110201205543/quarantinemail.com/" Feb. 1, 2011.

Author Unknown, "First of all, Your Software is Excellent", downloaded from "https://web.archive.org/web/20120182074130/http://www.spamresearchcenter.com/", Aug. 12, 2012.

Author Unknown, mailcircuit.com, Secure: Spam Protection, Downloaded From "https://web.archive.org/web/20131109042243/http:/www.mailcircuit.com/secure/", Nov. 9, 2013.

Author Unknown, (Steven)—Artificial Intelligence for Your Email, Downloaded From "https://web.archive.org/web/20140607193205/http://www.softwaredevelopment.net.au:80/pge_steven.htm", Jun. 7, 2014.

Author Unknown, "bluebottle—trusted delivery", downloaded from "https://web.archive.org/web/20140715223712/https://bluebottle.com/trusted-delivery.php", Jul. 15, 2014.

Author Unknown, 0spam.com, Frequently Asked Questions, Downloaded From "https://web.archive.org/web/20150428181716/http//www.0spam.com:80/support.shtml#whatisit", Apr. 28, 2015.

Author Unknown, Alan Clifford's Software Page, Downloaded From "https://web.archive.org/web/20150813112933/http:/clifford.ac/software.html", Aug. 13, 2015.

Author Unknown, cashramspam.com, "Learn More about CRS: Welcome to CashRamSpam", downloaded from "https://web.archive.org/web/20151014175603/http:/cashramspam.com/learnmore/index.phtml", Oct. 14, 2015.

Author Unknown, DRCC NSJ, New Features: Query/Response System and Bayesian Auto-Leaning, Downloaded From "https://web.archive.org/web/20150520052601/http:/domino-240.drcc.com:80/publicaccess/news.nsf/preview/DCRR-69PKU5", May 20, 2015.

Author Unknown, Affini: A Network of Trust, downloaded from https://web.archive.org/web/20100212113200/http://www.affini.com:80/main/info.html, Feb. 12, 2010.

Author Unknown, Joe Maimon—Sendmail Page, Downloaded From "https://web.archive.org/web/20150820074626/http:/www.jmaimon.com/sendmail/" Aug. 20, 2015.

Author Unknown, "Sporkie" From Syncelus Wiki, retrieved from "http://wiki.syncleus.com/index.php?title=Sporkie&oldid=1034 (https://web.archive.org/web/20150905224202/http://wiki.syncleus.com/index.php?title=Sporkie&oldid=1034)", Sep. 2015.

Author Unknown, Captcha: Telling Humans and Computers Apart Automatically, Downloaded From "https://web.archive.org/web/20160124075223/http:/www.captcha.net/", Jan. 24, 2016.

(56) References Cited

OTHER PUBLICATIONS

Author Unknown, How Choicemail Works, Downloaded From "https://web.archive.org/web/20160111013759/http//www.digiportal.com:80/products/how-choicemail-works.html", Jan. 11, 2016.
Author Unknown, myprivacy.ca, "Welcome to myprivacy.ca: The simple yet effective whois-harvester-buster", downloaded from "https://web.archive.org/web/20160204100135/https:/www.myprivacy.ca/", Feb. 4, 2016.
Author Unknown, Permitmail, Products: the Most Advanced Email Firewall Available for Your Business , downloaded from "https://web.archive.org/web/20160219151855/http://ipermitmail.com/products/", Feb. 19, 2016.
Author Unknown, "Rejecting spam with a procmail accept list", downloaded from "https://web.archive.org/web/20160320083258/http:/angel.net/~nic/spam-x/", Mar. 20, 2016.
Adrian E. McElligott, "A Security pass for messages: message keys", CEAS '11: Proceedings of the 8th Annual Collaboration, Electronic messaging, Anti-abuse and Spam Conference. pp. 184-192 (Year: 2011).
Author Unknown, Boxbe, Wikipedia, Nov. 10, 2016, https://en.wikipedia.org/wiki/Boxbe?wprov=sfsi1.
Peter Simons, "mapSoN 3.x User's Manual", downloaded from "https://web.archive.org/web/20140626054320/http:/mapson.sourceforge.net/", Jun. 26, 2014.
Peterson et al. "Authenticated Identity Management in the Session Initiation Protocol (SIP)". Jul. 15, 2013. https://www.ietf.org/archive/id/draft-jennings-dispatch-rfc4474bis-01.txt.
Peterson et al. "Authenticated Identity Management in the Session Initiation Protocol (SIP)". May 29, 2013. https://datatracker.ietf.org/doc/draft-jennings-dispatch-rfc4474bis/00/.
Robinson et al., Caching Context Information in Persvasive System, MDS '06: Proceedings of the 3rd International Middleware doctoral Symposium. Nov. 2006, pp. 1 (Year: 2006).
Ronald L. Rivest, "RSF Quickstart Guide", Sep. 1, 2004.
RSA 7035_CONPRO_SB_0711 "RSA Identity Protection and Verification Suite: Managing risk against cybercrime"; http://web.archive.org/web/20111019060523/rsa.com/products/consumer/sb/7035_conpro_sb_0711.pdf. Oct. 19, 2011.
RSA 9697_AATF_SB_0808 "RSA Adaptive Authentication overview solution brief"; https://web.archive.org/web/20101225124323/http://www.rsa.com/products/consumer/sb/9697_AATF_SB_0808.pdf. Dec. 25, 2010.
RSA AAAM_SB_0208 "RSA Adaptive Authentication & RSA Access Manager solution brief"; https://web.archive.org/web/20081114221836/http://www.rsa.com/products/consumer/sb/AAAM_SB_0208.pdf. Nov. 14, 2008.
Search Query Report from IP.com (performed Jan. 6, 2020) (Year: 2020).
Search Query Report from IP.com (performed Apr. 8, 2021) (Year: 2021).
Search Query Report from IP.com (performed Jul. 31, 2020) (Year: 2020).
Toopher: https://web.archive.org/web/20120430105502/http://toopher.com/. Apr. 30, 2012.
Toopher: Toopher Developer Documentation; https://web.archive.org/web/20120523192419/https://www.toopher.com/developers.html. May 23, 2012.
Tyagi et al., "Traceback for End-to-End Encrypted Messaging" CCS '19: Proceeding of 2019 ACM SIGSAC Conference on Computer and Communications Security. pp. 4134-4430 (Year: 2019.
R. Dhamija and J. D. Tygar. The Battle Against Phishing: Dynamic Security Skins. In Proceedings of the 2005 Symposium on Usable Privacy and Security, SOUPS '05, New York, NY, USA, 2005. ACM.
S. L. Garfinkel and R. C. Miller. Johnny 2: A User Test of Key Continuity Management with S/MIME and Outlook Express. In Proceedings of the 2005 Symposium on Usable Privacy and Security, SOUPS '05, New York, NY, USA, 2005. ACM.

Author Unknown, Petmail Design, Downloaded From "https://web.archive.org/web/20150905235136if_/http:/petmail.lothar.com/design.html", Jul. 2005.
Author Unknown, postshield.net, Challenge and Response, Downloaded From "https://web.archive.org/web/20080117111334/http://www.postshield.net:80/ChallengeAndResponse.aspx", Jan. 17, 2008.
Author Unknown, Product Information, "Sender Validation is the solution to your company's spam problem.", downloaded from "https://web.archive.org/web/20140413143328/http:/www.spamlion.com:80/Products.asp", Apr. 13, 2014.
Author Unknown, Say Goodbye to Email Overload, Downloaded From "https://web.archive.org/web/20160119092844/http://www.boxbe.com:80/how-it-works", Jan. 19, 2016.
Author Unknown, Sendio, "Inbox Security. Threats eliminated with a layered technology approach.", downloaded from "https://web.archive.org/web/20140213192151/http:/www.sendio.com/solutions/security/", Feb. 13, 2014.
Author Unknown, Spam Pepper, Combatting Net Spam, Downloaded From "https://web.archive.org/web/20141002210345/http://www.spampepper.com:80/spampepper-com/", Oct. 2, 2014.
Author Unknown, Spam Snag, Stop Unsolicited Emails Forever!, Downloaded From "https://web.archive.org/web/20081220202500/http://www.spamsnag.com:80/how.php", Dec. 20, 2008.
Author Unknown, Spam: Overview, Downloaded From "https://web.archive.org/web/20090107024207/http:/www.spamwall.net/products.htm", Jan. 7, 2009.
Author Unknown, Spamblocks is a Web Based Mail Filtering Service Which Integrates With Your Existing Mailbox., Downloaded From "https://web.archive.org/web/20090107050428/http:/www.spamblocks.net/howitworks/detailed_system_overview.php", Jan. 7, 2009.
Author Unknown, spamcerbere.com, Downloaded From "https://web.archive.org/web/20070629011221/http:/www.spamcerbere.com:80/en/howitworks.php", Jun. 29, 2007.
Author Unknown, Spamjadoo: Ultimate Spam Protection, Downloaded From "https://web.archive.org/web/20140512000636/http:/www.spamjadoo.com:80/esp-explained.htm" May 12, 2014.
Author Unknown, Spamkilling, "What is AntiSpam?", downloaded from "https://web.archive.org/web/20100411141933/http:/www.spamkilling.com:80/home_html.htm", Apr. 11, 2010.
Author Unknown, spamrestraint.com: How Does It Work?, Downloaded From "https://web.archive.org/web/20050206071926/http://www.spamrestraint.com:80/moreinfo.html", Feb. 6, 2005.
Author Unknown, Tagged Message Delivery Agent (TMDA), Downloaded From "http://web.archive.org/web/20160122072207/http://www.tmda.net/", Jan. 22, 2016.
Author Unknown, Usebestmail Provides a Mechanism for Validating Mail From Non-Usebestmail Correspondents., Downloaded From "https://web.archive.org/web/20090106142235/http://www.usebestmail.com/UseBestMail/Challenge_Response.html", Jan. 6, 2009.
Author Unknown, V@nquish Labs, "vqNow: How It Works", downloaded from "https://web.archive.org/web/20130215074205/http:/www.vanquish.com:80/products/products_how_it_works.php?product=vqnow", Feb. 15, 2013.
Author Unknown, V@nquishlabs, How It Works: Features, Downloaded From "https://web.archive.org/web/20081015072416/http://vanquish.com/features/features_how_it_works.shtml", Oct. 15, 2008.
Author Unknown, What is Auto Spam Killer, Downloaded From "https://web.archive.org./web/20090215025157/http://knockmail.com:80/support/descriptionask.html", Feb. 15, 2009.
Author Unknown, White List Email (WLE), Downloaded From "https://web.archive.org/web/20150912154811/http:/www.rfc1149.net/devel/wle.html", Sep. 12, 2015.
Binkley et al., "Improving identifier informativeness using part of speech information", MSR '11: Proceedings of the 8th Working Conference on Mining Software Repositories. May 2011, pp. 203-206. (Year: 2011.
Brad Templeton, "Proper principles for Challenge/Response anti-spam systems", downloaded from "http://web.archive.org/web/2015090608593/http://www.templetons.com/brad/spam/challengeresponse.htmr", Sep. 6, 2015.

(56) References Cited

OTHER PUBLICATIONS

Danny Sleator, "BLOWBACK: A Spam Blocking System", downlaoded from "https://web.archive.org/web/20150910031444/http://www.cs.cmu.edu/~sleator/blowback", Sep. 10, 2015.

David A. Wheeler, "Countering Spam with Ham-Authenticated Email and the Guarded Email Protocol", article last revised Sep. 11, 2003; downloaded from "https://web.archive.org/web/20150915073232/http:/www.dwheeler.com/guarded-email/guarded-email.html", captured Sep. 15, 2015.

Entrust "Strong Multifactor Authentication Methods from Entrust IdentityGuard," https://web.archive.org/web/20110825101942/http://www.entrust.com/strong-authentication/authenticators.htm. Aug. 25, 2011.

Entrust: Mobile Authentication and Transaction Verification1,2,3, https://web.archive.org/web/20110814071521/http://www.entrust.com/mobile-security. Aug. 14, 2011.

Entrust: Proven Transaction Verification on Smartphones & Mobile Devices—Entrust,https://web.archive.org/web/20110918231205/http://www.entrust.com/transaction-verification/index.htm. Sep. 18, 2011.

Entrust: WP_Securing_Whats_At_Risk_Jul. 8, https://web.archive.org/web/20110809104408/http://download.entrust.com/resources/download.cfm/22313/. Aug. 9, 2011.

ESphinx "Cyota and Quova Reducing Online Fraud with Cyotas eVision Technology," https://web.archive.org/web/20060307092523/http://www.cyota.com/press-releases.asp?id=81. Mar. 7, 2006.

ESphinx "Cyota eSphinx," https://web.archive.org/web/20051214102438/http://www.cyota.com/product_7.asp. Dec. 14, 2020.

ESphinx "Cyota launches new authentication platform for online banking," https://web.archive.org/web/20050508152420/http://www.cyota.com/news.asp?id=173. May 8, 2005.

ESphinx "How Does it Work?"; https://web.archive.org/web/20051210112946/http://www.cyota.com/product_7_19.asp. Dec. 10, 2005.

ESphinx "Key Features," https://web.archive.org/web/20051210114904/http://www.cyota.com/product_7_18.asp. Dec. 10, 2005.

ESphinx: Cyota releases eSphinx online authentication package, https://web.archive.org/web/20050508152435/http://www.cyota.com/news.asp?id=170. May 8, 2005.

Fleizach et al., "Slicing Spam with Occam's Razor", published Jun. 10, 2007, downloaded from "https://web.archive.org/web/20140214225525/http://csetechrep.ucsd.edu/Dienst/UI/2.0/Describe/ncstrl.ucsd_cse/C2007-0893", captured Feb. 14, 2014.

Green Armor: Dec. 8, 2005 Press Release: "Green Armor Solutions Introduces Identity Cues Two Factor"; http://www.greenarmor.com/Green_Armor_Solutions_News-2005-12-07.shtml.

Green Armor: Green Armor Solutions "Identity Cues Products"; https://web.archive.org/web/20060110032814/http:/www.greenarmor.com/products.shtml. Jan. 10, 2006.

Green Armor: Green Armor Solutions "Identity Cues Two Factor & Two Way Authentication"; https://web.archive.org/web/20060209211113/http:/www.greenamnor.com/DataSheets/Identity%20Cues%20Two%20Factor%20Data%20Sheet.pdf. Feb. 9, 2006.

Heinermann et al., "Recommending API methods based on identifier contexts", SUITE '11: Proceedings of the 3rd International Workshop on Search-Driven Development: Users, Infrastructure, Tools, and Evaluation. May 2011, pp. 1-4. (Year: 2011.

James Thornton, "Challenge/Response at the SMTP Level", downloaded from "https://web.archive.org/web/20140215111642/http://original.jamesthornton.com/writing/challenge-response-at-smtp-level.html", Feb. 15, 2014.

Karsten M. Self, "Challenge-Response Anti-Spam Systems Considered Harmful", downloaded from "ftp://linuxmafia.com/faq/Mail/challenge-response.html", last updated Dec. 29, 2003.

Kim et al., Context Information-based application access central model, IMCOM '16: Proceedings of the 10th International Conference on Ubiquitous Information Management and Communication. Jan. 2016, Article No. 75, pp. 1-5 (Year: 2016).

Laszka et al., "Integrity assurance in resource-bounded systems through stochastic message authentication", HotSoS '15: Proceedings of the 2015 Symposium and Bootcamp on the Science of security. Apr. 2015, Article No. 1, pp. 1-12. https://doi.org/ (Year: 2015.

M. Jakobsson and H. Siadati. SpoofKiller: You Can Teach People How to Pay, but Not How to Pay Attention. In Proceedings of the 2012 Workshop on Socio-Technical Aspects in Security and Trust (STAST), STAST '12, pp. 3-10, Washington, DC, USA, 2012. IEEE Computer Society.

Marco Paganini, Active Spam Killer, "How It Works", downloaded from "https://web.archive.org/web/20150616133020/http:/a-s-k.sourceforge.net80/howitworks.html", Jun. 16, 2015.

NIST. Usability of Security. http://csrc.nist.gov/security-usability/HTML/research.html. May 1, 2015.

Park et al., "Scambaiter: Understanding Targeted Nigerian Scams on Craigslist", published in Network and Distributed System Security Symposium (NDSS), 2014.

Author Unknown, privatemail.com, how it works: Experts say the best way to control spam is to use temporary "disposable" email addresses like from Yahoo or Hotmail that can be discarded after they start getting spam., downloaded from "https://web.archive.org/web/20100212231457/http:/privatemail.com:80/HowItWorksPage.aspx", Feb. 12, 2010.

Author Unknown, qconfirm—How it works, downloaded from https://web.archive.org/web/20150915060329/http:/smarden.org/qconfirm/technical.html, Sep. 15, 2015.

E. Zwicky, F. Martin, E. Lear, T. Draegen, and K. Andersen. Interoperability Issues Between DMARC and Indirect Email Flows. Internet-Draft draft-ietf-dmarc-interoperability-18, Internet Engineering Task Force, Sep. 2016.

Delivered-To: markus.jakobsson@gmail.com  ← 402
Received: by 10.194.162.3 with SMTP id xw3csp1378639wjb;
    Fri, 18 Dec 2015 21:57:09 -0800 (PST)
X-Received: by 10.50.40.104 with SMTP id w8mr7532216igk.8.1450504629208;
    Fri, 18 Dec 2015 21:57:09 -0800 (PST)
Return-Path: <e-otoiawase@chuotaxi.co.jp>
Received: from server15.dsbsv.net (server15.dsbsv.net. [219.99.168.93])
    by mx.google.com with ESMTPS id b19si15418833igr.53.2015.12.18.21.57.07
    for <markus.jakobsson@gmail.com>
    (version=TLS1 cipher=AES128-SHA bits=128/128);
    Fri, 18 Dec 2015 21:57:09 - 0800 (PST)
Received-SPF: pass (google.com: domain of e-otoiawase@chuotaxi.co.jp designates 219.99.168.93 as permitted sender) client-ip=219.99.168.93;
Authentication-Results: mx.google.com;
    spf=pass (google.com: domain of e-otoiawase@chuotaxi.co.jp designates 219.99.168.93 as permitted sender) smtp.mailfrom=e-otoiawase@chuotaxi.co.jp
Received: from [172.16.1.75] (p18021- ipngn1201yosida.nagano.ocn.ne.jp [153.208.241.21])
    by server15.dsbsv.net (Postfix) with ESMTPA id 98928DA9353
    for <markus.jakobsson@gmail.com>; Sat, 19 Dec 2015 14:57:04 +0900 (JST)
Subject: =?UTF-8?Q?Re:_=e3=80=90Haneda_23Dec.2015-27Dec.2015=e3=80=91?=
To: Markus Jakobsson <markus.jakobsson@gmail.com>
References: <Qdmail.1.2.6b_a5b25d72f7ae04e71f64d89d6b4b412dfbdf0736@hal456.net>
   <562D9438.8090308@chuotaxi.co.jp>
   <BC1B2AFA-BBE5-496E-B261-9338A7883FE8@gmail.com>
   <562DB139.9010704@chuotaxi.co.jp>
   <098FBBDB-6798-4334-BAF2-993E82526F58@gmail.com>
   <562DBB04.3070600@chuotaxi.co.jp>
   <DEAE040F-1FBB-4BD1-8813-07D8C1A4BFBD@gmail.com>
   <562ECB20.1050107@chuotaxi.co.jp>
   <E8FC9DC7-58EE-4E99-82AF-351A1E32C981@gmail.com>
From: Chuo Taxi Corp <e-otoiawase@chuotaxi.co.jp>
Message-ID: <5674F1AE.6060902@chuotaxi.co.jp.>
Date: Sat, 19 Dec 2015 14:57:02 +0900
User-Agent : Mozilla/5.0 (Windows NT 6.1; rv:38.0) Gecko/20100101
    Thunderbird/38.4.0
MIME-Version: 1.0
In-Reply-To: <E8FC9DC7-58EE-4E99-82AF-351A1E32C981@gmail.com>
Content-Type: multipart/alternative;
  boundary="--------------050800010905090907010408"

This is a multi-part message in MIME format.
--------------050800010905090907010408"

Content-Type: text/plain; charset=utf-8; format=flowed
Content-Transfer-Encoding: 8bit

Delivered-To: markus.jakobsson@gmail.com
Received: by 10.194.86.233 with SMTP id s9csp1859523wjz;
       Sun , 30 Oct 2016 00:12:28 -0700 (PDT)
X-Received: by 10.25.89.147 with SMTP id n141mr12104157lfb.43.1477811548490;
       Sun, 30 Oct 2016 00:12:28 -0700 (PDT)
Return-Path: <jakobsson.lars@telia.com>
Received: from v-smtpout2.han.skanova.net (v-smtpout2.han.skanova.net. [81.236.60.155])
       by mx.google.com with ESMTP id p188si12290159lfp.264.2016.10.30.00.12.28
       for <markus.jakobsson@gmail.com>;
       Sun, 30 Oct 2016 00:12:28 -0700 (PDT)
Received-SPF: neutral (google.com: 81.236.60.155 is neither permitted nor denied by best guess record for domain of jakobsson.lars@telia.com) client-ip=81.236.60.155;
Authentication-Results: mx.google.com;
       spf=neutral (google.com: 81.236.60.155 is neither permitted nor denied by best guess record for domain of jakobsson.lars@telia.com) smtp.mailfrom=jakobsson.lars@telia.com
Received: from [10.0.1.30] ( [94.245.18. 21])
     by cmsmtp with SMTP
     id 0kl8cGGbfCetx0kl8cjvqp; Sun, 30 Oct 2016 08:12:28 +0100
Content-Type: text/plain;
       charset=utf-8
Mime-Version: 1.0 (1.0)
Subject: Re: Kamera
From : Lars Jakobsson <Jakobsson.Lars@telia.com>
X-Mailer: iPhone Mail (14A456)
In-Reply-To: <19C50800-23CD-48B8-A6D1-520C64C7AE1C@gmail.com>
Date: Sun, 30 Oct 2016 08:12:27 +0100
Content-Transfer-Encoding: quoted- printable
Message-Id: <D7E172FC-6BC1-4716-B82F-0CC9A5C0C050@telia.com>
References: <19C50800-23CD-48B8-A6D1-520C64C7AE1C@gmail.com>
To: Markus Jakobsson <markus.jakobsson@gmail.com>
X-CMAE-Envelope:
MS4wf08HJMijp7vMwe4Xj IS2Vq1x+3Z5oV97XkNG0qOb3m3AdDIBsoLj4azctSKIcmTpG5LjeAPcHylamz8xkdJbW459mZaWHgiltHkP3npv7ofq5HIWrMp6
 2X5mY+YcXRDdhmp/qGTh1oowYLws6824+qBPbSjechx7qFqGF2cNvvT75B8IF7a7kPZHUQ91HsLpDgs7O3NSOIDIbdJ/zNxf0I3olOguGoBnd7+My9pq2Zo+

FIG. 4B

```
Delivered-To: markus.jakobsson@gmail.com                              ←406
Received: by 10.142.14.21 with SMTP id 21cs138280wfn;
        Mon, 28 Sep 2009 10:02:05 -0700 (PDT)
Return-Path: <audreyseigel3@gmail.com>
Received-SPF: pass (google.com: domain of audreyseigel3@gmail.com designates 10.101.27.32 as permitted
sender) client-ip=10.101.27.32;
Authentication-Results: mr.google.com; spf=pass (google.com: domain of audreyseigel3@gmail.com
designates 10.101.27.32 as permitted sender) smtp.mail=audreyseigel3@gmail.com; dkim=pass
header.i=audreyseigel3@gmail.com
Received: from mr.google.com ([10.101.27.32])
        by 10.101.27.32 with SMTP id e32mr3251693anj.55.1254155608584 (num_hops= 1);
        Mon, 28 Sep 2009 09:33:28 -0700 (PDT)
DKIM-Signature: v=1; a=rsa-sha256; c=relaxed/relaxed;
        d=gmail.com; s=gamma;
        h=domainkey-signature:mime-version:received:in-reply-to:refercnces
         :date:message-id:subject:from:to:content-type;
        bh=76uDsJ5zJ2kzj3zdKluSJnhjhjVSYlMMH5VComisY8g=;
        b=mmNLQshvt0nsVC0bSzs5f4ODH2953zd0npiDUeQgCEkqxKztrPt4NQcCJFmKDW9JIC
         4bfwaFiuwCy0iFT9DYfiWvXSIAtpi/B1rdhIdkYvz06lmia4P5TqHmhdti25QrQ7/Zgi
         sl9vROjyd6k8vV913TrhB5r96UuOn5eXtgnK4=
DomainKey-Signature: a=rsa-sha1; c=nofws;
        d=gmail.com; s=gamma;
        h=mime-version:in-reply-to:references:date:message-id:subject:from:to
         :content-type;
        b=YWPUfB+PUr7RT6ty/Ap5PJFfTOZWfd91SplwxUZJFuBjUho8D/FWP1XyrBApR+zxPs
         +c7EH5KcSuMONN9YCNCCk+Q2D4TW0DBK7 r3FTgXMOOtHhZFJJYUCqzzRdLUsRiTvE4DR
         SobXQScPXUNvw1dlVj9q79R1Mn46CH2S2V4lc=
MIME-Version: 1.0
Received: by 10.101.27.32 with SMTP id e32mr3251693anj.55.1254155608578; Mon,
        28 Sep 2009 09:33:28 -0700 (PDT)
In-Reply-To: <6866c1370909272348r490762f9s3250e2459875674a@mail.gmail.com>
References: <6866c1370909271317v618fc3bcs5d110d0e1f10bfd1@mail.gmail.com>
        <11698C9F-0272-40EC-A053-6E7C8BAAA5A8@gmail.com>
        <6866c1370909272038o605c5132t19f7935cdfc5c194@mail.gmail.com>
        <4A501037-44AB-4B6B-8878-45724823E629@gmail.com>
        <6866c1370909272348r490762f9s3250e2459875674a@mail.gmail.com>
Date: Mon, 28 Sep 2009 18:33:28 +0200
Message-ID: <6866c1370909280933v1eddb443ia8ee8c3372563ce0@mail.gmail.com>
Subject: Re: Nikon D100 in very good condition - $250 (mountain view)
From: Mrs Audrey Seigel <audreyseigel3@gmail.com>
To: Markus Jakobsson <markus.jakobsson@gmail.com>
Content-Type: multipart /alternative; boundary=001636b2b0b48adafe0474a5db3b ---001636b2b0b48adafe0474a5db3b
Content-Type: text/plain; charset=ISO-8859-1                        FIG. 4C
```

← 408

Delivered-To: markus. jakobsson@gmail.com
Received: by 10.224.73.204 with SMTP id r12cs58470qaj;
 Fri, 25 Sep 2009 21:00:54 -0700 (PDT)
MIME- Version: 1.0
Received: by 10.216.89.14 with SMTP id b14mr188568wef.76.1253937653136; Fri,
 25 Sep 2009 21:00:53 -0700 (PDT)
In-Reply-To: <6685224C-C2AA-47D4-9A61-105FC27CED1E@gmail.com>
References: <527d9d4f0909251840y187d740eheadb70f9eca69423@mail.gmail.com>
 <1D2F489F-6E2D-43AA-AAEE-378ADEB02291@gmail.com>
 <527d9d4f0909251942u198821dbg663d227992d2a1ad@mail.gmail.com>
 <6685224C-C2AA-47D4-9A61-105FC27CED1E@gmail.com>
Date: Sat, 26 Sep 2009 05:00:53 +0100
Message-ID: <527d9d4f0909252100g1cf3fcderd3d97f10c28555b2@mail.gmail.com>
Subject: Re: Nikon 35-70 Nikkor 1:2.8 D very good condition - $300 (mountain
 view)
From: Sarah Clarke <sarah.clarke445@gmail.com>
To: Markus Jakobsson <markus.jakobsson@gmail.com>
Content-Type: multipart/alternative; boundary=0016e6d977fd62c01e0474731c15

--0016e6d977fd62c01e0474731c15
Content-Type: text/plain; charset=ISO -8859-1

Delivered-To: markus.jakobsson@gmail.com
Received: by 10.103.182.12 with SMTP id j12cs221244mup;
    Mon, 17 Nov 2008 11:28:38 -0800 (PST)
Received: by 10.215.39.14 with SMTP id r14mr2994641qaj.80.1226950117489;
    Mon, 17 Nov 2008 11:28:37 -0800 (PST)
Return-Path: <colette.callison@intl.westernunion.com>
Received: from intl.westernunion.com (mailout2.westernunion.com [206.201.224.244])
    by mx.google.com with ESMTP id 9si5581980yws.5.2008.11.17.11.28.36;
    Mon, 17 Nov 2008 11:28:37 -0800 (PST)
Received-SPF: pass (google.com: domain of colette.callison@intl.westernunion.com designates 206.201.224.244 as permitted sender) client-ip=206.201.224.244;
Authentication-Results: mx.google.com; spf=pass (google.com: domain of colette.callison@intl.westernunion.com designates 206.201.224.244 as permitted sender) smtp.mail=colette.callison@intl.westernunion.com
Received: from ( [172.31.14. 54] )
    by mail.intl.westernunion.com with ESMTP    id KP-BRANV.112291224;
    Mon, 17 Nov 2008 14:28:22 -0500
In-Reply-To: <195134AC-55A1-44C6-9D59-5190FCFD8014@gmail.com>
Subject: Re:
To: Markus Jakobsson <markus.jakobsson@gmail.com>
Cc: sukamol@extricatus.org
X-Mailer: Lotus Notes Release 6.5.4 March 27, 2005
Message-ID: <OFFFC8BF90.105B6A7F-ON85257504.00698588-85257504.006AF6BE@Westernunion.com>
From: Colette.Callison@intl.westernunion.com
Date: Mon, 17 Nov 2008 14:28:20 -0500
X-MIMETrack: Serialize by Router on SMTP1/WesternUnion(Release 7.0.3FP1| February 24, 2008) at
  11/17/2008 02:28:22 PM
MIME-Version: 1.0
Content-Type: text/plain;
    charset="US-ASCII"

Return-Path: <dcluniz@yahoo.com>
Received: from kaufman.uits.indiana.edu (kaufman.uits.indiana.edu [129.79.1.191])
    by bloodroot.uits.indiana.edu (Cyrus v2.2.10) with LMTPA;
    Tue, 24 Jul 2007 13:25:47 -0400
X-Sieve: CMU Sieve 2.2
Received: from web34402.mail.mud.yahoo.com (web34402.mail.mud.yahoo.com [66.163.178.151])
    by kaufman.uits.indiana.edu (8.13.8/8.13.8/IU Messaging Team) with SMTP id I60HPjIZ012899
    for <markus@indiana.edu>; Tue, 24 Jul 2007 13:25:47 -0400
Received: (qmail 54029 invoked by uid 60001); 24 Jul 2007 17:25:45 -0000
DomainKey-Signature: a=rsa-sha1; q=dns; c=nofws;
    s=s1024; d=yahoo.com;
    h=X-YMail-OSG:Received:Date:From:Subject:To:In-Reply-To:MIME-Version:Content-Type:Content-Transfer-Encoding:Message-ID;
    b=av6xhngxltqaUTXgZBgNp9lQWaXL05yFTTShYyncexuMA42DWylLAc1jlw5Fp1wihzQJfzrpuH2VB/
moRnrkyNN6ltYAVZcGX4/2DMz8Y0WWZ35+lEsGajDtduJ9i2bX/QAJvhCykyRPia7xu3NFQ9AviEPgvMSvJiRZxb7E4/w=;
X-YMail-OSG:
E651gyYVM1IMxM5Aw.siJpdiW9yJc04gT9ZX99RQujjCBu8aazYbIC8eilfQship4HXxvX7ptxBPtswwisWwk9BwH0xhD10m6BxjXHjP
Z_9k82n1P.Swv5j0Ay0HRw--
Received: from [134.220.85.64] by web34402.mail.mud.yahoo.com via HTTP; Tue, 24 Jul 2007 10:25:45 PDT
Date: Tue, 24 Jul 2007 10:25:45 -0700 (PDT)
From: Emesiobi Chigozie <dcluniz@yahoo.com>
Subject: Re: Invitation Letter To Attend Conference.
To: Markus Jakobsson <markus@indiana.edu>
In-Reply-To: <EB14D91A-91A3-4F8F-B8BC-7259B4C20F5F@indiana.edu>
MIME-Version: 1.0
Content-Type: multipart/alternative; boundary="0-1464032979-1185297945=:51806"
Content-Transfer-Encoding: 8bit
Message-ID: <102644.51806.qm@web34402.mail.mud.yahoo.com>

--0-1464032979-1185297945=:51806
Content-Type: text/plain; charset=iso-8859-1
Content-Transfer-Encoding: 8bit Hello Markus.

FIG. 4F

Markus Jakobsson <mjakobsson@agari.com>  Today at 1:50 PM  (MJ)
To: ppeterson14014@yahoo.com
Reply-To: noreply@agari.com
Automated response - your message has been quarantined Hi Patrick Peterson, You recently sent a message to Markus Jakobsson <mjakobsson@agari.com>. The message has been placed in quarantine.

It is possible that you normally communicate with Markus Jakobsson <mjakobsson@agari.com> using another email address that is whitelisted by the security system.
If you think that is so, then here is what you must do to also whitelist your email address ppeterson14014@yahoo.com 1. Forward this message in its entirety to the email address you normally use to communicate with Markus Jakobsson <mjakobsson@agari.com>.
2. Log in to that email account, find your forwarded message, and forward it again to whitelist@agari.com from that account.
3. You will then receive a confirmation email, and your message will be removed from quarantine and delivered.
4. You will only have to do this once for this email account, and not for each email you send.

Thanks, and have a good day!
The Agari Team

Security code GF686L88.

FIG. 14B

USING A MEASURE OF INFLUENCE OF SENDER IN DETERMINING A SECURITY RISK ASSOCIATED WITH AN ELECTRONIC MESSAGE

CROSS REFERENCE TO OTHER APPLICATIONS

This application is a continuation of U.S. patent application Ser. No. 16/219,284 entitled USING A MEASURE OF INFLUENCE OF SENDER IN DETERMINING A SECURITY RISK ASSOCIATED WITH AN ELECTRONIC MESSAGE filed Dec. 13, 2018, which is a continuation-in-part of U.S. patent application Ser. No. 15/823,196 entitled DETECTING COMPUTER SECURITY RISK BASED ON PREVIOUSLY OBSERVED COMMUNICATIONS filed Nov. 27, 2017, now U.S. Pat. No. 10,715,543, which claims priority to U.S. Provisional Patent Application No. 62/428,328 entitled ADDRESSING ACCOUNT-TAKEOVERS filed Nov. 30, 2016, and claims priority to U.S. Provisional Patent Application No. 62/490,309 entitled DETECTION OF ABUSE INVOLVING ASSOCIATED ACCOUNTS filed Apr. 26, 2017, all of which are incorporated herein by reference for all purposes.

U.S. patent application Ser. No. 16/219,284 claims priority to U.S. Provisional Patent Application No. 62/599,475 entitled AUTOMATED ROLE-BASED RISK ASSESSMENTS filed Dec. 15, 2017 which is incorporated herein by reference for all purposes.

BACKGROUND OF THE INVENTION

There are many ways in which computer hackers and scammers deceive potential victims. Many of these ways involve assuming or mimicking an identity of a party the potential victim trusts. This may be an individual, such as a friend or a colleague, or it may be a brand, whether one that the potential victim has a relationship with or simply knows of as trustworthy.

A common technique used by computer hackers is to compromise an electronic message account, e.g., using phishing or malware that gains access to the account, and then search the mail folders of the victim for emails that indicate connections and content of potential value in the context of an attack. Upon finding interesting information, such as information indicating that a second party has a trust relationship with the user owning the compromised account, the hacker commonly uses the compromised account to send an email to a second party. This is done with the hope that the second party will be willing to respond in the intended manner to the email, given that it comes from a party he or she trusts.

Sometimes a malicious sender sends a malicious message with a sender name or a sender address that is the same or similar to that of a trusted party of a message recipient to trick the recipient into believing the malicious message was sent from the trusted party rather than the malicious sender. The recipient is more likely to act on the malicious message because it appears to have been sent by the trusted party of the recipient.

BRIEF DESCRIPTION OF THE DRAWINGS

Various embodiments of the invention are disclosed in the following detailed description and the accompanying drawings.

FIGS. 4A-4F show various examples of headers included in example email messages.

FIG. 14B shows an example of an automatic reply message requesting verification of an identity of the sender of the message.

DETAILED DESCRIPTION

Figure 1:
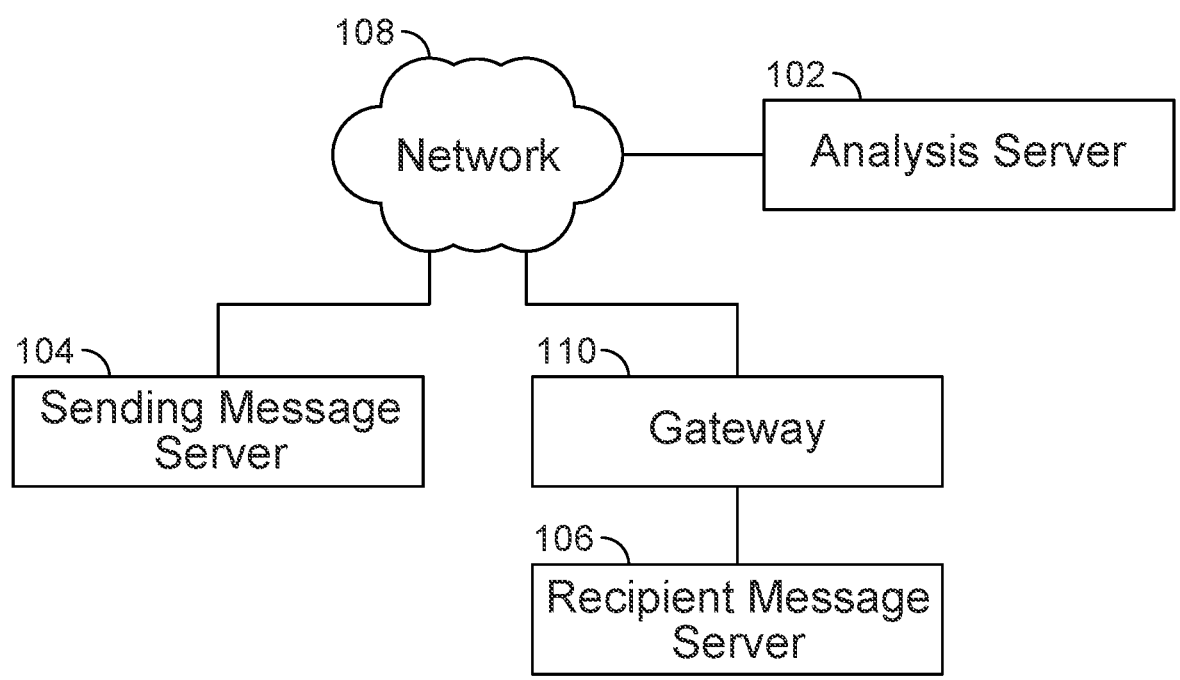
FIG. 1 is a diagram illustrating an embodiment of a system environment for analyzing a message.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In some embodiments, a measure of influence of a message sender entity (e.g., individual sender in some embodiments, or a group of individual senders belonging to an organization/grouping (e.g., domain) in other embodiments) is determined for a message receiving entity (e.g., individual recipient in some embodiments or a group of individual recipients belonging to an organization/grouping in other embodiments). There is a higher security risk for a spoofed message in that the spoofed message has been seemly sent from a sender of high influence for the recipient of the message. For example, a message apparently from a CEO is more likely to cause an employee recipient to take immediate action of great consequence as compared to a message apparently from a stranger. The measure of influence may be determined based on analysis of messages known to be sent by the sender entity. For example, volume, breath, and content of one or more previous messages sent by the sender entity are analyzed to determine the measure of influence of the sender entity for a specific receiving entity. Because the sender entity has a different influence over different recipient entities, the measure of influence for the same sender entity may be different for different recipient entities. Examples of a recipient entity include an individual recipient or a group of recipients (e.g., members of an organization/domain). For example, a sender may have same/similar influence over all members of an organization (e.g., CEO of the organization) and the measure of influence for the message sender entity is determined for an entire organization. In some embodiments, the measure of influence is determined based at least in part on a role of the sender entity and/or recipient entity within an organization. For example, the job title, department assignment, manager/reporting relationship, and any other organization role/relationship of the sender or the recipient entity are utilized as a factor in determining the measure of influence (e.g., sender that is higher than a threshold or relatively higher than the recipient in an organizational/reporting hierarchy chart of an organization has a high measure of influence; sender from an organizational department of high impact (e.g., billing department) has a high measure of influence, etc.).

Thus a measure of influence of various message senders for various message recipient entities can be calculated/updated periodically and stored for future use in determining a security threat of a newly received message. When a new message that has been apparently sent by the sender is received, the determined measure of influence of the sender for the intended recipient entity of the message is determined and the measure of influence of the sender is utilized to determine a security risk associated with the received message.

In some embodiments, it is determined whether a sender of an electronic message has an established relationship with an intended recipient of the electronic message. For example, if the sender of the message has previously communicated with the intended recipient a sufficient number of times for at least a threshold length of time, the sender of the electronic message is determined to have an established relationship with the intended recipient. In response to a determination that the sender of the electronic message has an established relationship with the intended recipient, the electronic message is analyzed based on at least in part previously observed communication between the sender and the intended recipient to determine a security risk of the electronic message for the intended recipient. For example, given what is already known about the sender of the message based on a classification and analysis of previous communications between the sender and the intended recipient, it can be determined whether the newly received message conforms to a pattern detected in the previous communications. Based on the result of the analysis of the electronic message, a security action is performed, if applicable. For example, the electronic message may be blocked if a sufficiently high level of risk is detected and/or the message may be modified to include a warning about the ATOed account risk if a sufficient medium level of risk is detected based on the analysis. If no or low level of risk is detected, the message may be allowed to be access by the intended recipient by delivering the message to a message inbox of the recipient. A compromised account is commonly referred to as an account that has been taken over. The action of compromising is commonly referred to as an account takeover (ATO). Compromised accounts are also referred to as ATOed accounts.

FIG. 1 is a diagram illustrating an embodiment of a system environment for analyzing a message. Examples of the message include an electronic mail (i.e., email), an instant message, a text message, a Short Message Service (SMS) message, a text message, a Multimedia Messaging Service (MMS) message, and any other forms of electronic messages. Analysis server 102 is connected to recipient message server 106 via network 108. In some embodiments, analysis server 102 is directly embedded or implemented in recipient message server 106. Sending message server 104 sends a message to recipient message server 106 for delivery to a recipient associated with recipient message server 106. In some embodiments, recipient message server 106 is a local message server. Gateway 110 receives the message prior to delivery to recipient message server 106. Gateway 110 may process incoming email messages for one or more recipient users of an organization (e.g., for users with a common domain email address). In various embodiments, recipient message server 106 may be any type of server that receives a message for delivery to a recipient user. Sending message server 104 is the last server that handled a message prior to delivery to recipient message server 106 via network 108. For example, sending message server 104 is an outgoing email server of a sender of the message. In various embodiments, sending message server 104 may be any type of server able to send a message to recipient message server 106.

Analysis server 102 processes a received message and filters it for potentially harmful or undesired messages. For example, incoming messages are filtered and analyzed for spam, viruses, spoofing, impersonation, ATOed sender, and any other harmful or undesired content to detect, prevent, or minimize such messages from reaching a message recipient served by the recipient message server. In some embodiments, analysis server 102 determines and/or maintains a measure of influence for each message sender for a particular message recipient entity. For example, by obtaining external information (e.g., organizational/reporting hierarchy chart/relationship, a directory/contact list, etc.), and/or observing message traffic to and from server 106 of the user, server 102 determines and/or maintains measures of influence (e.g., values) for each message sender entity for each message recipient entity being managed/protected.

In some embodiments, a message sent from sending message server 104 is first received at analysis server 102 prior to being received at gateway 110 and recipient message server 106. In some embodiments, a message sent from sending message server 104 is first received at gateway 110 that sends the message to analysis server 102. In some embodiments, a message sent from sending message server 104 is received at gateway 110 that sends the message to recipient message server 106 and recipient message server 106 send the message to analysis server 102. In an alternative embodiment, analysis server 102 is included in gateway 110. In an alternative embodiment, analysis server 102 is included in message server 106.

In addition to analyzing the message, analysis server 102 may block and/or modify the message or instruct another server (e.g., instruct server 106) to block and/or modify the message in the event a potential threat is detected. In some embodiments, analysis server 102 initiates a user inquiry regarding a sender of the message in the event a potential threat is detected. In some embodiments, analysis server 102 receives information about one or more messages sent by a user of message server 106 (e.g., receives the message or a portion of the message, a recipient identifier included in the message, etc.). This information may be utilized by analysis server 102 to identify message behavior and/or message contacts of the user.

In some embodiments, recipient message server 106 performs a risk analysis for an incoming message at least in part by performing an authenticity and/or sender influence analysis to determine an overall measure of risk (e.g., risk score). Performing authenticity analysis may include determining a measure of confidence that a sender identified in the message (e.g., domain of the sender) is the actual sender of the message. Performing sender influence analysis may include obtaining a measure of influence value of the sender for the recipient entity that quantifies the likely amount of influence the sender has over the recipient entity.

In some embodiments, a risk analysis performed by recipient message server 106 results in a risk value of a message. The risk value may be utilized at least in part to flag/label the message, modify the message (e.g., add warning), and/or to determine whether to allow the message to be delivered to an intended recipient of the message.

Examples of network 108 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 1 has been simplified to illustrate the example clearly. Although single instances of many of the components shown in FIG. 1 have been shown to simplify the diagram, additional instances of any of the components shown in FIG. 1 may exist. For example, a plurality of recipient message servers are connected and/or managed by analysis server 102. Multiple analysis servers may exist. Multiple recipient message servers may serve the same recipient entity/domain. Components not shown in FIG. 1 may also exist. Any of the components shown in FIG. 1 may be a logical, physical, or virtual component.

Figure 2:
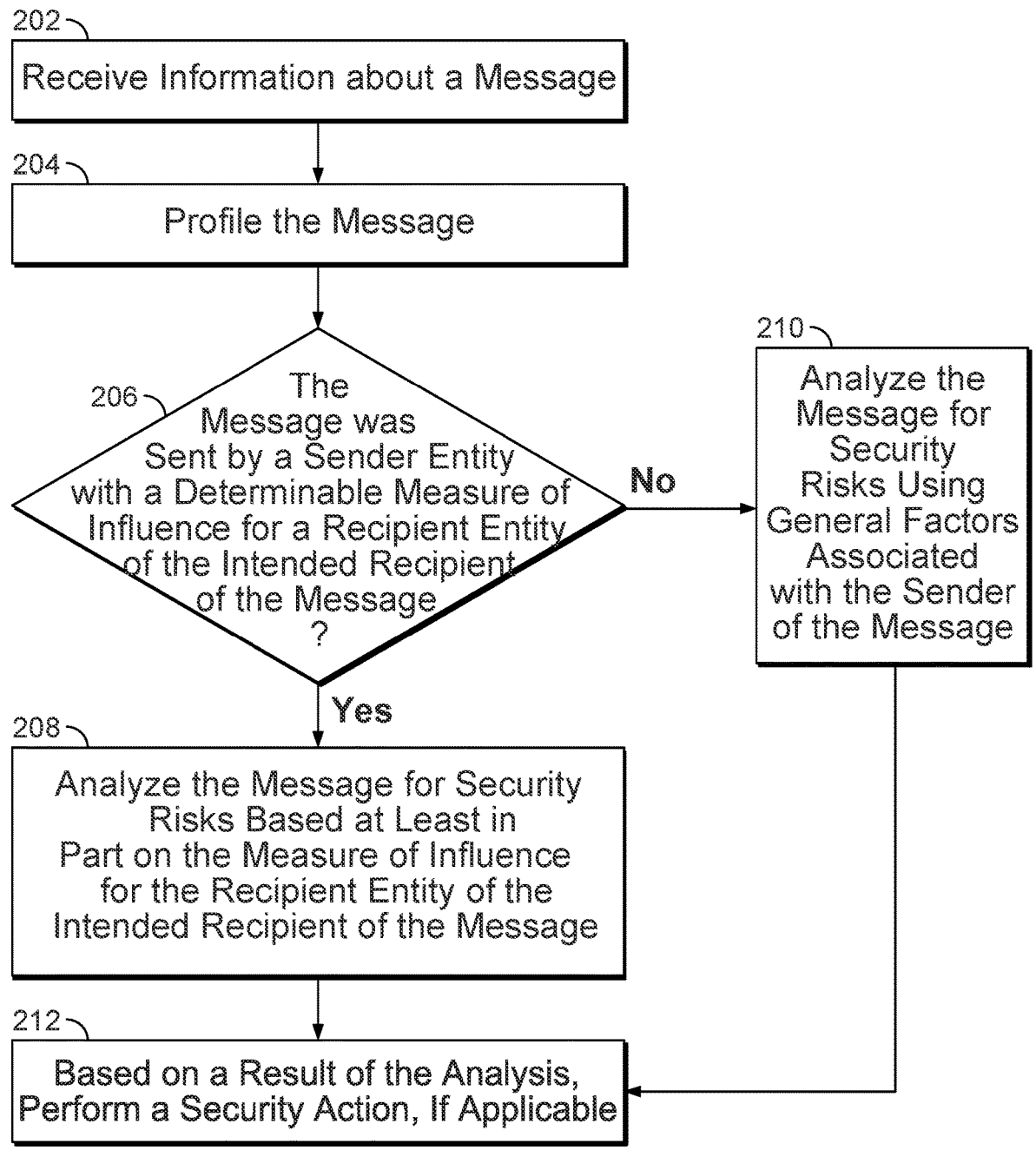
FIG. 2 is a flowchart illustrating an embodiment of a process for analyzing a received message for security risks.

FIG. 2 is a flowchart illustrating an embodiment of a process for analyzing a received message for security risks. For example, the process of FIG. 2 is utilized to detect look alike attacks and account take-over risk of a sender of an electronic message and take responsive action to mitigate potential effects of the risk. The process of FIG. 2 may be at least in part implemented on analysis server 102, gateway 110, and/or message server 106 of FIG. 1.

At 202, information about a received message (e.g., message to be delivered to an intended recipient) is received. In some embodiments, the information is received at analysis server 102 of FIG. 1. The information may include information included in or related to the message. For example, the information includes email address header information including an email address and a display name of the sender of the message. In some embodiments, the information about the message includes contents of the message (e.g., a copy of the message). Examples of the message include an electronic mail (i.e., email), an instant message, a chat message, and any other forms of electronic messages. The information may be received as a part of a computer security analysis and filtering to identify and neutralize security threats prior to delivering the message and allowing an intended recipient of the message to access the message. In some embodiments, each message received for delivery to its intended recipient associated with the system performing analysis of the message is to be analyzed and information about each of the messages is received for analysis.

At 204, the message is profiled. In some embodiments, step 204 is only performed if it is determined that a security risk associated the message is below a threshold (e.g., risk score determined in 208 and/or 210 is below a threshold). Profiling the message includes storing information about and/or included in the message in a database to track historical observations about the sender (e.g., sender entity) of the message and/or to determine/update one or more measures of influence of the sender entity of the message for one or more message receiving entities. For example, in identifying accounts that might have been ATOed or impersonated, messages sent by the account are to be analyzed based on past observations about historical messages sent by the sender and the degree to which a newly received message from the sender deviates from what has been typically observed about messages sent by the account of the sender. In some embodiments, the historical information about messages by the sender for a particular recipient may be combined with historical information about messages sent by the sender for other recipients to determine a combined message profile/history of the sender for use in assessing security risk of messages by the sender for recipient without an established communication history with the sender. In some embodiments, profiling the message includes profiling, tracking and/or storing content and/or header information of the message in a data structure that tracks historical information about messages sent by the sender for a particular recipient. In some embodiments, profiling the message includes profiling, tracking and/or storing content included in the message in a data structure that tracks historical information about types of content typically included in messages sent by the sender for a particular recipient. For example, the data structure tracks keywords and/or content topic/type included in messages sent by the sender for a particular message recipient and keywords and/or content topic/type detected in the newly received message are used to update this data structure. By using the various stored information, one or more measures of influence of the sender of the message for one or more message receiving entities are able to be determined/updated. For example, one or more measures of influence of the sender of the message are periodically updated using the information in the data structures.

In some embodiments, at least a portion of header information of the message is stored in profiling the message. In some embodiments, select information included in the header of the message is tracked and associated with a history message profile of the sender. For example, information in the header of the message that identifies one or more of the following is tracked for the sender of the message: a mail user agent, a time zone, IP address, X-headers, supported character sets, and any desired information of interest in the header. One or more different profiles for the sender of the message may be updated using the message. For example, certain header information and/or content of messages of the sender may be correlated with each other and associated groups of header entries and/or content entries of messages of the sender are updated when profiling the message. In one example, different profiles of the sender are categorized based on different devices used by the sender to send messages to a particular recipient.

The table below shows different header information that is collected to build different profiles about messages sent using different devices of the sender.

recent window of time (e.g., within a threshold time period and/or numerical count of past messages) and timestamps of each associated received message from the sender can be tracked and stored.

In some embodiments, statistics on the commonality of combinations of tracked aspects of messages (e.g., header entry, message body content, etc.) of a sender are determined and updated based on the newly received message. These statistics allow a determination of the likelihood that various aspects of a message would be observed together in the message. This also can be used to determine the likelihood of a new aspect detect in a message from the sender conforms to previously detected changes over time in previous messages from the sender. For example, this information can be used to determine the likelihood that the sender would change from one computing platform to another, the probability that the sender would upgrade their system, and the probability that the sender would use another machine temporarily. Thus message profile data of previously received messages from the sender can be used to determine a Bayesian probability score of a particular message feature being consistent with past observations for a communication between the sender and the recipient, given the context of other aspects of the message and a pattern of previous changes as a function of time.

In some embodiments, profiling the message includes identifying content included in a message signature and updating a data structure that tracks observations about message signatures of messages from the sender and associated context in which particular message signatures were utilized. For example, if a message signature that states "Sent from my iPhone" has been tracked and observed in a

| Feature | iphone | Mac | browser | iPad | Android phone |
|---|---|---|---|---|---|
| DKIM signature? | yes | yes | no | no | yes |
| Mime version | 1.0 (1.0) | 1.0 (Mac OS X Mail 10.1\ (3251\)) | 1.0 | 1.0 (1.0) | 1.0 |
| Content type | text/plain; charset = us-ascii | text/plain; charset = us-ascii | text/html; charset = UTF-8 | text/plain; charset = us-ascii | text/plain; charset = UTF-8 |
| X-Mailer | iPhone Mail (14B72) | Apple Mail (2.3251) | N/A | iPad Mail (14B100) | N/A |
| Message ID | Type 1 | Type 1 | Type 2 (both formatting and subdomain) | Type 1 | Type 2 (both formatting and subdomain) |
| Cipher | TLS1_2 | TLS1_2 | N/A | TLS1_2 | TLS1_2 |

This table shows that by recording the header entries historically associated with messages from the same sender, a prediction can be made in terms of whether a newly received message and aspects of the message in combination are consistent with the past observations. Each trusted sender that has sent a message to a specific recipient is associated with a record that describes what different header configurations have been observed for the sender. This can be done both using a time window approach that emphasizes recently observed headers over very old headers, or an approach that takes into account all saved headers. Along with headers or portions of these, the data structure can store counts (e.g., how many times these were observed) and time intervals for the observations. For example, the number of times a particular message feature (e.g., message header item) was observed in received messages from the sender within a sufficient number of messages sent by the sender using a mobile phone message client and if a newly received message includes this signature but was sent using a desktop computer message client, this abnormality can be detected based on the historical observations about message signatures of the sender.

At 206, it is determined whether the message was sent by a sender entity with a determinable measure of influence for a recipient entity of the intended recipient of the message. The measure of influence that the apparent sender entity (e.g., individual or a grouping/organization/domain) of the message (e.g., based on display name of the sender and/or address of the sender) has on the recipient entity (e.g., individual recipient or a group/organization/domain) can be determined based on one or more previous messages from the sender for the recipient entity of the intended recipient and/or a known role of the sender with respect to the intended recipient. In one example, it is determined whether a measure of influence of the sender for the intended recipient of the message has been predetermined/calculated and/or is obtainable to determine whether the message was sent by a sender with a determinable measure of influence for a recipient entity of the intended recipient of the message. In another example, it is determined whether a role of the sender is determinable to determine whether the message was sent by a sender with a determinable measure of influence for a recipient entity of the intended recipient of the message.

In various embodiments, the measure of influence is determined based on analysis of messages previously sent by the sender entity. For example, volume, breath, and/or content of one or more previous messages sent by the sender entity to the recipient entity are analyzed to determine the measure of influence of the sender entity for a specific receiving entity. The analysis of volume of the messages takes into account the total number of messages sent to the recipient entity and/or the number of messages sent to the recipient entity within a specified period of time. For example, frequency contact denotes an established relationship. The analysis of the breath of messages takes into account the number of different individual recipients the sender has sent messages to and/or is in communication with (e.g., number of individual recipients the sender entity has had a threshold number of message exchanges). For example, a CEO of an organization typically sends messages to a larger number of recipients and has a high influence over the recipients. The analysis of the content of messages takes into account message topic and/or the frequency of use of specific terms or keywords that are associated with influence or heightened security impact/risk. For example, frequent use of terms and keywords related to payment (e.g., "invoice," "payment," "wire transfer," etc.) and/or sensitive information (e.g., "social security number") are associated with a higher measure of influence.

In some embodiments, the measure of influence is based on a role of the sender entity and/or recipient entity. For example, the job role, department assignment, manager/reporting relationship, and any other organization role/relationship of the sender or the recipient entity are utilized as a factor in determining the measure of influence (e.g., sender that is relatively higher than the recipient in an organizational/reporting hierarchy chart of an organization has a high measure of influence; sender from an organizational department of high impact (e.g., billing department) has a high measure of influence, etc.).

In some embodiments, the measure of influence is based on a specification by a user. For example, the user (e.g., administrator, message recipient, etc.) provides a list of trusted (e.g., high influence) message senders, message recipients, and/or communication party relationships and/or not trusted (e.g., high influence) message senders, message recipients, and/or communication relationships. In another example, the user provides access to an address book that identifies trusted contacts (e.g., high influence message senders) of a message recipient. The address book may also identify address groups, tags, and/or other relationship information that can further be utilized to determine the corresponding measures of influence. In some embodiments, the user provides access to a directory, an organization chart, a social network, or other source of relationship/role information that is utilized to determine the corresponding measures of influence based on the identified relationship/connection/role between the identified message communication parties.

Because the sender has a different influence over different recipients, the measure of influence for the same sender entity may be different for different recipient entities. Examples of a recipient entity include an individual recipient or a group of recipients (e.g., members of an organization/domain) and messages from the sender entity may be separated by various different recipient entities for separate analysis to determine a corresponding measure of influence of the sender for the different recipient entities. The measure of influence may be updated dynamically (e.g., after a threshold number of new messages from the sender has been received) and/or periodically (e.g., at periodic intervals).

In some embodiments, the sender entity has a determinable measure of influence for the recipient entity if the sender of the message has an established relationship with the recipient entity. For example, if the sender (e.g., from an email address of the sender) has sent a message to the recipient entity a threshold number of times, if the recipient entity has previously sent a message to the sender entity a threshold number of times, and/or if the sender has been sending messages to the recipient entity for a threshold length of time, it is determined that the sender entity of the message has an established relationship with the recipient entity that can be analyzed to determine the measure of influence. In one example, the sender entity of the message is the established relationship contact of the intended recipient of the message if a threshold number of messages has been exchanged between the sender and the recipient. In some embodiments, a sender model developed for the sender of the message is utilized to determine whether the sender is an established relationship contact of an intended recipient of the message.

In some embodiments, determining whether the message was sent by a sender with a determinable measure of influence for a recipient entity of the intended recipient of the message includes determining/obtaining a measure of influence and/or a trust score associated with the sender entity of the message for the recipient entity.

In some embodiments, if the measure of influence is above a threshold, the sender entity is identified as having a sufficient influence over the recipient entity and otherwise, the sender entity is identified as not having a sufficient influence over the recipient entity. The measure of influence can either be a binary predicate or a real number. In a simplified example, the measure of influence can be set to 1 (e.g., indicating established relationship/influence) if each of the two parties has sent the other at least three messages over a course of no shorter than one month, and otherwise to 0 (e.g., indicating not an established relationship/influence). In another example, the measure of influence can be a function of the number of messages received by the recipient organization sent by the sender and/or an organization of the sender and the number of messages that have been identified as undesirable, whether by the classifier or by a recipient.

In some embodiments, the measure of influence of the message identifies the extent to which the system recognizes the sender based on its historical message traffic; as such, it may not be limited to the history of the recipient or her organization. For example, a message from a sender with a very brief history would receive a low measure of influence, especially if the communication pattern is similar to that of previously identified malicious senders. A sender with a longer history and low traffic volume (but very few or no complaints of past abuse) would have a higher measure of influence, and a sender with a long history, high volume, and few or no complaints would correspond to an even higher measure of influence.

In some embodiments, the measure of influence is based at least in part on whether the sender of the message is included in a contact list (e.g., address) of the intended recipient. For example, it is determined whether the sender of the message is included in the contact list of the intended recipient and a sufficient number of messages were previously exchanged between the sender and the recipient.

In some embodiments, the measure of influence is based at least in part on a social, organizational, communication, collaboration, role, business, and/or other relationship information of the sender with respect to the recipient entity. Information about the sender and/or other users connected/related to the recipient entity may be obtained by requesting the desired information from a service (e.g., an external third-party service accessed via an Application Programming Interface such as Microsoft Graph API). For example, an identifier of the intended recipient of the message is provided to the service, and the service provides a list of other users connected to the intended recipient (e.g., connected via a social network, organizational relationship, business contact, etc.) that is ordered by the various other user's roles and relevance to the intended recipient (e.g., order based on previous communication, collaboration, business relationships, etc.). In another example, an identifier (e.g., email address) of the sender of the message is provided to the service and the service provides information about the sender (e.g., information about the sender gathered across various different message repositories, contact lists and social networks). This information about the sender is used to assess a strength of a relationship between the sender and the recipient entity of the message (e.g., along with message history between them).

If at 206 it is determined that the message was sent by a sender with a determinable measure of influence for a recipient entity of the intended recipient of the message, at 208 the message is analyzed for security risks based at least in part on the measure of influence for the recipient entity. For example, in determining a security risk associated with a received message, an impersonation risk score is scaled (e.g., multiplied) based on the measure of influence, and the impersonation risk score is determined including by determining whether the message appears as having been sent from the sender entity but is actually sent from a source not trusted to be associated with the sender entity. The message may appear as having been sent from the sender entity due to a similarity between a sender display name identified in the message and a known display name of the sender entity, and the message may be identified as having been sent from the source not trusted to be associated with the sender entity including by determining that a sender email address identified in the message is not known to be associated with the sender entity.

Due to its central role in most organizations, email is currently posing the biggest risk to organizations. Whereas fifteen years ago, typical email-based threats were relatively easily spotted and only felled the most gullible end users, the growing sophistication of targeted attacks has made it difficult for anybody to decipher what is safe and what is a threat. Even security specialists are known to have been conned using social engineering tricks.

Mechanisms to identify fraudulent emails and to protect people and organizations from security breaches are designed to identify deviations from ordinary email communication. These deviations are best detected using a combination of expert-designed rule systems corresponding to principal types of attack, in combination with machine learning methods used to generalize among variants of one principal attack type.

Inherent in many models are some false positives, that is, emails that are classified as dangerous while they are not, and false negatives—malicious emails that are not blocked. Everybody understands the risk of the latter, but not enough people give a lot of thought to the former. However, it is commonly not so well understood that high false positive rates have a practical impact on false negative rates as well. Often the practical limit that determines the threshold on scoring continuum for identifying attacks is gated by the false positive rate. Meaning in practice, the false positive rate is often held constant by operators by tuning the scoring threshold. This means more actual attacks would get identified by considering "lower confidence" potential attacks to be malicious.

While typical cybersecurity events can be existential threats to exposed organizations, they are also exceedingly rare. In fact, it has been recently measured that the prevalence rate of Business Email Compromise (BEC) emails is approximately 0.7 ppm—that is, there is on average only 0.7 BEC emails per one million emails transmitted. This should be seen in context of the fact that this is a threat estimated by the FBI to correspond to in excess of $5 billion of exposed losses for the last two years alone. In contrast, most emails are benevolent. Therefore, even a small false positive rate can have an outsized effect since there are so many more good emails that can be misclassified than there are bad ones. In other words, by not attending to addressing false positives, a security solution can have a detrimental effect—on a daily basis—as hundreds of thousands of business-critical emails may be mistakenly classified as dangerous and blocked. Another much more subtle effect of false positives is a lack of trust in the infrastructure. This, in turn, creates a security risk: if you suspect that the emails in your spam folder may be important and benevolent emails, you may be at risk of accessing them. This is what happened to the infamous "John Podesta email," in fact, it was pulled out of the spam folder. Thus it is desirable to reduce fake positive rates and false negative rates for electronic communications, such as email.

Traditional email security methods apply the same standard of filtering across all end users. In many contexts, this makes a lot of sense. For example, it does not matter what end user visits a site attempting to perform a drive-by download of malware—it is undesirable no matter who it is. However, in terms of email traffic, uniform filtering poses a risk of higher false positive rates, which in turn is likely to introduce increased security exposure of end users, whether due to active end-user circumvention of security measures or due to a rebalancing of thresholds to reduce the total number of false positives, resulting in a higher number of false negatives for high-risk targets. The table below shows an example of how various types of attacks are of high concern (marked with an 'x') to various groups of users of a typical organization. This example is intentionally simplified, as a person skilled in the art will appreciate, and many more types of threat variations exist as well as many more types of end-user groups.

| Role | phishing | malware | payments | sensitive data |
|---|---|---|---|---|
| Finance | x | x | x | |
| HR | x | x | | x |
| Everybody | x | x | | | attack

The reason that payment-based attacks are mainly a concern for end-users in financial roles in an organization is not that these are the typical targets of Business Email Compromise (BEC) attacks involving requests for wire transfers or payments of invoices—rather, it is because these end users are, practically speaking, the only people for whom such an email would pose a potential threat: if a randomly chosen employee of a typical organization were to receive a payment request, he or she most likely would not know what to do with it, and would either ignore the request or start asking around. In the latter case, the sending of the request would likely spur discussions—such as why the recipient of the request was asked to perform the payment—resulting in somebody recognizing that the request is most likely fraudulent. As a result, fraudsters do not send payment requests to arbitrarily chosen employees of a targeted organization, but to employees whose day jobs involve performing payments. Similarly, criminal requests for sensitive data, such as W-2 data, are typically sent to HR, since this is the group of employees with access to such information. At the same time, whereas a criminal may benefit much more from phishing an employee in finance, HR, or a leadership position than an employee who does not have access to sensitive data or corporate bank accounts, there is still a benefit associated with compromising an account (e.g., for example, the attacker compromises "alice@corp.com," but then sends email as "Bob <alice@corp.com>"). Therefore, while the threat is not the same for all employees, there is a substantial threat associated with phishing for all employees. However, for employees with access to sensitive passwords, such as AWS passwords, the risks of course are much greater than they are for employees who do not, so while the table shows all groups of employees potentially being at risk, there are users for whom the risk is greater, and accordingly, for whom the filtering should be less permissive (this is not reflected in the previous simplified table). A similar argument can be made in the context of malware risk.

By applying the same threshold to all employees, unnecessary errors are introduced. For example, many deceptive email attacks are based on an attacker taking a name of a party that is trusted to the targeted recipient of the email. For example, in an organization where the CEO's name is Alice Anderson and the CFO's name is Bob Brewer, a criminal may create a free webmail email account and set the display name to "Alice Anderson," then email Bob Brewer from this account, asking him for a quick favor. In some embodiments, the security systems detect that the sender of an email has a display name that is trusted (whether to the recipient or generally within the organization of the recipient), but that the sender email address is not recognized as belonging to this trusted party. However, names are not unique, and in an organization of 10,000 employees it is very likely that there will be one employee—if not more—who knows another person whose name is Alice Anderson, and whose email address is not that of the CEO of the company. If all email from this other Alice, who is not a fraudster in this example, were to be blocked that would be a problem for the employee who did not receive his or her email from this other Alice. Similarly, if the system would not block such emails, but simply include warnings in the emails, then this may lead to unnecessary desensitization of employees to warnings; furthermore, if an alert is also sent to an admin within the organization or associated with the security service provider, this leads to a potentially large amount of unnecessary work that in turn may take away the attention of the admin from a real security problem. Accordingly, it is important to make filtering based on role, and based on history. If an incoming email does not contain content that indicates that it is a potential malware risk, and also does not contain content that indicates that it is a potential phishing risk, but does contain content that could be a financial threat (such as mentioning a bank account), and also does not contain content that indicates it is a data exfiltration risk (such as a request for trade secrets or confidential employee documents within HR), it matters whether this email—from an unknown Alice, say—were to be sent to a person in finance or to a person who works in the mail room. The email to a person in finance is potentially a worrisome threat—or at least with a sufficient probability that it may warrant the attention of an admin before it is delivered—but a similar email to a person in the mailroom would not be considered a sufficient threat for an admin to be sent an alert. Therefore, measure of influence-based filtering can reduce error rates, labor costs and efforts, and increase security and productivity. In some embodiments, a sender measure of influence can be determined based on previous message history and/or a role of the sender determined by accessing a database, such an active directory, in which all employees are listed along with their roles, and from which role-based information would be automatically extracted and used to configure filtering rules and thresholds. In some embodiments, a role-based information is extracted from email content, by automated screening of all or a portion of all emails to a recipient or from a sender, and association of keywords with either the sender or the recipient or both. A user or an address group that gets associated with keywords matching financial resources would be placed on a list of people for whom filtering related to financial resources should be more restrictive, whereas a user whose account is not on this list would be associated with a more permissive filter configuration.

In one embodiment, the message (e.g., email) is processed before it is delivered, and it is determined whether it is associated with a quantified risk assessment exceeding a threshold risk. If it is determined that the email is associated with such a risk, the nature of the risk is classified according to one or more classifications, including malware, phishing, payment fraud, or request for sensitive data. An email can be associated with multiple risk classifications. For each listed recipient of the email, one or more role predicates is determined, e.g., by performing a lookup in a database. One such predicate may be "role not determined." Based on the role predicates, the system performs a risk assessment based on the risk determination and risk classification, and an action is selected. For an email with multiple recipients, different actions may be selected for different recipients. Example actions include delivering the email as-is, delivering the email with an included warning, notifying an admin, blocking the email, placing the email in the spam folder of the recipient, modifying the content of the email, including URLs attachments and text, challenge-response mechanisms sent to the sender, or any combination of these. In one alternative embodiment, an additional and in-depth risk assessment is performed conditional on a rule that takes as input the initial risk assessment, the initial risk classification, and the role-based classification of at least one of the recipients. This in-depth risk assessment may involve a computationally intensive process, such as detonation in a sandbox, OCRing contents of attachments, static analysis of content characteristics, machine learning-based semantic analysis of message content, or human review by an admin. As a result of the risk assessment, an action is selected and performed.

In some embodiments, the rules utilized to analyze the message for security risks are based at least in part on the measure of influence for the recipient entity. For example, the measure of influence is used to automatically configure how and/or which of the different filter rules are applied. The system accesses an email repository, observes at least one of outgoing or incoming traffic, and determines what users communicate with each other, for recipients of emails within a protected organization. A record is created for each user within the protected organization, and a list is generated and associated and stored in the record. This list comprises the email addresses and display names of the users with a measure of influence over a threshold value (e.g, with whom the user of the record is communicating more than a threshold amount, such as at least two emails, and for at least a threshold amount of time, such as over a course of at least one week, etc.). This list is referred to as the influence list T. For user i, we refer to this list as Ti. For each user of the influence list Ti, the system determines, based on at least one of the subject line, the content, the attachments, and the contents of the attachments, whether the user i corresponds with a user j that is part of Tj about a topic of relevance. For example, money is one topic of relevance; bank accounts another; service account credentials a third; employee tax information a fourth; and urgent matters a fifth. These are only example categories. Each category corresponds to one or more keywords associated with the category. For example, the money category may comprise the terms "bank account," "transfer," "IBAN," "SWIFT," "routing number (these are all in one equivalence class that corresponds to financials)"; while the urgency category comprises words such as "right away," "urgent," etc. These, in turn, are in a second equivalence class. While "right away" is not exactly the same as "urgent," they are equivalent in the sense that they both correspond to time pressure, which is what this class contains. A person skilled in the art will recognize that there are many other words and expressions in this and other equivalence classes, and will know that these examples are for clarity only. The system maintains a collection of such categories, and the system may set a flag associated with each entry in the influence list, to convey the membership of the user pair (i,j) in these different categories. The system also sets flags corresponding to roles for entries corresponding to users j in Ti, where these roles correspond to role categories such as "finance," "HR," "C-suite," etc. These flags (both those inferred from automated email scrutiny and those inferred from scanning active directory entries) are referred to as role flags. A person skilled in the art will also appreciate that there are additional methods to set the influence lists and the role flags, such as manual curation, access of related information using an API provided by an external service provider with end user insights, automated scanning of public documents including a website associated with the organizations the users i and j are associated with, and more.

In an example, when an email sent to a recipient i is processed, the risk profile of the message is determined using sender data, recipient data, email content data, trust data, and measure of influence/role data. Example rules include:

Consider an email E from a sender j to a recipient i associated with a protected organization.

1. If the message E contains an attachment A that is deemed to have a risk of being associated with malware, then a security action is taken. Example actions include removing the attachment A, not delivering the email E, and more. In one embodiment, the action is selected based on whether j is associated with Ti: if so, then the attachment may be removed, the sender notified of the risk, and an admin associated with j notified of the fact that j may be compromised. The system also flags j as being a high-risk sender until further notice, causing additional scrutiny of recent and future messages from j, where recent messages can be scrutinized by reviewing logs and mailboxes of users of the protected organization. If j is not part of Ti then the message E may simply not be delivered. Some users, whose work involves receiving malware samples, may select to simply get a warning when an email E they receive contains a likely malware sample, without any action taken to block the sender j, to notify an admin of j, etc.

2. If the message E contains a URL that is associated with a high risk, a warning is preferably included, or the message E is modified to remove or replace the link, or the message is blocked. Again, exceptions are made based on the role of the recipient, where this role may be automatically inferred based on prior activities, determined from active directory entries, or manually configured.

3. If the message E contains language associated with a role-based category of words or phrases, and the sender j is on the trust list Ti of the recipient, then the email is delivered. If the sender j is not on Ti but has a display name that is the same as or has a small Hamming distance or other string distance from a user j' that is part of Ti, then a security action is taken. This may be to include a warning. However, if j is not part of Ti but has a display name whose similarity with the display name of j' exceeds a threshold, and the message contains words matching a class of words associated with a role-based flag of j', then a more stringent security action is taken, such as blocking E, sending a copy of E to an active defense (AD) system, and notifying an admin of the message. Included in this notification N is preferably automatically derived information associated with the reason of the classification, such as "The sender is not a trusted party, but has a display name DNj that matches the display name DNj' of party j', whom recipient i is likely to have a trust relationship with. Click here to set sender j as legitimate. Click here for more information about the location of sender j."

In addition, it may be observed that senders j in Ti with role-based flags that match those of recipient i may also send messages to other recipients in the same organization as recipient i, where these other recipients i' have the same or a similar role as i. Therefore, such entries in Ti may also be listed as likely trust relationships of Ti', where this could be identified by setting a flag associated with trust inheritance in a record for j created in Ti'.

Another aspect of false positive reduction is to identify and process emails from an SaaS service, web service, or multi-tenant service from which an email sender might be sharing content. For example if a user wishes to share a document from Dropbox, Google Docs, Survey Monkey, etc., the email address will be associated with these services but the name will belong to the user. For example if Alice Anderson shared content from Dropbox, the "from address" would be 'no-reply@dropbox.com,' but the display name would be "Alice Anderson." The mismatch between this and the "from name" could generate a false positive by some solutions. Also, if Alice Anderson is associated with another email address to the recipient, that could lead a security system to identify this as a potential risk, whereas it is not, assuming the Dropbox account is owned by the "correct" Alice Anderson. An email like that could therefore be blocked on suspicion of fraud, unless the system recognizes this as a special case. In some embodiments, the volume of false positives generated by this category of email is reduced by using an Address Group feature. This is a feature that enables companies to list executive employees or personnel they deem to be high risk and exceptions, and alternative emails associated with those people that will not be blocked. It can be manually provided, extracted from past traffic or archives, or generated from a directory service (e.g., such as Active Directory or LDAP) using a set of rules that identify the roles that correspond to the address groups. For example, one address group is set as any person who is in the C-suite; call this the C-suite address group. Another address group is set to any person in HR; this group may be referred to as the HR address group. In some embodiments, any message from a person from the C-suite address group to the HR address group is identified as legitimate, except if the content is indicative of an account take-over. In some embodiments, an email from a sender that is not in the C-suite address group, but whose display name matches a member of the C-suite address group is recognized, and this is classified as potentially risky if sent to a person in the HR address group. In one embodiment, potentially risky messages are modified by including a warning. In another embodiment, the system performs additional scrutiny of such messages, e.g., by performing OCR of image-based texts, scanning pdfs, and identifying any high-risk keywords from the content including attachments, where words and phrases corresponding to common attacks on HR employees, launched by attackers posing as C-suite employees, are scanned for. Such keywords comprise terms such as "W-2," "W2," "tax information," "SSN," and more.

A further consideration is distinguishing between the actual account belonging to a real user at a service sending mail purporting to come from a given user by name while making use of a common sending account such as 'no-reply@dropbox.com.' In this case, two messages sent from "Alice Anderson <no-reply@dropbox.com>" would be distinguished by additional features that map to the account at the common service. In the case of Dropbox, the Reply-To header would be "Reply-To: a.anderson@company.com" in the case of the CEO Alice Anderson and "Reply-To: compromised123@gmail.com" in the case of a fraud attempt. By either having prior knowledge of the actual account used by Alice Anderson (a.anderson@company.com) or due to observation over time of consistent activity, the system distinguishes messages with different account identifiers from each other and identifies those that belong to malicious or benign action. A benign message is one sent by a non-malicious user sharing a common name. In the Dropbox case above, such a user might have a Reply-To header of "alice@benign.example.com." In one embodiment, a database of common names is used to identify likely names to exclude from display name threat assessment. In another embodiment, prior knowledge entered by an operator of a system, or observations over time identify non-malicious uses of common identifiers (the reply-to).

Another aspect of false positive reduction is to identify and process emails from personal accounts outside the control of an organization. These might be from common consumer email providers such as Gmail or Yahoo Mail, from which an email sender might send email to colleagues. For example, if Alice Anderson were to send an email to a colleague from her private 'Alice Anderson <a.anderson@gmail.com>,' a system attempting to detect misuses of the name "Alice Anderson" may consider this malicious without a mitigation effort in place. It is common for people to use their private addresses interchangeably. In one embodiment these personal addresses may be manually added as exceptions to those listed in the address group.

In another embodiment, the matching of exceptions to the address group is automated. The address group has been a mechanism for organizations to manually list the private addresses of employees that generate false positives. However these manual efforts tend to be reactive. The addresses are often added after a false positive has occurred and emails have already been blocked. Automating address group matching reduces the labor burden associated with reducing the incidence of false positives and it also detects potential false positives before the first one occurs, reducing their overall incidence. Automating the address group feature works in two manners to perform the appropriate matching between addresses and either service-based addresses that are legitimately associated with a sender or a private address.

Thus, in some embodiments, the security risk is determined including by determining whether the electronic message was sent from a message account belonging to a list of message accounts trusted to be associated with the sender entity. The list of message accounts trusted to be associated with the sender entity may be at least in part identified by a user, at least in part automatically identified based on an analysis of the previous electronic messages sent by the sender entity, and/or at least in part automatically identified based on an identification of a service identified as being utilized by the sender entity and known to send electronic messages on behalf of the sender entity.

In the embodiment of address group automation, an email sent from an SaaS service, web service, or multi-tenant service that is associated with a member of the address group is recognized as legitimate by implementing pattern matching across organizations. If service-based emails are common across at least two organizations they are classified as exceptions for all personnel listed in the address group. For example an email matching the address group with a full from address such as 'Alice Anderson <no-reply@linkedin.com>' would be automatically enabled. LinkedIn is a very popular service, the exception 'no-reply@linkedin.com' occurs in the address group of more than one organization. Anything that has already been added manually by more than one organization is an automatic exception for all address group matches in the new implementation. This will be updated at regular intervals to maintain a current list of these global exceptions.

In another embodiment of address group automation, an algorithm is utilized to recognize private addresses. String matching is used to detect whether an email that appeared to be from a known person but an unknown address might in fact be a private and legitimate address. If an address group hit occurs, the address does not have a very low trust score, a classification that is based on other models further upstream in the stack, and if it does not match one of the generic addresses such as 'no-reply@dropbox.com,' a string matching algorithm is applied to measure the proximity of the from name and the local part of the email address. For example if an email from 'Alice Anderson <a.anderson@gmail.com>' is received it would make an address group hit. Alice Anderson would match a name on the address group but the email address would not be recognized and is therefore deemed potentially malicious. First a trust score would be generated further upstream and it would be deemed either trustworthy or not. If it is classified as trustworthy, string matching of 'Alice Anderson' and 'a.anderson' is performed. If it is a strong match an exception is automated and the email is delivered. If the string matching score is low, for example if the "from name" is 'Alice Anderson' but the local part of the address was 'a.and123,' the email would be classified as fraudulent.

In another embodiment of address group automation, a mechanism is utilized to automate the population of the organization personnel who are initially added to an address group. The above method automates matching of exceptions. This mechanism automates the initial organization directory. There are cohorts of people who are typically added to the address group. False positives are prominent in the manual development of the address group due to the time lag associated with internal changes and also to the time it takes to initially build a new organizations address group. This has been automated by the design of an algorithm to map cohorts of people within an organization who email one another. These cohorts or clusters are mapped based on volume of contact, subject of contact, assortativity, modularity, and centrality of people. These mappings automate the identification of C-suite personnel, the groups of people who discuss financial or other sensitive information, and people with more or less communication within an organization. Based on historical data it is known which clusters of personnel within an organization are added to an address group and with this clustering algorithm we can generate the same clusters in new organizations or update current ones as they develop.

In one embodiment, it is determined what services related to OAuth that a protected organization uses. This can be done in a variety of ways, as described below. When an email E is processed by the system, the system determines whether E contains a hyperlink, and if so, whether this is associated with an OAuth request. If it is, then the system determines whether the app associated with the Oauth request corresponds to one of the Apps that has been whitelisted for this organization or, more specifically, for this user. If there is a match, then the email is considered secure; otherwise insecure. In one embodiment, the determination is made when the email is first received, and before it is delivered, by the system automatically visiting the associated website. In another embodiment, the URL is replaced at the time of initial processing with a URL corresponding to a proxy service associated with the system. This URL is preferably unique and encodes the original URL, along with information relating to the email E, making it possible to retroactively identify this email, its sender, and recipient. When a user clicks on a proxy service URL, the corresponding website is loaded by the system and the match process is performed. An unsafe email E is preferably removed from the mailbox of the recipient, or replaced with a warning/explanation; furthermore, the system identifies additional emails sent by the same sender or having other similarities to E, and processes these, which may include deleting such emails, adding warnings to such emails, notifying admins of such emails, and verifying the App identity associated with such emails, where applicable. In one embodiment, the organization whitelist is initially configured as a list of common and well-recognized apps that are believed to be secure; and then augmented with apps that are requested by service providers and email senders that have a trusted relationship with the organization, as determined by entries in Ti lists of users of the organization. The whitelist is either organization-wide, based on a role within the organization, based on an individual configuration, or a combination of these. One part may be manually configured, another configuration derived for a similar organization that is protected by the system, another determined by an authorization and identity management service used by the organization, and yet another determined based on traffic and archives associated with the organization, or a combination of these. A person skilled in the art will also recognize that there are other ways to configure a whitelist. The same approach applies to other forms of Single-Sign On (SSO) access, such as SAML-based access approaches, where the App corresponds to the certificate or other identifier used by a service provider.

A further aspect of the disclosed technology is a system that automatically generates a log of security incidents, comprising classified attacks, where detected attacks are classified based on the role(s) of the impersonated sender; the role(s) of the intended victim(s); the type of attack; and the action taken by the system. The roles are identified based on the role-based filtering predicates described above. The type of the attack comprises a classification that is based on whether the email had a potentially malicious attachment, a potentially malicious URL, keywords belonging to an equivalence class of terms associated with one or more attack types, industry classifications associated with the sender's domain identified through third-party databases, keywords associated with prior emails sent from the same sender, etc. Each attack is also associated with a label that identifies a collection of associated attacks, where the association is at least one of the sender email address; the sender infrastructure; the sender IP address range; and/or the type(s) of impersonation methods used in the attack, such as spoofing, display name deception, use of a corrupted account. The log may be a spreadsheet or a database file that can be queried, and is associated with at least one report whose configuration is stored in the system and which corresponds to at least one query against the database of the log of security incidents. In one embodiment, such reports are automatically generated and transmitted to admins associated with the protected organization. In another embodiment, a web-based interface is provided to allow admins to search the log. Furthermore, the log of security incidents is used to automatically calibrate the system to improve the protection of end users while minimizing the error rates. For example, if it is found that a small set of users is predominantly impersonated, and another (potentially overlapping) set of users is predominantly attacked, while other users are rarely if ever impersonated or attacked, then the system automatically modifies thresholds associated with filtering rules to perform more stringent filtering for emails associated with commonly impersonated or commonly attacked users, while applying a less stringent filtering to other types of users. This also may be applied to users based on role, as will be understood by a person skilled in the art, creating a generalization of the filtering modifications. A further aspect of the automated modification of filtering rules and configurations includes determining common types of attacks, based on their classification, and making the filtering of these more stringent for users who are commonly targeted by such attacks, both based on the actual identities of these and based on the roles. For example, if a first employee is commonly targeted by a particular type of attack then the filtering is made more stringent for this first user, but also for a second user with a similar role as the first user. The resulting rule set comprises a rule-based filter set, which can be applied to another organization from where it was first developed. That means that a filter set based on roles and attack types can be generated, then ported to another organization that is also a protected organization. This can be done either in addition to filter sets used for this new organization, or as a bootstrapping of the protection of the new organization. Multiple role-based filters derived from different contexts and organizations can be combined to form a new composite role-based filtering system, and applied to an organization, whether in addition to other rules or alone.

Systems that attempt to detect malicious impersonation of email addresses (such as in certain classes of phishing attacks) face the problem that often legitimate third-party services or IT infrastructure systems also perform address impersonation or spoofing. For example, some calendar and schedule management systems send mail on behalf of users when adding or removing participants in a meeting or updating the details of a meeting. The author of these changes may be a participant in the meeting, an IT admin, an administrative assistant to a participant in the meeting, an outsourced scheduling contractor, an automated scheduling productivity tool (such as a CRM system) or automation within the schedule management tool itself, etc. In these cases the scheduling tool will send email updates describing the change. These often identify themselves in the "From" header of the email message as the original author of the scheduled event. If the event includes participants from different organizations, they may receive a message from a server (the schedule management tool) managed by one organization that differs from the purported originator of the message displayed in the "From" header. In these cases the scheduling system looks and acts like a malicious impersonation. Thus identifying these cases is an important mechanism for limiting the impact on normal business operations of improperly filtering or otherwise considering a scheduling update malicious (falsely so) and disrupting normal communication.

Messages originating from a calendar server will typically spoof the owner of the meeting. For example:
  A@customer.com sends invite to B@partner.com
  B@partner.com invites C@customer.com to attend from the Calendar APP UI
  The partner.com server will then spoof A@customer.com as it sends the invite to C@customer.com
Microsoft office calendar and on-prem Exchange typically both do this. However, with Microsoft office at least, the message will be DKIM signed by the tenant of the partner server allowing to build account/tenant level trust associations for calendaring related messaging. In an example, a calendar server is "spoofing" gmail.com. The security service associated with the recipient must determine whether this spoofing is "benevolent" or malicious. In this case, it is benevolent, but with another gmail user, it easily could have been malicious. Consider a first example. We will show the headers only, for simplicity:
  From: Jacob Rideout <jacob.rideout@gmail.com>
  To: "rsullivan@agari.com"<rsullivan@agari.com>
  Subject: Fw: Invitation: Test Event @ Fri Nov. 10, 2017 11:30 am-12 pm (EST)
  (jacob@a77online.info)
  Sender: Jacob Rideout acob@a77online.info>
  Authentication-Results: mx.google.com;
    dkim=pass         header.i=@a77online.info header.s=selector1 header.b=nL9btutl;
    spf=pass    (google.com:    domain    of jacob@a77online.info designates 104.47.40.45 as permitted                                                        sender) smtp.mailfrom=jacob@a77online.info;
    dmarc=fail   (p=NONE    sp=NONE    dis=NONE) header.from=gmail.com In some embodiments, a message is identified as originating from a calendar or schedule management system by either one or more of the following factors: the presence of certain headers, IP addresses known previously and stored in a database to be calendar servers, the content of the message containing known calendar update protocols or attachments such as iCalendar/.ics [RFC 5545] files or metadata, etc. In combination with the identification of the message as calendaring tool originated, and the presence of the "From" header domain not usually authorized to send on behalf of the organization controlling the calendaring server, the risk that the message specifying the underlying calendaring event was created by the purported "From" author in the course of normal business operations between the interacting parties is determined. In one embodiment, this includes managing a database or log of messages sent outbound from an organization to any calendaring servers. When a message is received back in the context of update or change or addition of other matches, matching either internal identification numbers, or named ID, or subject lines, this is considered to be low risk and a continuation of the previously known schedule event interaction. In another embodiment, a database of parties external to the organization known to interact and schedule events with another organization is maintained. When a message is known to be scheduling related, and is sent by authorized systems between these parties, the message is considered low risk. In another embodiment the content of the schedule metadata and email message content are assessed for risk factors such as links to external systems not usually used in scheduling interactions, phone numbers that would indicate risk (e.g., such as to third parties located in countries outside the normal business of the organization), or specific keywords indicating business activities with greater risk, such as the transfer of funds. Messages with low risk in this context may nevertheless be considered malicious due to additional mechanisms being used to assess the overall threat messages pose to the organization employing the filtering system.

Systems that attempt to identify malicious email, such as phishing attacks, often rely on mechanisms that determine if a given email server, identified by its IP Address, is authorized to send on behalf of an author domain. Existing mechanisms for this include implementations of the SPF, DKIM, and DMARC protocols as well as proprietary mechanisms. However, email sent for services that host multiple customers on common infrastructure make the use of IP Address-based authentication insufficient, as one customer of such a service can often purport to be another customer. DKIM and other message-based public/private key cryptographic methods (such as s/mime or pgp) can mitigate this, but are limited to messages under control of the customers, not messages generated by the service, purporting to come from a user of the service. Further, to the extent that customers of these services can avail themselves of cryptographic identification mechanisms, they nevertheless remain limited in deployment due to their complexity.

Thus a receiving system of messages from these commingled, common-customer, multi-tenant services benefits from a means of distinguishing specific customers between each other.
Example common service:
GOOD:
   From: "Alice Anderson (via Dropbox)"<no-reply@dropbox.com>
   Reply-To: alice@good.example.com
   Received: from 54.240.27.15 by mx.google.com
   Authentication-Results: DMARC=pass
MALICIOUS:
   From: "Alice Anderson (via Dropbox)"<no-reply@dropbox.com>
   Reply-To: evil@evil.example.com
   Received: from 54.240.27.15 by mx.google.com
   Authentication-Results: DMARC=pass
BENIGN:
   From: "Alice Anderson (via Dropbox)"<no-reply@dropbox.com>
   Reply-To: alice@benign.example.com
   Received: from 54.240.27.15 by mx.google.com
   Authentication-Results: DMARC=pass This service sends email purporting to come from Alice Anderson in each of the three cases above. Also in each of these cases, it is presumed the message has been verified to authentically originate from the service provider. In the first case, the message was generated due to an action in the service (such as sharing a document) caused by Alice Anderson. The message is legitimate (presuming Alice's account hasn't been compromised) and should be considered authentic on an account level. In the second case, the message was generated by a malicious actor, but nevertheless has a "From" header that fully matches the message sent by the true Alice. Likewise the third message was sent by an Alice Anderson, but not the same Alice Anderson as in the first case, due to the name being in common use. This latter case is considered benign. In one embodiment, a mapping of message elements that contain account identifiers including message headers (such as the "Reply-To" header in the example above), sub-parts of the message headers, certain formatted portions of text in the body of the message, or parts of links in the body of the message is maintained. These are then used to extract an account identifier for each message and assess it for "account level" authenticity. That may include using known information about the organization, such as manually maintained lists of identifiers for the organization's commonly used services or identifiers observed for a sufficiently long duration to be considered as belonging to the organization, and employees or second-parties (such as a customer or vendor) of the organization as determined by persons skilled in the art.

In some embodiments, the message is analyzed for security risks using historical observations associated with the sender of the message with respect to the intended recipient of the message. An example of the historical observations is the historical observations updated in 204. The historical observations include information about messages from/to the sender of the message to/from the recipient of the received message. In some embodiments, there exists a plurality of aspects of the message to be analyzed using the historical observations, and each aspect is analyzed to determine a risk component score associated with each component. These component scores are then combined (e.g., added, weighted then added, averaged, etc.) to determine an overall risk score (e.g., at least one of the component scores are based on the measure of influence). In some embodiments, each of the component scores is associated with one or more specific types of risk and a separate total score is calculated for each of the different types of risk based on its associated component scores. For example, there exists ten risk component scores and five of the component scores are only associated with a malware risk type, four of the component scores are only associated with a phishing risk type, and one of the component scores is associated with both the malware risk type and the phishing risk type. In this example, a total malware risk type score is calculated using the six of the ten risk component scores that are associated with the malware risk type while the total phishing risk type score is calculated using the five of the ten risk component scores that are associated with the phishing risk type. Examples of the aspects of the message analyzed using historical observations include message content keyword, a mail user agent, a time zone, an IP address, an X-header, supported character sets, a message signature, and any information about the message.

In some embodiments, using past observation data generated by profiling past messages from the sender to the specific recipient of the message, various data and statistics as well as clusters of metadata/configurations/content of messages that are likely to be observed together in combination in a message from the sender can be determined. For example, using past observation data generated by profiling past messages from the sender, statistics on the commonality of various combinations of metadata/configurations/content of messages have been determined and stored in a data structure. Using this information in combination with identified information in the contents and/or header of the message, a likelihood the received message conforms to a typical message from the sender for the intended recipient is determined. This likelihood takes into account statistics of likely changes over time. For example, the determined risk reflects the likelihood that the sender would change from one platform to another, the probability that the sender would upgrade their computer system, and the probability that the sender would use a new machine temporarily. Thus, a component risk score value for an aspect of the message may be computed using a Bayesian probability score of the particular observation/feature/content/metadata being consistent with past observations of communications between the sender and the recipient, given the context of other aspects of the message and a pattern of previous changes as a function of time. In some embodiments, past observation data about messages from the sender is analyzed to determine a probability that a combination of features/contents/metadata of the message being analyzed is likely to be exhibited together and this probability is utilized to determine a risk component score.

Therefore, in some embodiments, a risk is identified by determining the conditional probability of a set of message aspects, given the past observations relating to the sender, the sender's organization, and of users in general. It may also take into consideration the meaning of mismatches, e.g., upgrades and potential changes from one phone to another. IP addresses and associated IP traces may also be taken into consideration, along with data about the common case for the considered user. Any aberration is identified, and a risk score is computed from the conditional probability of the observations. This may be done by comparing the probability to at least one threshold and assigning an associated risk score, by algebraically converting the probability to a risk score, or a combination of these approaches. The risk score is also affected by the exposure of the recipient to attacks, message content, and other risk identifiers.

In an illustrative example, Alice and Bob regularly communicate with each other using email. For roughly 75% of the messages Alice sends to Bob, the message emanates from a mail client with mime version "1.0 (Mac OS X Mail 10.1 \ (3251\))" and with additional characteristics such as those shown in the "Mac" column of the table above. For roughly 25% of the messages Alice sends to Bob, the message emanates from a mail client with mime version "1.0" and with additional characteristics such as those shown in the "Android ph" column of the table above. Bob's system receives an email E1 from Alice that is sent from a mail client with characteristics such as those shown in the "Mac" column of the table above. This is considered consistent with Alice's past sending behavior, and E1 is delivered. Bob's system receives an email E2 from Alice, that is sent from a mail client with characteristics such as those shown in the "Mac" column of the table above, except that the message is associated with mime version "1.0 (Mac OS X Mail 9.1 \ (3121\))." This would correspond to a downgrade of Alice's system, as opposed to an upgrade. This is considered unusual, and a security action is initiated. The contents of E2 is scrutinized, both using an automated tool and using a manual audit by an admin, after which it is concluded that the message is safe, and is delivered. The new mail client characteristic is entered in a record associated with Alice, along with details relating to the message and its treatment. Bob's system receives an email E3 from Alice that is sent from a mail client with characteristics such as those shown in the "iphone" column of the table above. This is not an entry that is associated with Alice's past observations. In addition, it is known that Alice has an Android phone. This causes an escalation of the message scrutiny. The message is found to have content matching a content risk filter. The determination is that E3 is at high risk of being a message that comes from an ATOed system. An SMS verification message is sent to Alice's previously recorded phone number, and Alice's record is marked as being at high risk of being corrupted. E3 is not delivered, but Bob receives a message saying that a suspect message has been blocked by the system, and that the message came from Alice's account. Cindy also knows Alice, and Cindy receives an email E4 from Alice. The system looks up Alice's record and determines that her account is considered at high risk of being corrupted. The message E4 is automatically scrutinized, but does not match any rule associated with a high risk. Therefore, E4 is marked up with a warning "This message comes from an account that is temporarily associated with risk. Please proceed with caution. Before performing any sensitive action, please verify with the owner of the account." However, it turns out that Alice really did send E3, from her new phone. Accordingly, she confirms that E3 was sent by her. The security system delivers E3 to Bob, and replaces the marked-up version of E4 in Cindy's inbox with the "clean" version of E4. The system also removes the "corrupted" flag in the record associated with Alice, and records the header configuration associated with E3 in the record. The system does not know whether Alice will still use her Android phone. However, it knows from the response to the verification challenge—which was sent from an iPhone—that the phone number on record for Alice is likely to be associated with an iPhone, but that the phone associated with the "Android ph" device may also be used. Later on, Bob's system receives an email E5 from Alice, not matching any of the previously recorded headers, but instead matching a header configuration commonly used by previously observed scammers. The message scrutiny is escalated, and automated scrutiny indicates that E5 contains a zip file that, when decompressed in a sandbox, contains a malicious file. The system concludes that Alice's device has been corrupted, and adds information about this in the record associated with Alice. A notification message is sent to Alice using SMS. However, Alice does not respond to it. The security system initiates a notification to Alice's mail service provider, indicating that it is likely that Alice's system has been corrupted. Alice's mail service provider reviews the activity associated with Alice's account, and concludes that it is likely that Alice's account has been taken over. They automatically block access to the account and initiate an effort to allow Alice to regain access to her account. Several days later, this completes. Dave has not interacted with Alice in the past, but receives an email E6 from Alice. The system looks up Alice's record and determines that her account is considered at high risk of being corrupted. The message E6 is automatically scrutinized. It is found that it is identical to a message sent in the past from corrupted accounts. Therefore, E6 is not delivered. Alice's account sends another email E7 to Bob, which is trapped by the security system. It does not have content found to be dangerous, and so, is delivered along with a warning "This email was sent from a sender that may be hacked. Please proceed with caution." The system generates an inquiry to Alice's mail service provider whether the recovery has completed; when the mail service provider responds that Alice's system has been recovered, the flag associated with corruption in Alice's record is set to "none," and the modified message is searched for. However, the security system cannot find it, and so, does not replace it with its clean version E7.

In various embodiments, in addition to using historical observations associated with the sender of the message to analyze the security risk of the message, other types of security risk analysis are performed in determining a total risk score associated with the message. For example, in addition to one or more risk component scores for risk factors determined using past observations, one or more other risk component scores are determined for other types of security risk analysis. The various different types of risk component scores are combined to determine a total risk score. Examples of the other types of security risk analysis include a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

If at 206, it is determined that the message was sent by a sender without a determinable measure of influence for a recipient entity of the intended recipient of the message, at 210, the message is analyzed for security risks using general factors associated with the sender of the message. For example, the message is analyzed to identify security risks without the benefit of observations of previous communication history between the sender of the message and the intended recipient of the message. However, generalized past observations about messages from the sender (e.g., generalized based on messages for other recipients from the sender) and/or an organization/domain of the sender is utilized to analyze a message content keyword, a mail user agent, a time zone, an IP address, an X-header, supported character sets, a message signature, and any other information about the message to determine whether the message is sufficiently different from the generalized past observations to indicate a security risk. In some embodiments, analyzing the message for security risks includes performing a plurality of analyses and determining a risk component score for each of the analyses. These component scores are then combined (e.g., added, weighted then added, averaged, etc.) to determine an overall risk score. In some embodiments, each of the component scores is associated with one or more specific types of risk and a separate total score is calculated for each of the different types of risk based on its associated component scores.

In some embodiments, in 210, it is determined whether the electronic message account of the sender of the message is likely an independently controlled account. For example, an account that belongs to a large organization that closely controls who can send a message via its domain is not an independently controlled account whereas a personal email message account is an independently controlled account. In response to a determination that the electronic message account of the sender of the electronic message is likely an independently controlled account, the message is analyzed to determine whether the message is an automatically generated message. For example, a header of the message is analyzed to determine whether the message was automatically generated using a script or a program. In response to a determination that the message is an automatically generated message, a risk component score of the message is set to be high enough to warrant performing a security action.

In various embodiments, examples of other types of analyses performed in 210 include one or more of the following: a virus threat detection, a malware threat detection, identification of risky content type (e.g., executable, file attachment, link to a website that requests login information, content that requests OAuth authentication, etc.) included in the message, analysis of a number and type of recipients of the same message (e.g., attacker may prefer targeting people one by one, to avoid detection), and determining whether the sender from a domain with a Domain-based Message Authentication, Reporting and Conformance (DMARC) policy passes Sender Policy Framework (SPF) and DomainKeys Identified Mail (DKIM) validations.

At 212, based on a result of the analysis, a security action is performed, if applicable. In some embodiments, either in 208 or 210, one or more security risk scores are determined and based on these score(s), a security action is selected among different security action options. The selected security action is performed. For example, a security risk score may indicate that the message is of very low risk (e.g., risk score is below a first threshold) and the message is fully allowed to be accessed by the intended recipient (e.g., allow the message to a message inbox of the intended recipient). If not, the security risk score may indicate that the message is of medium risk (e.g., risk score is above the first threshold but below a second threshold) and the message is modified to include a warning prior to being allowed to be accessed by the intended recipient (e.g., allow the modified message to a message inbox of the intended recipient). Otherwise, the security risk score may indicate that the message is of high risk (e.g., risk score is above the second threshold) and the message not allowed to be accessed by the intended recipient (e.g., send the message to an administrator for further analysis). If there exists a different security risk score for different types of security risks, each different type of score may be analyzed separately and/or analyzed in combination to determine which level, if any, of security action is to be performed.

Examples of the security action (e.g., selected from the list based on a risk score and/or specific type of threat or information detected in the message) include the following: sending a message to the sender to determine whether it automatically forwards responses; generating a security challenge sent to the sender (e.g., if this is not responded to, it is indicative of higher risk and if it is responded to in an anomalous manner, that is also indicative of higher risk); generating a challenge sent to an alternative account of the sender(e.g., another email address associated with the sender); sending an SMS message to a phone number associated with the sender; placing an automated call to a phone number associated with the sender (e.g., requesting a confirmation or a response from the user associated with the account the security challenge is sent to); performing additional automated scrutiny of the message (e.g., including its content portion); performing additional manual scrutiny of the message (e.g., including its content portion); quarantining the message; blocking the message; delivering the message; augmenting the message to reduce the risk associated with it (e.g., modifying its attachments); analyzing attachments of the message by attempting to execute them in a sandbox or virtual machine; adding a warning to the message prior to allowing the message to be access by the intended recipient; and moving the message to a special folder identifying its higher risk.

In some embodiments, a software component is introduced at a protected sender side, the software component encoding information in a header element for recipients to observe. By letting the information be a function of a key that is shared between the sender side and the observer side, a message authentication code can be implemented. Alternatively, asymmetric cryptography such as digital signatures can be used for the authentication, as can streamed authentication methods such as TESLA or other hash chain constructions. The authenticated data may be an empty field, a portion of the message, a counter, data relating to the transmission time, and information about the context of the message creations, such as the IP address from which the message was submitted. It is desirable that the data is encrypted or that obfuscation methods are used; alternatively, proprietary formats can be used to complicate decoding by an unauthorized observer.

Attackers gaining access to email accounts typically perform searches to identify high-value contacts, e.g., by searching the mailbox for keywords indicating financial services, high-profile connections, and more. If a company wishing to limit the damage associated with the corruption of the accounts and machines of external associates were able to send messages that "self destruct," the damages associated with the corruption may be mitigated. One example of achieving self-destructing emails includes replacing message content with a hyperlink. The outgoing mail server can automatically identify high-risk emails (based on content, recipient, and internal policies) and rewrite the content with a hyperlink that, when clicked, would give the recipient access to the content. This access can be controlled; it can be limited in terms of time after receipt (e.g., 3 days), it can require a password or other authenticating action, it can be conditional on an action not yet having been observed (e.g., no response has been received to this email yet), etc.

Another example of achieving self-destructing emails includes placing an email representing one or more archived messages in a special folder. If the associated account is controlled by the security service provider, received emails can be archived in a password-only storage after some time.

This can be implemented by placing an email representing one or more archived messages in a special folder, the email having a hyperlink leading to a password-protected server giving full access to all archived emails. (The password protected server can limit access based on volume, IP address, etc.) There can be a policy determining what messages get auto-archived, based on sender, content and other indicators. The auto-archiving feature can depend on having observed a high-risk action, e.g., a user opening a risky email, following a link, and entering a text (which may be a password), or accessing the mailbox from an unknown computer.

Figure 3:
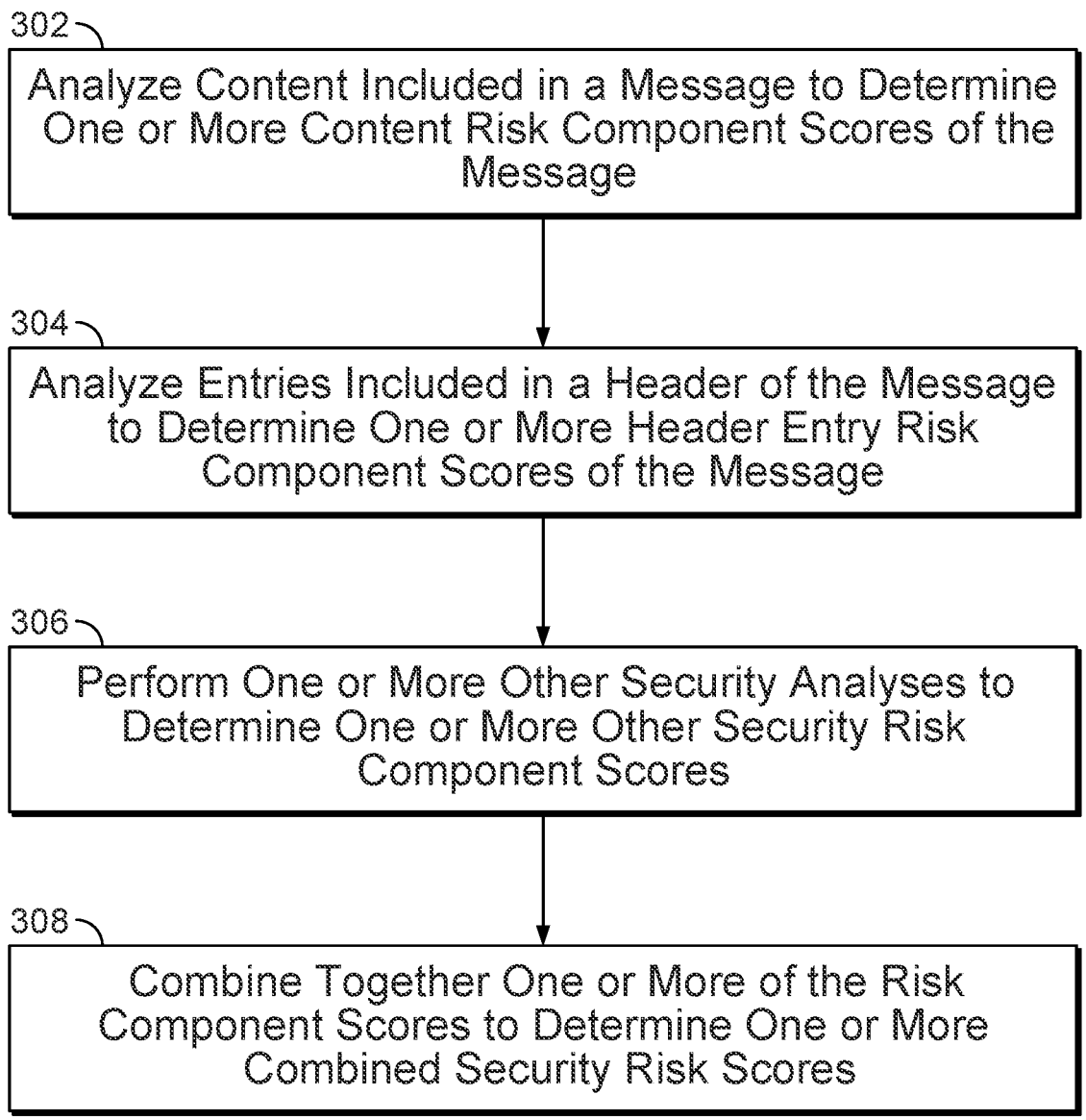
FIG. 3 is a flowchart illustrating an embodiment of a process for analyzing individual aspects of a message for security threats.

FIG. 3 is a flowchart illustrating an embodiment of a process for analyzing individual aspects of a message for security threats. The process of FIG. 3 may be at least in part implemented on analysis server 102, gateway 110, and/or message server 106 of FIG. 1. In some embodiments, at least a portion of the process of FIG. 3 is performed in 208 and/or 210 of the process of FIG. 2.

At 302, content included in a message is analyzed to determine one or more content risk component scores of the message. For example a message body of the message is analyzed to identify whether it includes one or more text/keywords from a list of keywords associated with a security risk. A keyword may be included in the list because the keyword identifies conversations about sensitive content that could cause harm to the recipient if the recipient replies or takes action related to the keyword. For example, keywords "social security number," "password," "login," "wire instructions," "confidential," "payment," "ID," obfuscated text, etc. may be included in the list of keywords associated with a security risk. A content risk component score is determined based on whether the message includes a text/keywords from the list of keywords (or associated synonyms or related words) associated with a security risk. For example, an increase in the number (e.g., of different types) and degree of risk of security risk keywords included in the message increases the associated content risk component score.

In some embodiments, a measure of influence of the sender entity of the message on the recipient entity of the message is utilized to analyze the message. For example, one or more of the content risk component scores are based on the measure of influence (e.g., weighted/scaled based on the measure of influence value, measure of influence value is one of the content risk component scores, etc.). In some embodiments, which content risk component score to be included in the content risk component scores is based on the measure of influence (e.g., a certain component content risk component score is included based on whether the measure of influence meets a threshold value, role of the sender and/or intended recipient of the message, etc.).

In some embodiments, the measure of influence takes into account past observations about messages sent by the sender and the measure of influence is utilized in determining the content risk component score based on whether the message includes text/keywords from the list of keywords (or associated synonyms or related words) associated with a security risk. For example, if it is common for a sender to communicate with the recipient about invoices and payment, an inclusion of a keyword related to invoices and payment would not cause the content risk component score to go up as much as compared to a situation in which it is not common for sender to communicate with the recipient about invoices and payment. Thus a contribution of a security risk keyword included in the message to the content risk component score is reduced if the same or similar keyword in scope and topic (e.g., keyword that is a synonym or topically related word) has been previously observed in previous messages from/to the sender to/from the recipient. The magnitude of this reduction may depend on the number and length of time the same or similar keyword in scope and topic has been previously observed in previous messages from/to the sender to/from the recipient.

In some embodiments, analyzing content included in the message to determine one or more content risk component scores of the message includes determining a content risk component score based on a message signature included in the message. For example based on past observations about types of email signatures typically included in email messages from the sender of the message, the associated content risk component score is increased if an expected signature is not included in the message (e.g., given other detected attributes of the message and the expected signature for the given other detected attributes) or if an unexpected signature is detected (e.g., never observed signature or included signature is an out of context signature that does not match an expected signature for the given detected attributes of the message).

At 304, entries included in a header of the message is analyzed to determine one or more header entry risk component scores of the message. Examples of the entries included in the analyzed header include one of more of the following: a mail user agent (i.e., MUA) identification, time zone identification, IP address, X-header, supported foreign language character sets of the sender, identification of automation or script that generated the message, or any other data included in the header (e.g., email header) of the message. For each header entry to be analyzed, a header entry risk component score is calculated based on a risk factor associated with the entry. For example, certain sender IP addresses and/or header entries, given what is known about the intended recipient (e.g., mismatch between sender and recipient) may increase the associated header entry risk component score. If the sender of the message has been determined to have an established relationship with the recipient of the message, past observations about headers of messages sent by the sender are utilized in determining the header entry risk component scores. For example, the header entry risk component score for a header entry is reduced if the same or similar entry (e.g., change in entry from a previously observed entry conforms to known change pattern) has been previously observed in previous message headers of messages from the sender of the message. The magnitude of this reduction may depend on degree of similarity and/or conformance to a typical pattern of change from previous observations.

In some embodiments, the header entry risk component score for a header entry is associated with whether the message is an automatically generated message. For example, one or more x-header entries identify whether the message was automatically generated. These entries may be identified based on keywords that identify that the message was generated using a script (e.g., generated using a PHP mailer/script). If the sender of the message has been determined to have an established relationship with the recipient of the message, past observations about headers of messages sent by the sender are utilized in determining the header entry risk component scores. For example, the header entry risk component score for a header entry identifying an automatically generated message is reduced if the sender typically sends automatically generated messages (e.g., including the same or similar header entry) to the recipient of the message. The magnitude of this reduction may depend on degree of similarity and/or conformance to a typical pattern of change from previous observations. The following are examples of header entries identifying an automatically generated message and these entries are identified by matching one or more search terms with at least a portion of the text of these entries:"X-Mailer: PHPMailer 5.2.23 (https://github.com/PHPMailer/PHPMailer)"; "X-Php-Originating-Script: 1002:srjvdopc.php(1189): runtime-created function (1): eval( )'d code(1): eval( )'d code."

FIGS. 4A-4F show various examples of headers included in example email messages. The headers shown in the example message 402 of FIG. 4A are associated with messages that were received by a server, associated with the sender, located in the Pacific Time zone. This can be seen by the "−0800" portion of the "date" header. In addition, the IP address of the received server will typically indicate a location consistent with the time zone. However, in the message below, the date header indicates a "+0900" time zone, which is associated with Japan. Also note that the subject line indicates UTF-8, which is associated with a sender using multiple character sets.

The example message 404 in FIG. 4B shows an IP address "94.245.18.21," which is consistent with the expected location of the sender (Denmark and Sweden). The X-header identifies the sending device as an "iPhone," which is also consistent with the sender's historical headers.

The example message 406 in FIG. 4C shows a response to a Craigslist advertisement, for an ad associated with Mountain View, Calif. The time zone of the server where the message was received is indicative of potentially having been sent from Africa. This is in spite of the sender using a "gmail" account. The reason is that Google has servers in many locations, and the closest location to the sender was likely in use, for efficiency reasons. This is, of course, a sign of risk in the context of a local transaction, where one would expect the sender to be local. But more importantly, had the sender's "gmail" account commonly been associated with an IP address and time zone in, say, Missouri, and suddenly becomes associated with an IP address and time zone in Africa, then this is indicative of an account take-over. The example message 408 in FIG. 4D is another response to the same advertisement. This sender is also located in a location other than California. The example message 410 in FIG. 4E has an unusual X-header. If an email is received, appearing to come from this sender, but not having this X-header, then there is a good chance that the message is from an account that has been compromised.

The example message 412 in FIG. 4F identified as having been sent using a sending server four time zones away from the receiving server, from a user associated with charset ISO-8859-1. The system can identify what charsets are commonly used by legitimate senders sending traffic to a receiving user or organization, as well as the distribution in time zone difference. When a previously not observed user sends a protected user a message, it can be determined if the headers are consistent with those of previously received good traffic, whether they match high-risk senders, or neither. A risk score can be computed based on the headers and the extent to which they match known good and known bad traffic. In one scoring example, a score of 100 is generated when all headers match those of the sender's past headers. A score of 35 is computed for another previously non-observed sender that fails to match any other previous sender. A score of −50 is computed for a previously observed sender whose historical headers are very different from the currently observed headers, including different X-headers, a different time zone, and a different IP trace. A score of −10 is generated for a previously not observed sender whose headers match those of previous high-risk senders, but which do not match those of previous low-risk senders to the recipient.

At 306, one or more other security analyses is performed to determine one or more other security risk component scores. This step may be optional in various embodiments. Examples of other types of analysis performed include one or more of the following: a virus threat detection, a malware threat detection, identification of risky content type (e.g., executable, file attachment, link to a website that requests login information, content that requests OAuth authentication, etc.) included in the message, analysis of a number and type of recipients of the same message, and determining whether the sender from a domain with a Domain-based Message Authentication, Reporting and Conformance (DMARC) policy passes Sender Policy Framework (SPF) and DomainKeys Identified Mail (DKIM) validations.

In some embodiments, performing a security analysis includes identifying which domains and subdomains are used to send legitimate traffic, e.g., by recording what subdomains/domains are used to originate large volumes of emails, and which are not known to be spam or fraud email. For example, "large amounts" may mean greater than a threshold value, such as 100 emails per week, or at least 0.1% of the traffic associated with a particular domain, or any traffic that is not known to be good, e.g., by being associated with correct SPF and/or DKIM data in the headers. Next, any traffic associated with a subdomain and domain that is not on the list of subdomains/domains that are known to send legitimate traffic is flagged, and, depending on a policy and/or contents, quarantined, blocked, marked up, or escalated for additional scrutiny.

In some embodiments, a security analysis involves web bugs, which are also referred to as web trackers. Some users set their browser preferences not to permit web bugs, whereas others do not. Therefore, the acceptance or rejection of a web bug is a trait that can be tracked. When it changes, that is indicative of risk. A web bug can be set to send a signal to the security service when the email or webpage in which it is integrated is rendered. The security service can send a message to a user considered at risk for having been corrupted, and then determine whether the web bug is operating in a manner that is consistent with past uses. The email can also demand that the user allows web bugs, after which user-specific information can be collected. If this is found to be inconsistent with past observations, the associated risk component score is increased.

At 308, one or more of the risk component scores are combined together to determine one or more combined security risk scores. Determining a combined security risk score includes statistically combining (e.g., adding together, weighting then adding together, averaging, weighted averaging, etc.) together the various risk component scores to determine a single combined risk score. In some embodiments, each of the risk component score(s) is associated with one or more specific types of risk. For example, risk component scores of each risk type are to be combined together by type to determine a total risk score for each specific risk type. For example, a security risk component score may be identified as being associated with a malware risk type and/or a phishing risk type and a combined security risk score for the malware risk type and a separate combined security risk score for the phishing risk type are calculated. In some embodiments, the combined security risk scores are utilized in determination of which security action to perform in 212 of FIG. 2.

Figure 5:
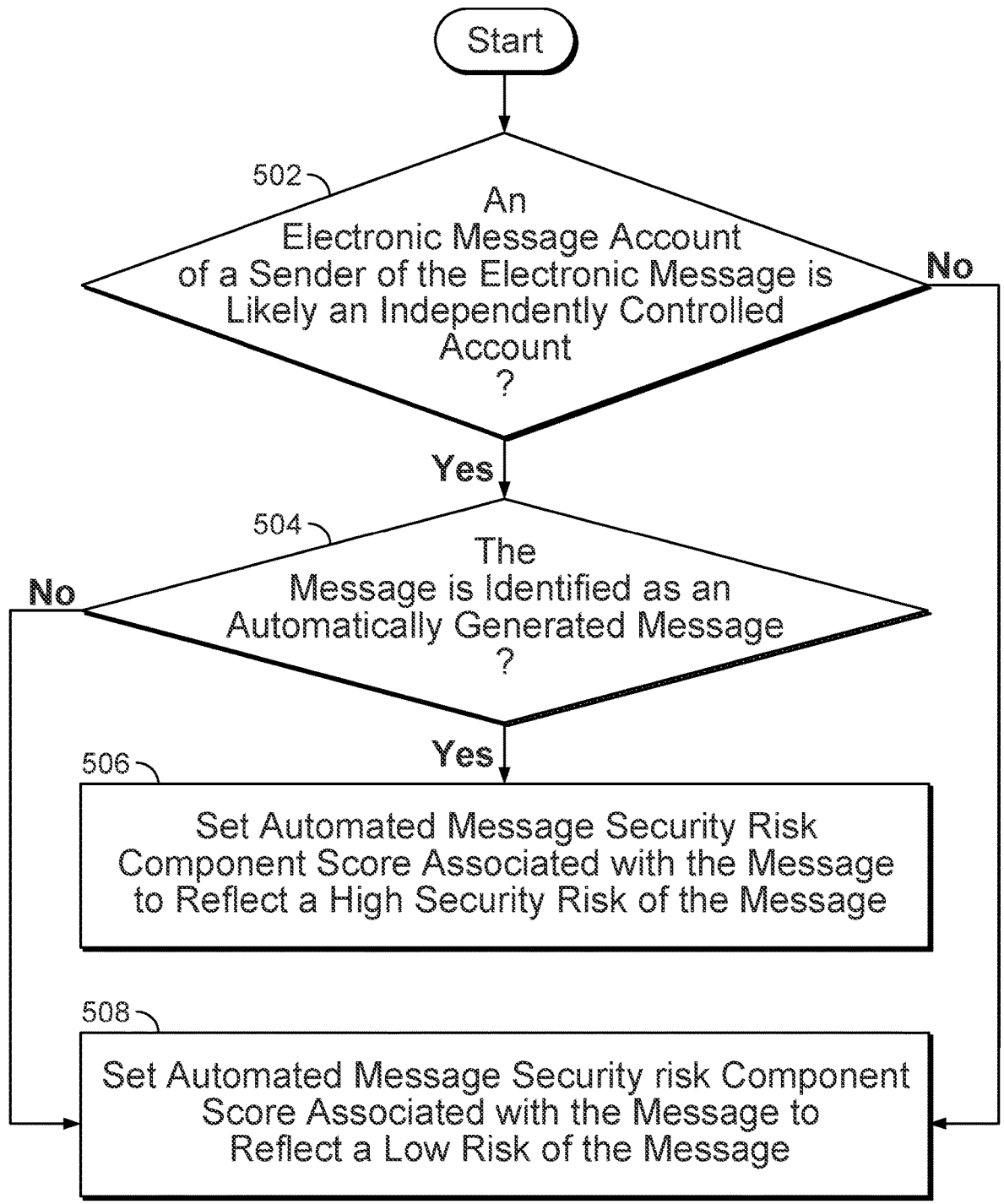
FIG. 5 is a flowchart illustrating an embodiment of a process for analyzing aspects of a received message based on whether the message is from an independently controlled account of a sender.

FIG. 5 is a flowchart illustrating an embodiment of a process for analyzing aspects of a received message based on whether the message is from an independently controlled account of a sender. The process of FIG. 5 may be at least in part implemented on analysis server 102, gateway 110, and/or message server 106 of FIG. 1. In some embodiments, at least a portion of the process of FIG. 5 is performed in 208 and/or 210 of the process of FIG. 2. For example, the process of FIG. 5 is performed in response to a determination that the sender of the electronic message is not an established communication contact of the intended recipient of the message.

At 502, it is determined whether an electronic message account of a sender of the electronic message is likely an independently controlled account. For example, a message that was sent from an account that belongs to a large organization that closely controls who can send a message via its domain (e.g., web domain) is not an independently controlled account whereas a personal email message account is an independently controlled account.

In some embodiments, determining whether the electronic message account of a sender of the electronic message is likely an independently controlled account includes identifying a domain of an address (e.g., email address) of the sender of the message using the domain to identify using preconfigured data, whether the domain corresponds to independently controlled accounts. For example, certain domains are known to only allow not independently controlled accounts and any email address using these domains is identified as not an independently controlled account, while other domains are known to allow independently controlled accounts and any email address using these domains are identified as an independently controlled account. If the domain is unknown, the electronic message account of the sender is identified as an independently controlled account.

In some embodiments, the electronic message account of the sender of the electronic message is determined to be likely an independently controlled account based on a message traffic pattern associated with the electronic message account of the sender. For example, based on the volume of messages (e.g., large volume of message traffic above a threshold to/from the sender indicates that it is not an independently controlled account) and/or number/ratio of sent messages vs. received messages (e.g., a ratio of sent messages by the sender as compared to messages to the sender that is above a threshold indicates that it is not an independently controlled account where as a generally even ratio of sent vs. received indicates an independently controlled account), it is determined whether the electronic message account of the sender of the electronic message is likely an independently controlled account.

The notion of autonomy (e.g., independently controlled) of an account is important with respect to trust of the account. For example, a "gmail" account is autonomous (e.g., independently controlled). Even though many members share the same domain, there is no coherency in their actions. On the other hand, an official work organization email address of one employee is not autonomous from another employee of the same organization.

In a first example, consider Alice with an email address with the domain "Aliceco.com" that sends an email to Bob at an email address with the domain "Bobco.com." Assume that the recipient Bob has a trust relationship with Alice (i.e., the recipient email address for Bob has sufficient interaction with the Alice email account). Then there is "personal trust" by the recipient directed to the sender. Assume that the recipient does not have a trust relationship with Alice, but somebody else at "Bobco.com" does. Then there is "organizational trust" by the recipient directed to the sender. Assume now that the recipient Cindy at "Bobco.com" has no trust relationship with Alice, but Cindy does have one with Dave at Aliceco.com. Then there is "personal transitive trust" by the recipient directed to the sender. This is because Alice and Dave both belong to "Aliceco.com," and "Aliceco.com" is one autonomous entity—Alice and Dave are not two independent autonomous entities. Finally, assume that the recipient has no trust relationship with either Alice or Dave—or anybody else at "AliceCo.com"—but that somebody else at "Bobco.com" does. This shows "organizational transitive trust."

In another example, consider Bob using his "gmail" personal account, sends an email to somebody at "Bobco.com." Assume that the recipient has a trust relationship with Bob (e.g., the recipient email address has sufficient interaction with the Bob "gmail" email account). Then there is "personal trust" by the recipient directed to the sender. Assume that the recipient does not have a trust relationship with Bob's "gmail" account, but somebody else at "Bobco.com" does. Then there is "organizational trust" by the recipient directed to the sender. Assume now that the recipient has no trust relationship with Bob, but they do have one with Cindy's personal "hotmail" account. There is no trust—Bob and Cindy are not two independent autonomous entities when represented by their personal email addresses.

Thus if an email comes from a stranger whose email address is similar to a party the recipient trusts, then this is a high-risk scenario. Trust is different from more general reputation: one is not more likely to act on an email from a trustworthy but unknown organization than one of an email from a non-trustworthy and unknown organization. However, whether one has a good relationship with a sender matters more in terms of trust than whether others have a good relationship with the sender. Different kinds of trusts may be computed in different ways but also have different strengths. For example: strength("personal trust")>strength ("organizational trust"); strength("personal trust")>strength ("personal transitive trust"); strength("personal transitive trust")>strength("organizational transitive trust"); strength ("organizational trust")>strength("organizational transitive trust"). In some embodiments, different weights can be assigned to these different types of trust to determine a risk of a message.

If at 502 it is determined that the electronic message account of the sender of the electronic message is likely an independently controlled account, at 504, the message is analyzed to determine whether the message is an automatically generated message. For example, a header of the message is analyzed to determine whether one or more x-header entries identify whether the message was automatically generated. These entries may be identified based on keywords that identify that the message was generated using a script (e.g., generated using a PHP mailer/script). The following are examples of header entries identifying an automatically generated message and these entries are identified by matching one or more search terms/keywords with at least a portion of the text of these entries: "X-Mailer: PHPMailer 5.2.23 (https://github.com/PHPMailer/PHP-Mailer)"; "X-Php-Originating-Script: 1002:srjvdopc.php (1189): runtime-created function(1): eval( )'d code(1): eval( )'d code."

In some embodiments, determining whether the message is an automatically generated message includes identifying a likely scripted behavior associated with a protected account. For example, attackers typically configure accounts they have compromised to forward emails to another account, either selectively (such as based on the subject line, the sender, the thread, etc.) or for all emails. In addition, attackers sometimes configure compromised accounts so that selective emails are hidden, as will be described in more detail below. When attackers make such a configuration, then this affects the traffic patterns in a way that will be measured and detected by the security service. By monitoring the different mail folders, including the inbox, the sent box, the archive, the trash folder and other folders, the security service provider will detect forwarding behavior that is anomalous in that it has not been performed by the account owner before; that is selective; that is rapid; or that is to recipients that are considered high risk, or any combination of these. It also detects signs of scripted forwarding, which is indicated by a very short time period between receipt of an email and the forwarding of the email. In addition, the security service also looks for other indications of scripted behavior, such as an anomalous addition of an account in the bcc, which is considered anomalous by not having been performed previously, and/or which is considered scripted due to the time periods being very short. Another related detection method is to observe if the MUA of emails to some recipients of emails sent from the protected account are different than those of others, and considered high risk, e.g., due to information that is anomalous for the account owner.

If at 504 it is determined that the message is an automatically generated message, at 506, an automated message security risk component score associated with the message is set (e.g., set to a high value) to reflect a high security risk of the message (e.g., higher than otherwise). This security risk component score may be utilized in 212 of FIG. 2 and/or 308 of FIG. 3.

If at 502 it is determined that the electronic message account of the sender of the electronic message is likely not an independently controlled account or if at 504, it is determined that the message is not an automatically generated message, at 508, the automated message security risk component score associated with the message is set to reflect a low risk of the message (e.g., lower than otherwise).

Figure 6:
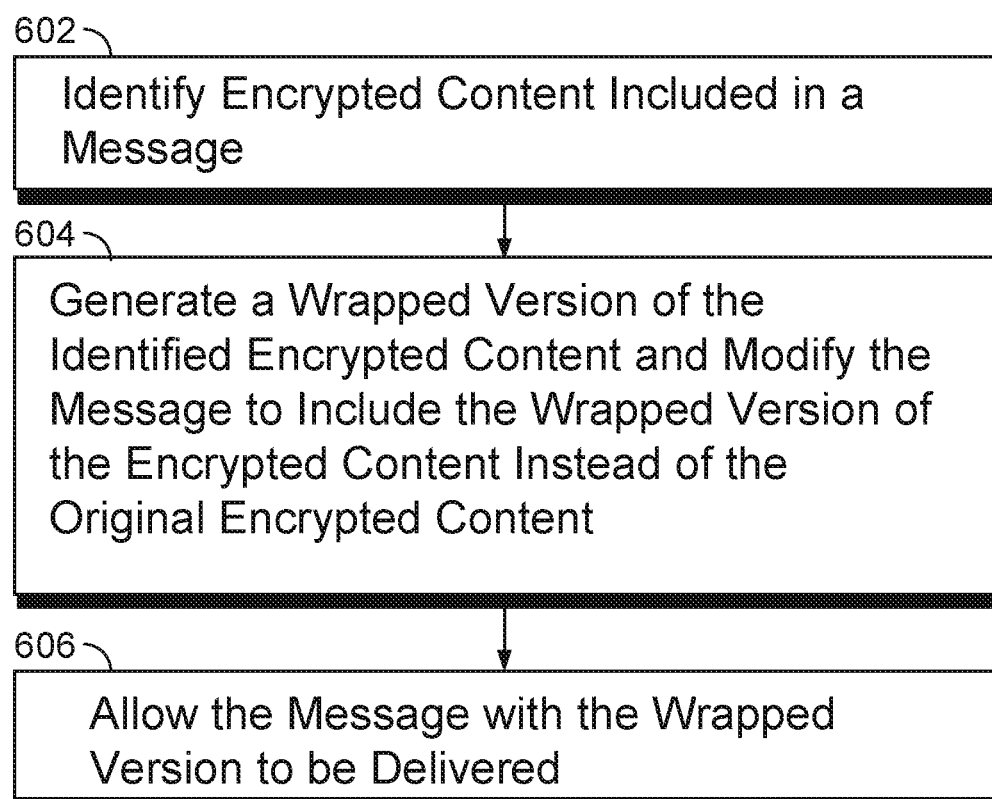
FIG. 6 is a flowchart illustrating an embodiment of a process for wrapping encrypted content of the message.

FIG. 6 is a flowchart illustrating an embodiment of a process for wrapping encrypted content of the message. The process of FIG. 6 may be at least in part implemented on analysis server 102, gateway 110, and/or message server 106 of FIG. 1. In various embodiments, at least a portion of the process of FIG. 6 is performed in 212 of FIG. 2. For example, the process of FIG. 6 describes one of the security actions that is selected to be performed.

If a message includes encrypted content such as an encrypted email attachment, that encrypted content is often unable to be properly analyzed for security threats because analysis tools are unable to access the encrypted content. Hackers may take advantage of this by sending an encrypted malware attachment along with a password to be utilized by the recipient to open the attachment.

At 602, encrypted content included in a message is identified. Examples of the message include an email, instant message, a chat message, and any other forms of electronic messages. The message may be analyzed as a part of a computer security analysis and filtered to identify and neutralize security threats prior to allowing an intended recipient of the message to access the message. In some embodiments, each message received for delivery to its intended recipient associated with the system performing analysis of the message is to be analyzed. Examples of the encrypted content include: an encrypted executable file, an encrypted zip file, an encrypted text, an encrypted script, an encrypted image, and any other encrypted content. The encrypted content may have been identified by identifying content that requires a password to access it.

At 604, a wrapped version of the identified encrypted content is generated and the message is modified to include the wrapped version of the encrypted content instead of the original encrypted content. In some embodiments, wrapping the encrypted content includes embedding the encrypted content in an executable program. When the executable program is executed, the executable program requests a decryption password from the user and the encrypted content of the message is encrypted using the decryption password and the decrypted content is analyzed for security threats prior to allowing the user access to the decrypted content once the analysis has completed without identifying a security threat. If the security analysis identifies a threat, a user may not be allowed to access the decrypted content and the security threat may be logged or reported to an administrator.

For example, the wrapped version of an encrypted zip file is a file that, when opened, causes execution, whether of the file wrapper itself or of an associated application that the message recipient needs to download, and as the file wrapper is executed, it requests and receives a decryption key, PIN, or password from the user and uses the PIN or password to decrypt the wrapped zip file. This is done by executing the unzip program associated with the zip file, or a compatible version to this, providing the unzip program with the PIN or password provided by the user. It then automatically accesses the contents of the unzipped file and analyzes it for security risks. This can be done in a multiplicity of ways, including detonating each file, determining whether any of the files match an anti-virus signature, determining whether any of the files has executable code segments in it, etc. The same approach also works for messages with attachments that are encrypted pdfs, or any other encrypted file. In such cases, the execution of the wrapper file causes the decryption of the encrypted file, which is then analyzed for security risks, including executable code. If a file, independent of type, passes the verification, then the decrypted content is made available to the recipient. Thus, the user experience associated with the opening of wrapped encrypted content would be the same as that of unwrapped encrypted content, except for a delay during security analysis (e.g., in most cases this would be too short to detect).

At 606, the message with the wrapped version of the encrypted content is allowed to be delivered. For example, the modified message is allowed to be delivered to an email inbox (or other email categorization folder to be actively accessed by a user to obtain new messages, e.g., not a spam or trash folder) of an end recipient. Allowing the modified message to be delivered includes allowing an intended user recipient of the message to be able to access the wrapped encrypted content. When the recipient opens the wrapped encrypted content, the wrapper program requests a decryption key, decrypts the encrypted content using the decryption key, and initiates the security analysis of the decrypted content prior to allowing the recipient access to the decrypted content of the encrypted content. Any security analysis technique or method described in this specification may be performed on the decrypted content to analyze it for security threats. If a security threat is detected, the user may not be allowed access to the decrypted content and a security may be performed. The security action may include revoking access to the message, deleting the message, forwarding the message, reporting the message, further modifying the message, moving the message (e.g., to a different folder), preventing access to a portion of the message, providing an additional warning, and/or performing further analysis.

Figure 7:
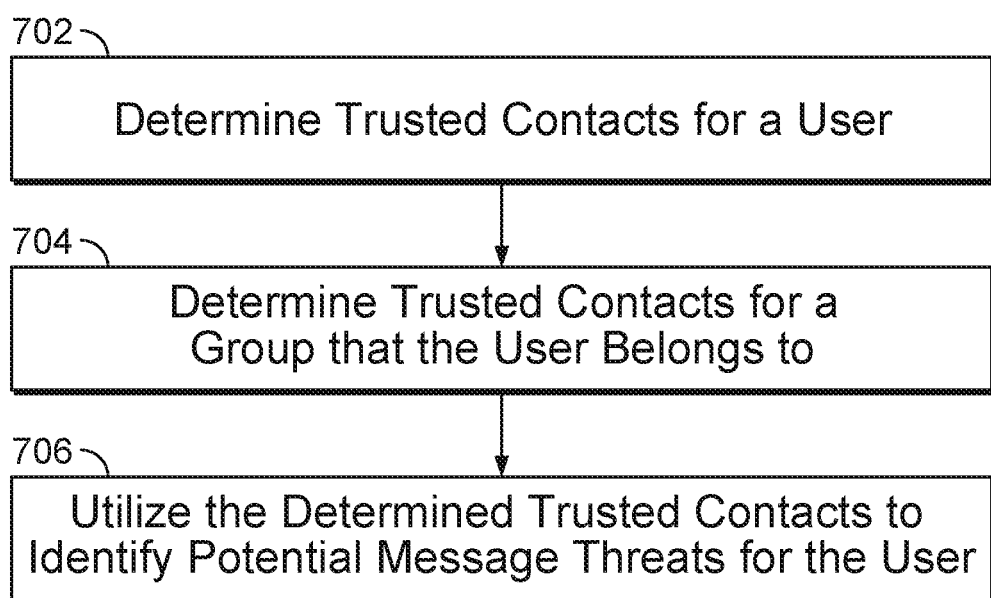
FIG. 7 is a flowchart illustrating an embodiment of a process for tracking trusted contacts.

FIG. 7 is a flowchart illustrating an embodiment of a process for tracking trusted contacts. The process of FIG. 7 may be at least in part performed by analysis server 102, gateway 110 and/or message server 106 of FIG. 1. Examples of the contacts include email addresses, usernames, display names, user identifiers, an identification photo, and any other identifier that may be utilized to identify a sender or recipient of a message. At least a portion of the process of FIG. 7 may be performed in 206 of FIG. 2. For example, one or more steps of the process of FIG. 7 are performed to determine whether a sender of a message is a trusted contact or has an established relationship with the recipient of the message.

At 702, trusted contacts for a user (e.g., message recipient) are determined. The trusted contacts are to be utilized to identify potential message threats of the user. The trusted contacts identify one or more contacts (e.g., senders or recipients of messages) that are familiar to the user because the user has previously interacted with the contact and/or is aware of the contact. In some embodiments, determining the trusted contacts includes receiving a list of contacts for the user. For example, the user provides access to an address book of the user and information about contacts in the address book is received. In some embodiments, the trusted contacts include contacts that have been specifically identified by the user. In some embodiments, information about the trusted contacts is stored. For example, the trusted contacts for the user are stored in a database of trusted contacts. This database may track trusted contacts for a plurality of different users and allows trusted contacts to be retrieved for a specific identified user. The stored information of each contact may include one or more of the following: email address, associated name (e.g., display name), relationship identifier, identifying image (e.g., contact photo), username, instant message identifier, address, phone number, a measure of trust, a measure of message interaction, and any other identifier utilized to identify a sender or a receiver of a message.

In some embodiments, the trusted contacts for the user are at least in part determined automatically based on contacts detected in messages sent or received by the user. For example, by observing and analyzing message traffic of the user and patterns of message recipients and senders, contacts that receive messages from the user and contacts that send messages to the user can be determined and correlated to infer and determine trust, frequency, and/or importance of interaction and relationship between the user and the contact to identify one or more of these contacts as a trusted contact. In one example, if a threshold number of messages has been sent to and from a contact for a user, the contact is identified as a trusted contact and added to a stored list of trusted contacts for the user. Information about the messages of the user utilized to at least in part automatically determine the trusted contacts has been obtained for analysis by receiving at least a portion of the messages (e.g., a copy of the entire message, email addresses and names of contacts of messages, etc.) for analysis (e.g., at server 102 from server 104, gateway 110, or server 106 of FIG. 1).

At 704, trusted contacts for a group that the user belongs to are determined. For example, trusted contacts for the users included in the group are aggregated to identify patterns among the aggregated trusted contacts. Examples of the group include a network domain that the user belongs to (e.g., domain of the email address of the user), an entity/organization that the user belongs to (e.g., company that the user belongs to), a message service provider, or an authority that controls a message account of the user. In some embodiments, determining trusted contacts for the group includes aggregating information about a trusted contact and/or a network domain of one or more trusted contacts from information gathered for different users for the trusted contact and/or the network domain. In some embodiments, determining the trusted contacts for the group includes storing information about the trusted contacts in a data storage structure and associating this stored information with the group.

At 706, determined trusted contacts are utilized to identify potential message threats for the user. For example, the contacts in the trusted contacts may be utilized as a proxy for contacts that are familiar to the user and if an attacker tries to attack the user using an impersonation attack, contact being impersonated likely corresponds to one of the contacts in the list of trusted contacts of the user. By determining a measure of similarity between a sender identifier of a message received for the user with each identifier of each trusted contact, messages attempting impersonation attacks may be identified. For example, if the email address of the sender matches an email address of a trusted contact, the message is to be trusted and not filtered but if the email address of the sender does not match any trusted contacts but is similar to an email address of a trusted contact, the message is identified as potentially a part of an impersonation attack and filtered. Filtering the message may include blocking the message, quarantining the message, further analyzing the message, and/or modifying the message (e.g., insert a warning).

Figure 8:
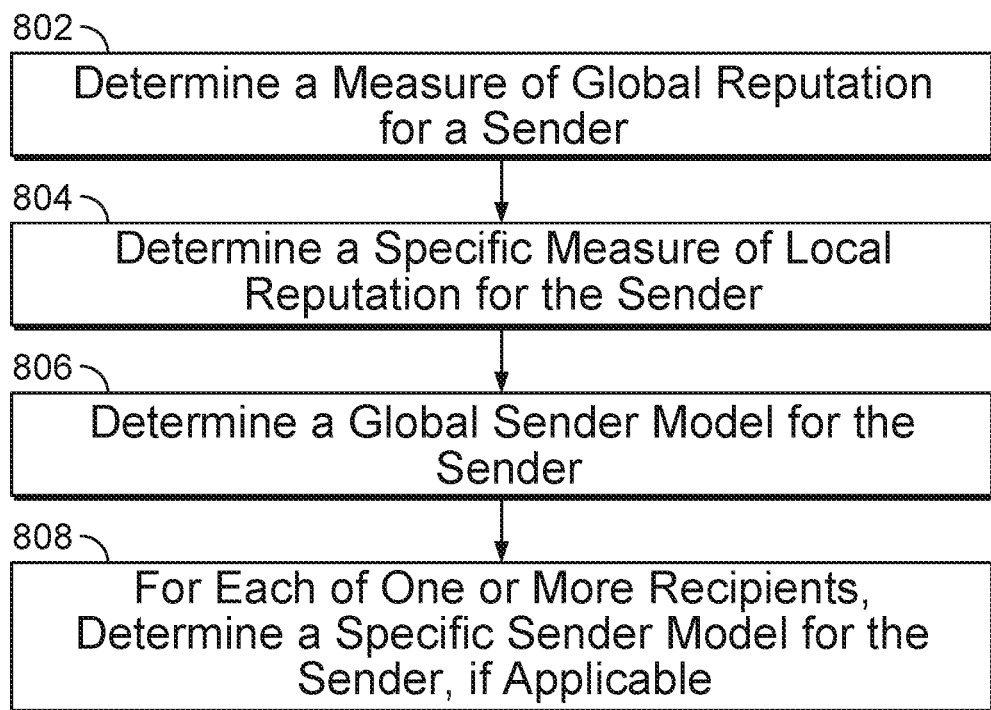
FIG. 8 is a flowchart illustrating an embodiment of a process for determining information about a message sender to be utilized to assess a risk of a message.

FIG. 8 is a flowchart illustrating an embodiment of a process for determining information about a message sender to be utilized to assess a risk of a message. The process of FIG. 8 may be at least in part implemented on analysis server 102, gateway 110, and/or message server 106 of FIG. 1. In some embodiments, at least a portion of the process of FIG. 8 is performed in 702 and/or 704 of FIG. 7. For example, the process of FIG. 8 may be repeated for each trusted contact determined for a user (e.g., for each contact in a list of trusted contacts stored in a repository) and stored in a data structure that tracks the trusted contacts. The process of FIG. 8 may be repeated periodically. At least a portion of the process of FIG. 8 may be performed in 206 FIG. 2.

At 802, a measure of global reputation for a sender is determined. The sender may correspond to a group of individual sender addresses in some embodiments or an individual sender address in other embodiments. For example, the sender corresponds to a trusted contact in a list of trusted contacts determined using the process of FIG. 7. In another example, the sender corresponds to a domain of a trusted contact identified using the process of FIG. 7. In some embodiments, the sender is a network/Internet domain and the measure of global reputation corresponds to all individual sender addresses of the domain. For example, the determined measure of global reputation of a domain is applicable to all email addresses within the domain. In some embodiments, the measure of global reputation for a sender is specific to an individual sender address. For example, the measure of global reputation for a sender is specific to an email address. In some embodiments, the sender is one of a plurality of senders in a list of senders to be analyzed to predetermine its global reputation. The list of senders may be automatically determined from one or more previously received messages (e.g., senders of previously received messages) and/or specified by a user/administrator. The measure of global reputation of the sender is applicable for a plurality of recipients of a message from the sender while a measure of local reputation of the sender is specific to a particular recipient domain or individual recipient address of a message from the sender.

In some embodiments, the measure of global reputation indicates a general measure that a sender is likely to send a message that is of value to a recipient of the message. For example, a higher measure of reputation indicates a higher likelihood that any message sent by the sender will not include malicious and/or undesired content (e.g., message will not include a virus, malware, spam, etc.). In some embodiments, determining the measure of global reputation includes determining one or more component factors to be utilized to determine a total measure of global reputation. For example, each determined component factor may be utilized to add, subtract, or multiply a value to/from the measure of global reputation to determine the total measure of global reputation. In one example, determined component factor values are summed to determine the global reputation measure. In some embodiments, machine learning or another automated process is utilized to determine the measure of global reputation based on gathered/generated information about the sender of the global reputation.

In some embodiments, determining the measure of global reputation for the sender includes determining whether an identifier of the sender (e.g., domain name, subdomain, IP address) is included in a list of senders known to be reputable. For example, there exists a predetermined list of entities and their associated identifiers that are known to be reputable and if the identifier of the sender is included in the predetermined list, the resulting measure of global reputation would be higher than otherwise. In some embodiments, determining the measure of global reputation for the sender includes determining whether an identifier of the sender is included in a list of senders known to be not reputable. For example, there exists a list of IP addresses associated with a server that are known to be commonly utilized to send spam messages and in the event an IP address associated with the sender is included in this list, the determined measure of global reputation would be lower than otherwise. Whether the identifier of the sender is included in the list of senders known to be reputable or not reputable may be utilized to determine a component factor value utilized in determining the measure of global reputation of the sender.

In some embodiments, determining the measure of global reputation for the sender includes determining a category of business associated with an entity of the sender. For example, businesses in certain categories (e.g., banking) may be associated with a higher reputation than businesses in other categories (e.g., digital marketing). In some embodiments, using a list/database that maps an identifier of a sender to a known associated category/line of business, the category/line of business associated with the sender is determined, if applicable (e.g., the line of business for some senders may be unknown or not applicable). A reputation component factor (e.g., value to be added, multiplied, or subtracted to/from total score measure) associated with the identified category/line of business may be utilized in determining the measure of global reputation.

In some embodiments, determining the measure of global reputation for the sender includes analyzing domain registration history and Domain Name System (i.e., DNS) activity of the sender. For example, a sender that is typically reputable will register a domain name far ahead of time prior to the use of the domain while a less reputable sender will likely temporarily utilize a domain for a short period of time prior to moving on to another domain and will register a domain within a short amount of time prior to the use of the domain. In some embodiments, determining the measure of global reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of global reputation for the sender includes analyzing historical statistics and/or a history of messages sent by the sender. For example, there exists one or more repositories of previous messages sent by the sender and the repositories of messages are analyzed to determine one or more of the following: an amount/volume/rate of messages sent by the sender, a number/breadth of different recipients (e.g., number of different domains of recipients, number of different email addresses of recipients, etc.) of messages from the sender, a distribution of messages sent to different recipients, a length of time the sender has been sending messages, a regularity that the sender has been sending messages (e.g., difference in average number of messages per time period), a type of content of messages sent by the sender, a difference/regularity between content of messages sent by the sender, amount/rate of content opened/viewed by recipients of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of global reputation for the sender.

In some embodiments, determining the measure of global reputation for the sender includes determining whether an identifier of the sender is similar to an identifier of another sender. For example, it is determined whether a domain of the sender is similar to a domain of another sender. Determining whether an identifier of the sender is similar to an identifier of another sender may include determining whether an identifier of the sender is similar to an identifier of another sender with a relatively high measure of global reputation. For example, an attempt to confuse a recipient by utilizing a domain that is only slightly different from a highly reputable domain is detected. In some embodiments, based on the similarity analysis, a similarity component factor value is determined and the similarity component factor value is added, multiplied, subtracted, etc. to determine the measure of global reputation for the sender.

In some embodiments, the global reputation for the sender is determined by combining (e.g., averaging, adding, etc.) measures of local reputation (determined in 804) for the sender determined for each recipient of a group of different recipients to determine a combined measure (e.g., combined score).

At 804, a specific measure of local reputation for the sender is determined for each of one or more different recipients. For example, although the measure of global reputation determined in 802 may apply to any recipient that receives a message from the sender, the specific measure of local reputation is only applicable to a specific recipient. In one example, one recipient may have a different relationship to a sender than another recipient (e.g., existing business relationship) and interest/relevance of a message from the sender may be different for different recipients and this difference is reflected as a different measure of local reputation for each different recipient. In some embodiments, the one or more different recipients include the user in 702 of the process of FIG. 7. In some embodiments, the recipient represents a network/Internet domain and the measure of local reputation corresponds to all individual recipients of the domain. For example, the determined measure of local reputation for a recipient domain is applicable to all recipient email addresses within the domain. In some embodiments, the measure of local reputation for the sender is specific to an individual recipient address.

In some embodiments, the recipient is one of a plurality of recipients in a list of recipients to be analyzed to predetermine the local reputation of the sender for the specific recipient. The list of recipients may correspond to the recipients/email servers accessible (e.g., list of email domains being managed) by an analysis server. In some embodiments, each email server of each recipient performs its own determination of its measure of local reputation for the sender. In some embodiments, the measure of local reputation is determined dynamically. For example, when a recipient receives a message from the sender, the recipient determines the measure of local reputation for the sender.

In some embodiments, the measure of local reputation indicates a measure that the sender is likely to send a message that is of value to a specific recipient. For example, a higher measure of reputation indicates a higher likelihood that an authentic message sent by the sender will not include malicious and/or undesired content (e.g., message will not include a virus, malware, spam, etc.) for the specific recipient. In some embodiments, determining the measure of local reputation includes determining one or more factors to be utilized to determine a total measure of local reputation. For example, each determined factor may be utilized to add, subtract, or multiply a value to/from the measure of local reputation to determine the total measure of local reputation. In some embodiments, machine learning or another automated process is utilized to determine the measure of local reputation based on gathered/generated information about the sender.

In some embodiments, determining the measure of local reputation for the sender includes determining whether an identifier of the sender (e.g., domain name, subdomain, IP address) is included in a list of senders known to be reputable for the recipient. For example, there exists a predetermined list of entities and their associated identifiers that are known to be reputable for the specific recipient. If the identifier of the sender is included in the predetermined list, the resulting measure of local reputation would be higher than otherwise. In some embodiments, determining the measure of local reputation for the sender includes determining whether an identifier of the sender is included in a list of senders known to be not reputable for the specific recipient. For example, there exists a list of IP addresses associated with a server that are known to be commonly utilized to send spam messages and in the event an IP address associated with the sender is included in this list, the determined measure of local reputation would be lower than otherwise. Whether the identifier of the sender is included in the list of senders known to be reputable or not reputable may be utilized to determine a component factor value utilized to determine the measure of local reputation of the sender.

In some embodiments, determining the measure of local reputation for the sender includes determining a category of business associated with an entity of the sender with respect to a property of the specific recipient. For example, businesses in certain categories (e.g., banking) may be associated with a higher reputation than businesses in other categories (e.g., digital marketing) with respect to the category of business of the recipient (e.g., recipient is also in banking). In some embodiments, a reputation component factor (e.g., value to be added, multiplied, or subtracted to/from total score measure) associated with the identified category/line of business with respect to the recipient may be utilized in determining the measure of local reputation In some embodiments, determining the measure of local reputation for the sender includes analyzing domain registration history and Domain Name Service (i.e., DNS) activity of the sender with respect to a property of the recipient. For example, it may be typical for certain recipients to be in communication with senders that utilize a domain for a short period of time while for other recipients it is not typical. In some embodiments, determining the measure of local reputation includes utilizing a component factor value determined based on the domain registration history and DNS activity analysis (e.g., add, multiply, subtract, etc. using the factor value). For example, the factor value is based at least in part on a length of time since registration of a domain of the sender, an amount of time between registration of the domain and a first use of the domain to send a message, Internet content (e.g., webpage) located at a URI utilizing the domain of the sender, an entity that registered the domain of the sender, etc.

In some embodiments, determining the measure of local reputation for the sender includes analyzing historical statistics and/or a history of messages sent by the sender for the specific recipient domain or individual recipient addresses. For example, there exists a repository of previous messages sent by the sender to the recipient (e.g., messages stored at a recipient message server of the recipient) and the repository of messages is analyzed to determine one or more of the following: an amount/volume/rate of messages sent by the sender, a number/breadth of different individual users of the recipient (e.g., number of different email addresses of recipient) that received messages from the sender, a distribution of messages sent to different individual users of the recipient, a length of time the sender has been sending messages to the recipient, a regularity that the sender has been sending messages to the recipient (e.g., difference in average number of messages per time period), a type of content of messages sent by the sender to the recipient, a difference/regularity between content of messages sent by the sender to the recipient, amount/rate of content opened/viewed by the recipient of messages sent by the sender, a number/rate of messages sent by the sender that have been identified as malware, spam, and/or a virus by an analysis/filter/scanner tool, etc. The historical analysis may be performed using machine learning. In some embodiments, based on the historical analysis, a historical analysis component factor value is determined and the historical analysis component factor value is added, multiplied, subtracted, etc. to determine the measure of local reputation of the sender for the recipient.

In some embodiments, determining the measure of local reputation for the sender includes determining whether an identifier of the sender is similar to an identifier of another sender and/or an identifier of the recipient. For example, it is determined whether a domain of the sender is similar to a domain of another sender or a domain of the recipient. Determining whether an identifier of the sender is similar to an identifier of another sender or the recipient may include determining whether an identifier of the sender is similar to an identifier of another sender with a relatively high measure of local reputation for the recipient. For example, an attempt to confuse a user by utilizing a sender domain that is only slightly different from a highly reputable domain for the recipient is detected. In some embodiments, an attempt to confuse a user by utilizing a sender domain that is only slightly different from a domain of the recipient is detected (e.g., detect trying to mimic an intra-organization message). In some embodiments, based on the similarity analysis, a similarity component factor value is determined and the similarity component factor value is added, multiplied, subtracted, etc. to determine the measure of local reputation of the sender for the recipient.

At 806, a global sender model for the sender is determined. For example, the sender model may be utilized to determine whether a message that indicates a sender was actually sent by the indicated sender. In some embodiments, the sender model identifies one or more properties that are characteristic of a message that is sent by the sender. In some embodiments, the sender model associates the sender with one or more IP addresses of message servers that are known or authorized to send messages for the sender. For example, an IP address of a last server that sent a message is a reliable identifier that indicates an origin of the message and this IP address information is utilized to determine whether the last server that sent the message corresponds to the sender identified in the message. In some embodiments, the sender model includes directly provided information. For example, a list of IP addresses of servers that send messages for the sender is received from a user, the sender, or a published source of information about the sender. In some embodiments, at least a portion of the sender model is determined using message authentication/validation information about the sender. For example, IP addresses associated with a domain of the sender are obtained using standardized message authentication/validation systems (e.g., using Domain-based Message Authentication (DMARC), DomainKeys Identified Mail (DKIM), Sender Policy Framework (SPF), etc.).

In some embodiments, the sender model is automatically determined. For example, using one or more repositories storing messages received from the sender, a list of server IP addresses authorized or historically known to send messages for the sender is automatically determined. The one or more repositories may include a message store of a plurality of different recipients (e.g., different recipient message servers managed by an analysis server) and external message sources (e.g., information from third-party sources that gather message information). Machine learning may be utilized to automatically detect sources of and properties that are characteristic of authentic messages from the sender using historical information about messages previously sent by or on behalf of the sender. In some embodiments, an IP address is automatically associated with the sender in the sender model if it is detected that a message likely/verified to be sent by the sender was sent from the IP address. In some embodiments, before an IP address is associated with the sender, the sender must have sent a message from the IP address at least a threshold number of times. In some embodiments, a message is determined to have been sent by the sender if the message was validated using an email authentication/validation system and/or sent from the IP address that has been utilized to send messages identified as being sent by the sender for at least a threshold amount of time and/or a threshold number of times. Other factors may be utilized to verify whether a message in a repository was sent by the sender prior to using IP address information of the message in determining the sender model of the sender.

In some embodiments, an IP address is only added to the sender model to be associated with the sender in the event the IP address has been determined to be consistent for the sender. For example, a history of senders associated with the IP address is analyzed and the IP address is only associated with the sender if the IP address is not already associated with another sender, has not been associated with another sender for at least a threshold amount of time, and/or the number of different previous senders that have been with associated with the IP address is less than a threshold number.

In some embodiments, the sender model identifies one or more blocks of adjacent IP addresses that are authorized or historically known to send messages on behalf of the sender. These blocks of adjacent IP addresses may be owned or be under the control of a single administrative entity or domain or may be detected to exhibit similar sending behavior. The block of adjacent IP addresses may be specified by a user, a sender, an administrator, and/or a source of published information about the sender or a provider authorized by the sender. In some embodiments, one or more blocks of adjacent IP addresses to be included in the sender model are automatically determined. For example, once one or more IP addresses within a block of adjacent IP addresses have been associated with a sender model, the entire block of adjacent IP addresses may be associated with the sender model if they are determined or expected to exhibit similar message sending behavior.

In some embodiments, the sender model identifies a network/Internet domain that is common to all hostnames of servers that are authorized or historically known to send messages on behalf of the sender. The servers that share this network/Internet domain may be owned or be under the control of a single administrative entity or domain or may be detected to exhibit similar sending behavior. The network/Internet domain may be specified by a user, a sender, an administrator, and/or a source of published information about the sender or a provider authorized by the sender. In some embodiments, the network/Internet domain to include within the sender model is automatically determined. For example, once one or more IP addresses whose hostnames share an organizational network/Internet domain have been associated with a sender model, all servers whose hostnames share that network/Internet domain may be associated with the sender model if they are determined or expected to exhibit similar message sending behavior.

In some embodiments, the sender model identifies one or more autonomous system numbers (i.e., ASN) associated with servers that are authorized or historically known to send messages on behalf of the sender. For example, an ASN identifies a collection of IP routing prefixes owned by or under the control of a single administrative entity or domain and the ASN associated with the sender is specified in the sender model. The ASN associated with the sender may be specified by a user, a sender, an administrator, and/or a source of published information about the sender. In some embodiments, the ASN associated with the sender is automatically determined. For example, once one or more IP addresses associated with a sender model have been identified, the ASN(s) associated with the IP addresses may be associated with the sender if they are determined or expected to exhibit similar message sending behavior.

The determined or specified sender model associated with a sender may be stored in a data structure such as a list, a database, a table, or any other data structure that can be indexed based on an identifier of the sender.

At 808, a specific sender model for the sender is determined for each of one or more recipients, if applicable. For example, although the sender model determined in 806 may apply to any recipient, the specific sender model is only applicable to a specific recipient. In one example, one recipient may receive a message from the sender via a different set of sending message servers than another recipient due to geographical location differences between the recipients. In some embodiments, the recipient represents a network/Internet domain and the recipient specific sender model corresponds to all individual recipients of the domain. In some embodiments, the recipient specific sender model is specific to an individual recipient address. In some embodiments, the recipient specific sender model is determined in a similar manner as the sender model determined in 806 except for utilizing data specific to the recipient rather than various different recipients. For example, using a repository storing messages received from the sender to only the recipient, individual or neighborhoods of IP addresses associated with the sender model for a sender are automatically determined.

Figure 9:
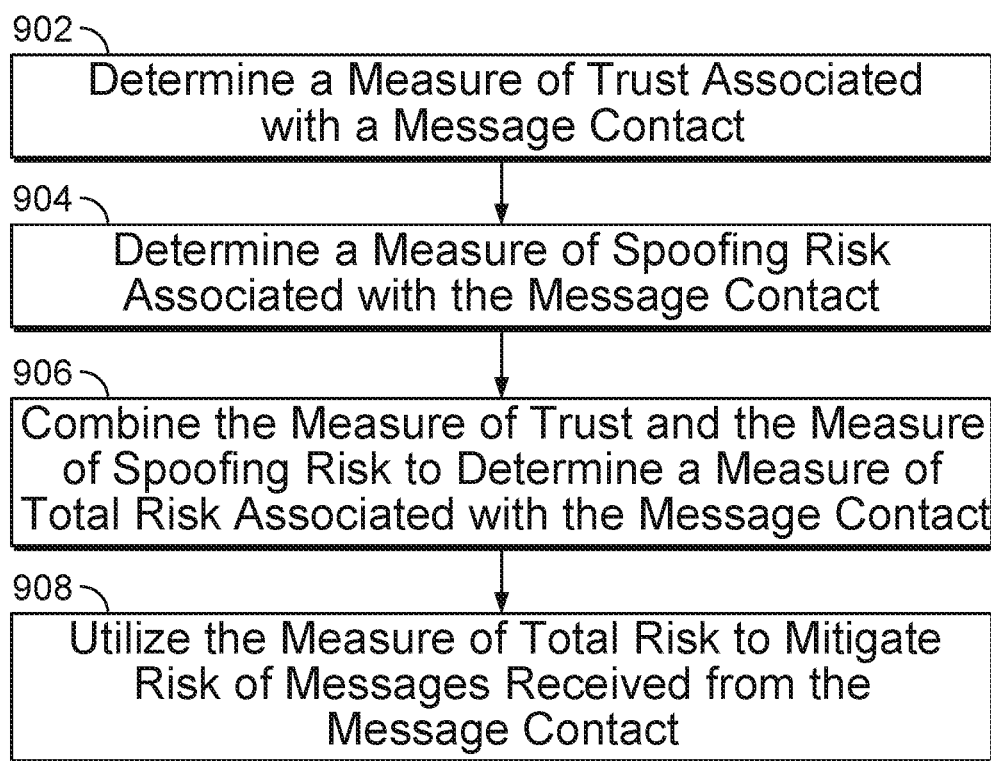
FIG. 9 is a flowchart illustrating an embodiment of a process for determining a total risk measure of a contact.

FIG. 9 is a flowchart illustrating an embodiment of a process for determining a total risk measure of a contact. The process of FIG. 9 may be at least in part implemented on analysis server 102, gateway 110, and/or message server 106 of FIG. 1. At least a portion of the process of FIG. 6 may be performed in one or more steps of the process of FIG. 2 (e.g., in 206).

At 902, a measure of trust associated with a message contact (e.g., sender of a message) is determined. In some embodiments, the measure of trust (e.g., numerical value) indicates a measure that the message contact is likely to send a message that is of value to a recipient/user. For example, a higher measure of trust indicates a higher likelihood that an authentic message sent by the contact will not include malicious and/or undesired content (e.g., message will not include a virus, malware, spam, impersonation attack, etc.). The measure of trust may be for a domain of the message contact that covers all messages of the same domain, a group of domains (e.g., domains of similar category), a group of contact addresses, or a specific contact address (e.g., email address). In some embodiments, the measure of trust is for a specific recipient/user. For example, the measure of trust indicates a measure of trust between the message contact and a specific recipient/user. In this example, the measure of trust may be determined based on a history of interaction between the message contact and the specific user.

In some embodiments, the measure of trust is determined at least by a portion of the process of FIG. 8. For example, the measure of trust is the specific measure of local reputation determined in 804. In another example, the measure of trust is the measure of global reputation included in the global sender model determined in 806. In another example, the measure of trust is determined based on a combination (e.g., average, sum, product, etc.) of the measure of global reputation and the specific measure of local reputation.

At 904, a measure of spoofing risk associated with the message contact is determined. For example, a likelihood that a spoofing attack could be technically carried out to spoof the message contact is determined. The measure of spoofing risk may be for a domain of the message contact that covers all messages of the same domain, a group of domains, a group of contact addresses, or a specific contact address (e.g., email address). The measure of spoofing risk may be a numeric score corresponding to the spoofing risk associated with the message contact.

An organization with a published and complete Domain-based Message Authentication, Reporting and Conformance (i.e., DMARC) policy has a low risk of being spoofed, as does each user account associated with such an organization. An organization that has a DMARC policy but which does not reject all messages that fail corresponds to a medium risk, as do users of such an organization. An organization without a DMARC policy or one that only involves monitoring and no rejection is associated with a high risk of being spoofed, as are users of such an organization. For example, if the message contact is associated with a DMARC policy that requires every message of the domain of the message contact to be signed with a digital signature, the measure of spoofing risk is assigned a low risk value. If the message contact is associated with a DMARC policy that enables but does not require every message of the domain of the message contact to be signed with a digital signature, the measure of spoofing risk is assigned a medium risk value. If the message contact is not associated with a DMARC policy, the measure of spoofing risk is assigned a high risk value. Thus, determining the measure of spoofing risk associated with the message contact may include assigning a score based on the DMARC or other message validation system policy associated with the message contact.

At 906, the measure of trust and the measure of spoofing risk are combined to determine a measure of total risk associated with the message contact. For example, the measure of trust and the measure of spoofing risk are multiplied together to determine the measure of total risk. In another example, the measure of trust and the measure of spoofing risk are averaged together to determine the measure of total risk. In another example, the measure of trust and the measure of spoofing risk are summed together to determine the measure of total risk. Thus, the measure of total risk is able to measure the threat of the message contact being impersonated, both in terms of the likely impact to the recipient (e.g., measure of trust provides a gauge on the likelihood the message recipient is likely to confuse the spoofed message as a message from a highly trusted and important contact) and the likelihood of technical feasibility (e.g., measure of spoofing risk provides a gauge on the measure of technical feasibility). In some embodiments, the measure of trust and the measure of spoofing risk may be each weighted before being combined. In some embodiments, the determined measure of total risk is stored in a data structure and associated with the message contact.

At 908, the measure of total risk is utilized to mitigate risk of messages received from the message contact. For example, when a message from the message contact is received, its measure of total risk for the sender of the message (e.g., message contact) is obtained and the measure of total risk is utilized to determine whether to filter and/or allow the message to be delivered. In an example, if a value of the measure of total risk is above a threshold value, the message is identified as a risk and the message is filtered to reduce its risk to the recipient.

Figure 10:
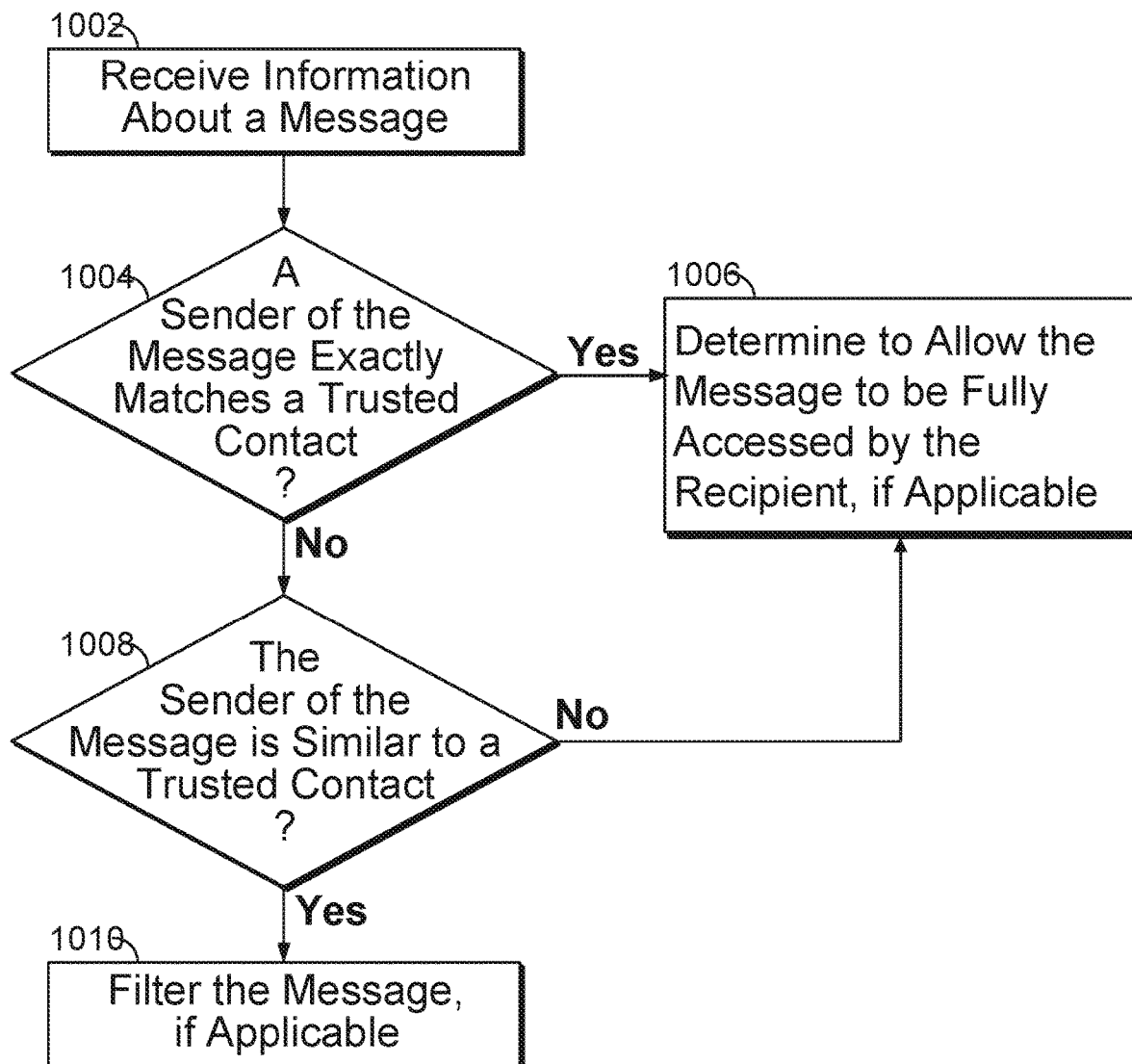
FIG. 10 is a flowchart illustrating an embodiment of a process for assessing a received message for filtering.

FIG. 10 is a flowchart illustrating an embodiment of a process for assessing a received message for filtering. The process of FIG. 10 may be at least in part implemented on analysis server 102, gateway 110, and/or message server 106 of FIG. 1. At least a portion of the process of FIG. 10 may be performed in 208, 210 and/or 212 of FIG. 2. At least a portion of the process of FIG. 10 may be performed in 306 of FIG. 3.

At 1002, information about a message is received. In some embodiments, the information is received at analysis server 102 of FIG. 1. The information may include information about a sender of the message. For example, the information includes email address header information including an email address and a display name of the sender of the message. In some embodiments, the information about the message includes contents of the message. Examples of the message include an electronic mail (i.e., email), an instant message, a chat message, and any other forms of electronic messages.

At 1004, it is determined whether a sender of the message exactly matches a trusted contact. For example, it is determined whether an address of the sender of the message (e.g., in a "From:" field of a message header) exactly matches an address of a trusted contact in a list of trusted contacts for the recipient of the message. In some embodiments, the trusted contacts include trusted contacts identified in 702 and/or 704 of FIG. 7. For example, a list of trusted contacts for the recipient of the message is obtained from storage and email addresses for each trusted contact of the list are compared with the email address of a sender of the message to identify whether there is an exact match.

If at 1004 it is determined that the sender of the message exactly matches the trusted contact, at 1006, it is determined to allow the message to be fully accessed by the recipient, if applicable. For example, because the sender of the message exactly matches the trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware. In some embodiments, the total risk score determined using 906 of FIG. 9 is utilized to determine whether to allow full access to the message. If a value of the measure of total risk of the sender is above a threshold value, the message is identified as a risk and the message is filtered as in 1010 to reduce its risk to the recipient.

If at 1004 it is determined that the sender of the message does not exactly match a trusted contact, at 1008, it is determined whether the sender of the message is similar to a trusted contact. For example, by determining whether the sender of the message is similar to a trusted contact, a likelihood of confusion by a recipient of the message that the message is from a trusted contact is determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 702 and/or 704 of FIG. 7. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

In some embodiments, it is determined that the sender of the message is similar to a trusted contact if any measure of similarity (e.g., string distance measure) meets a threshold value. For example, if any string distance measure determined for a list of trusted contacts is greater than a threshold value, the message is identified as potentially an impersonation attack message and it is determined that the sender of the message is similar to the trusted contact.

In some embodiments, messages that are highly authentic (e.g., associated with a valid DMARC signature, correct SPF records, or both) but which come from domains that are associated with low control are to be subject to increased analysis. For example, a measure of control of the domain of the sender is determined. The measure of control measures how easy it is to create an account of the domain without having to pass a careful screening. For example, any user is able to create a Google Gmail account by setting the username to any available user name and setting the display name to any correctly formed display name. Thus, domains correspond to a very low degree of control by the domain owner. In contrast, the typical enterprise or government entity has high control over account creation, allowing only employees and affiliates to create accounts, where these have to satisfy some common criteria related to the real-life identity of the user. When the message is identified as having high authenticity but low domain control, then the display name is to be scrutinized (e.g., compared to trusted display names using string distance as previously discussed), whereas for domains with high control, the display name is not scrutinized (e.g., display name impersonation detection not performed).

If at 1008 it is determined that the sender of the message is similar to a trusted contact, at 1010, it is determined to filter the message, if applicable. Filtering the message may include modifying at least a portion of the message, affecting delivery of the message, providing a notification regarding the message, and/or performing additional analysis on the message. An example of filtering the message is performing a security action.

In some embodiments, modifying at least a portion of the message includes modifying (e.g., replacing, adding or removing/deleting) data included in a data field (of the message) that includes an identification of the sender of the message. For example, the data field that is identified to include the identification of the sender is selected from a plurality of data fields of a message header and contents of the selected data field is modified. Examples of the identification of the sender includes a display name, an email address (e.g., "from" email address), a reply-to address, a phone number, an image, a content link, or any other identifier/identification of the sender specified in the message. The data field of the message may be included in a header of the message. For example, the data field of the message is a "From:" field, a "Reply-To:" field or a "Return-Path:" field of an email message header. In some embodiments, the message is a SMS message or a MMS message and a phone number of the sender in the data field is modified. For example, the sender phone number is removed or changed to a different number. In some embodiments, modifying data included in the data field includes modifying a location identifier of content associated with the sender of the message. For example, a URL to an image of the sender is modified to reference a different image (e.g., replacement image includes a warning message).

One example filtering is quarantining the message and sending an automated message to the email address in the "From:" field of the message regarding the quarantine. The automated email may require the recipient to click on a hyperlink that is unique and not predictable to an attacker. If the system determines that such a link was clicked on (e.g., by receiving a corresponding GET request), then the email may be taken out of quarantine and delivered.

Another example filtering is sending an automated email in response to the received message (e.g., whether to the address in the from field or a potential address in the 'reply-to' field or both), requiring the recipient to click on a hyperlink where he or she has to enter a code obtained from an authenticator module, such as a SecurID token or Google authenticator app. If the entered code is correct, the message is taken out of quarantine and delivered.

In an alternative embodiment, the received message is not quarantined but delivered to its recipient after being modified. For example, a warning message is added to one or more header fields and/or the body of the message (e.g., add warning message to subject of message, add warning message to modify sender address, etc.). In some embodiments, the received message is modified to change, remove, and/or censure at least a portion of the message (e.g., remove attachment, remove hyperlinks, remove/modify reply to address, etc.).

If at 1008 it is determined that the sender of the message is not similar to a trusted contact, the process returns to 1006. In an alternative embodiment, if at 1008, it is determined that the sender of the message is not similar to a trusted contact, the message is identified for filtering if the recipient of the message has never sent a message to the sender of the message. In some embodiments, the total risk score determined using 906 of FIG. 9 is utilized to determine whether to allow full access to the message. If a value of the measure of total risk of the sender is above a threshold value, the message is identified as a risk and the message is filtered in 1010 to reduce its risk to the recipient.

Figure 11A:
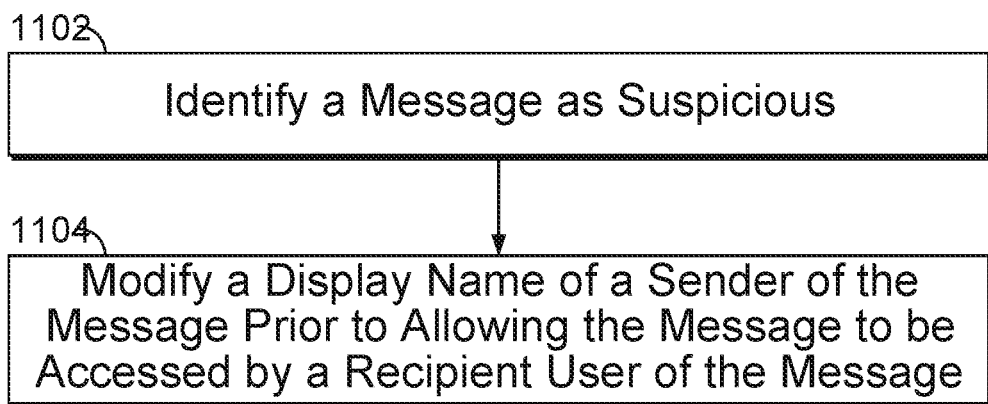
FIG. 11A is a flowchart illustrating an embodiment of a process for modifying a display name of a sender of the message.

FIG. 11A is a flowchart illustrating an embodiment of a process for modifying a display name of a sender of the message. The process of FIG. 11A may be at least in part implemented on analysis server 102, gateway 110, and/or message server 106 of FIG. 1. In some embodiments, at least a portion of the process of FIG. 11A is performed in filtering the message in 1006 and/or 1010 of FIG. 10. At least a portion of the process of FIG. 11A may be performed in 212 of FIG. 2. For example, 1104 of FIG. 11A is performed in 212 FIG. 2 as a selected security action to perform.

At 1102, a message is identified as suspicious. For example, it is identified in 708 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1104, a display name of a sender of the message is modified prior to allowing the message to be accessed by a recipient user of the message. For example, the display name of the sender is rewritten to include a warning regarding its risk. In one example, consider an email with display name "Pat Peterson," but not associated with an email address of a Pat Peterson that is considered trusted. This may cause the system to determine that the email is risky, and modify the display name to "Warning! Unknown user with the name Pat Peterson." Conversely, if an email is determined to come from a trusted sender, the system may modify the display name by adding symbol(s) (e.g., icon of a star) identifying its risk. In some embodiments, display names of senders in messages identified as not suspicious are normalized, which may involve removing anything looking like a trust indicator (e.g., such as an icon of a star) from the display name, or adding another symbol to the display name. Alternatively, a message from a user that is neither considered risky nor trusted could have its display name removed and replaced by only the message address of the sender (e.g., only email address without display name), drawing the attention of the recipient to the fact that this is a user with whom the system has not determined there to be a trust relationship. This may be particularly beneficial to users who use mail clients that do not display the full email address, but only show the display name.

In some embodiments, in addition to or instead of the display name, an email address of the sender is also modified. For example, the entire "From:" field of a header of the message that includes both the display name and an email address is modified with a warning.

Figure 11B:
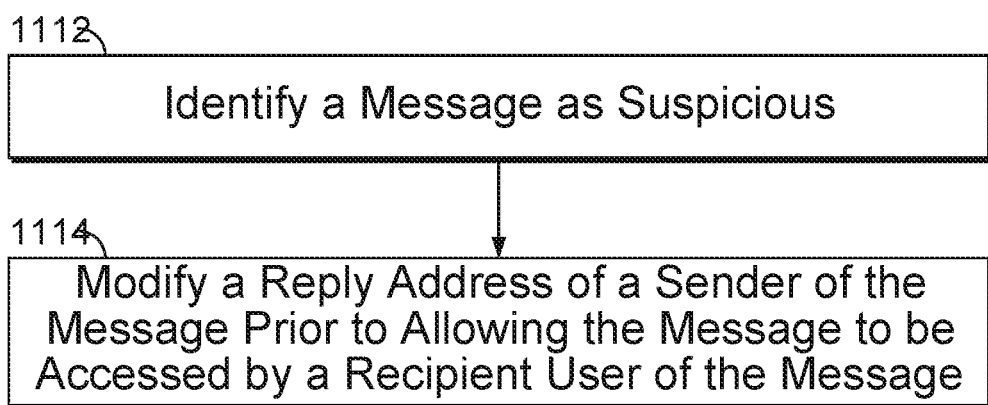
FIG. 11B is a flowchart illustrating an embodiment of a process for modifying a reply address of a sender of the message.

FIG. 11B is a flowchart illustrating an embodiment of a process for modifying a reply address of a sender of the message. The process of FIG. 11B may be at least in part implemented on analysis server 102, gateway 110, and/or message server 106 of FIG. 1. In some embodiments, at least a portion of the process of FIG. 11B is performed in filtering the message in 1006 and/or 1010 of FIG. 10. At least a portion of the process of FIG. 11B may be performed in 212 of FIG. 2. For example, 1104 of FIG. 11B is performed in 212 FIG. 2 as a selected security action to perform.

At 1112, a message is identified as suspicious. For example, it is identified in 508 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1114, a reply address of a sender of the message is modified prior to allowing the message to be accessed by a recipient user of the message. In the event where the message does not have a reply address, a "Reply-To:" field is automatically added to the message. This can be a real email address, different from the "from" address of the received message, and act as a quarantine for outgoing responses to high-risk emails. In such a quarantine, the recipient system can carefully verify (e.g., whether automatically or using manual effort, or a combination thereof) that the outgoing message is safe before it is automatically sent to the "from" address of the received email.

In some embodiments, an address in a "Reply-To:" field of an email header is replaced or inserted with a warning message (e.g., not a valid reply address) regarding the suspicious risk of the message. In one example, the "reply to" address of a message is replaced/created as "Warning! This is a user you have never sent an email to—If you want to proceed, remove this text from the recipient field of the email you want to send, and add the address of the recipient you wish to send it to." This reply address will cause a pop-up on some message clients with the text above (e.g., and an error stating that it is not a valid email address) or may cause on some message clients to bounce the email.

Figure 12:
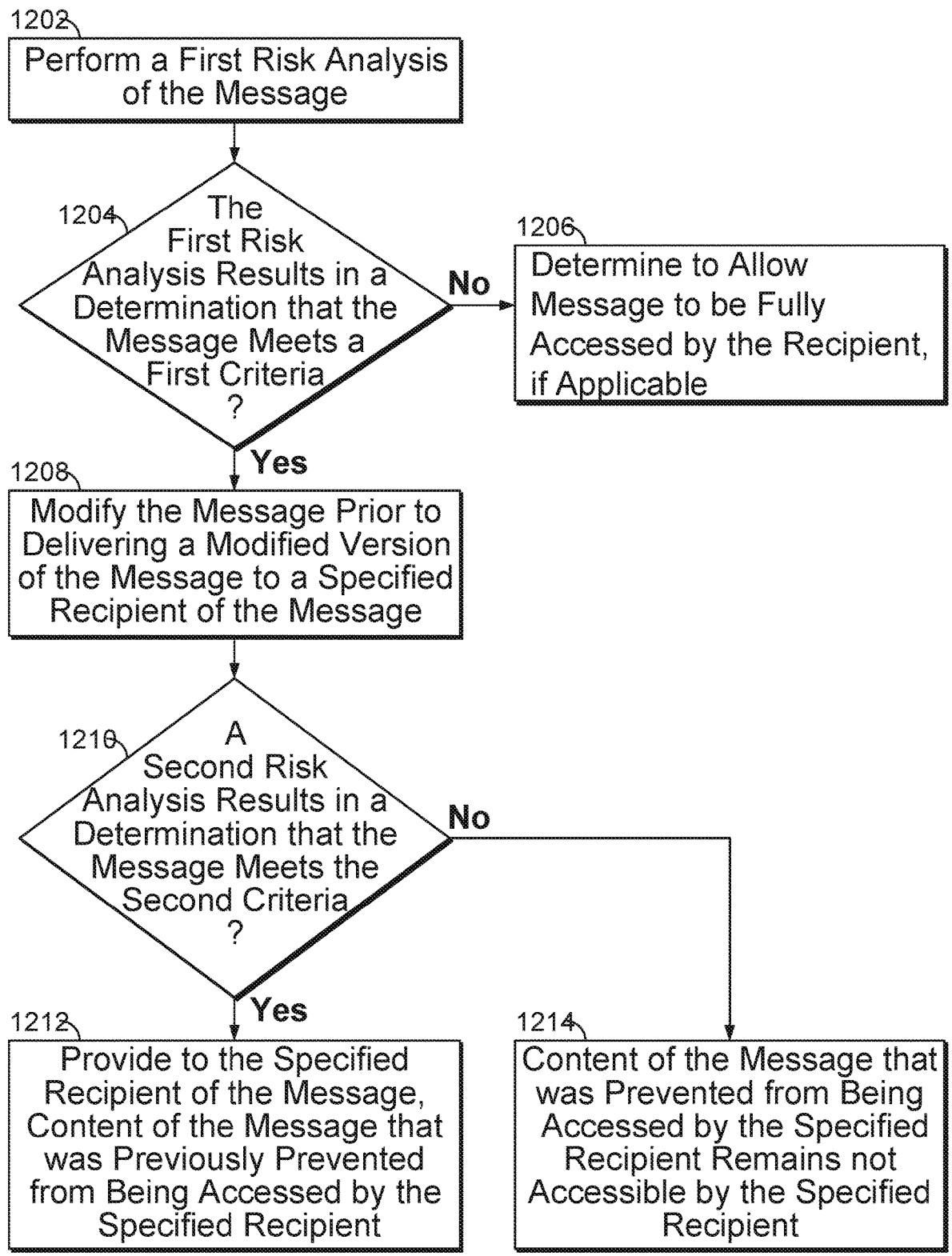
FIG. 12 is a flowchart illustrating an embodiment of a process for securing a message.

FIG. 12 is a flowchart illustrating an embodiment of a process for securing a message. The process of FIG. 12 may be at least in part implemented on analysis server 102, gateway 110, and/or message server 106 of FIG. 1. In some embodiments, at least a portion of the process of FIG. 12 is performed in filtering the message in 1006 and/or 1010 of FIG. 10. At least a portion of the process of FIG. 12 may be performed in 208, 210 and/or 212 of the process of FIG. 2. At least a portion of the process of FIG. 12 may be performed in 306 of the process of FIG. 3.

At 1202, a first risk analysis of the message is performed. For example, it is determined whether the message is suspicious. In some embodiments, steps 1004 and/or 1006 of FIG. 10 is performed in 1202. For example, it is determined whether the sender of the message is similar to a trusted contact. By determining whether the sender of the message is similar to a trusted contact, a likelihood of confusion by a recipient of the message that the message is from a trusted contact may be determined. In some embodiments, the determining whether the sender of the message is similar to a trusted contact includes determining a measure of similarity between the sender of the message and each contact in a list of trusted contacts. In some embodiments, the list of trusted contacts includes trusted contacts identified in 702 and/or 704 of FIG. 7. For example, a list of trusted contacts for the recipient of the message (e.g., recipient identified in a "To:" field of the message) is obtained from storage.

In some embodiments, determining the measure of similarity includes determining a string similarity measure (e.g., string distance) using a string matching algorithm (e.g., Jaro-Winkler). For each trusted contact in a group of trusted contacts, string similarity measures may be determined between an address of the trusted contact and/or a display name of the trusted contact with an address of the sender of the message (e.g., string in a "From:" field of the message between "<" and ">" characters), a display name of the sender of the message (e.g., string in a "From:" field of the message prior to "<" character), and/or a subject of the message. For example, potentially six string similarity measures may be determined for each trusted contact email/display name combination (e.g., trusted contact address compared to sender address, trusted contact address compared to sender display name, trusted contact address compared to message subject, trusted contact display name compared to sender address, trusted contact display name compared to sender display name, and trusted contact display name compared to message subject).

Comparison of the subject to the message to the trusted contact address/display name is performed to detect masquerade attempts in which the actual sender uses deceptive display names and/or subject lines to trick recipients that emails are from a trusted sender. For example, the sender joe123@gmail.com may set his display name to appear as a subject line, and use a subject line that appears as a from email address. This attacker may use the display name "Please review this material and let me know your thoughts. Fwd: slide deck, June 15 version," and the subject line "Bob Bigboss <bbigboss@bigbossventures.com>" to an email. The display name, being very long, will often hide the attacker's email address (e.g., which is displayed after the display name for a typical mail client, or not displayed at all for some mail clients). Many recipients will not realize that the subject line appears where the sender address is normally shown, and vice versa. Therefore, such recipients will believe that the email comes from Bob Bigboss <bbigboss@bigbossventures.com>, despite it being displayed in the subject field. In some embodiments, the subject of the message is only utilized to perform the determination of the measure of similarity if the display name of the sender of the email is longer than a threshold length.

In some embodiments, prior to performing the string comparison to determine the measure of similarity, element portions of the strings are sorted (e.g., alphabetically sorted) based on a predetermined order. The element portions of the string may be delimited by a space character or other special characters (e.g., comma, period, etc.). For example, strings "Bob Bigboss" and "Bigboss Bob" may be determined to be not similar in string distance despite them being a simple reversal of the order of the first/last names. Thus, the element portions "Bob" "Bigboss" in "Bob Bigboss" can be alphabetically sorted as "Bigboss Bob" prior to being used in the string comparison.

In some embodiments, determining the measure of similarity includes detecting use of substitution characters that mimic corresponding traditional alphabet/number characters in the sender address, sender display name, and/or subject of the message prior to comparison with identifiers of the trusted contact. For example, an attacker may use substitution characters to visually mimic a character in an identifier of a trusted contact (e.g., replace "o" with zero, replace with Cyrillic letter, replace with Greek letter, replace with symbol resembling a traditional letter/number, etc.). In some embodiments, if substitution characters are detected, various versions of the sender address, sender display name, and/or subject of the message that replace one or more different combinations of substitution characters with corresponding traditional characters are generated and utilized in the string comparisons with the identifiers of the trusted contacts.

At 1204, it is determined whether the first risk analysis results in a determination that the message meets a first criteria. For example, it is determined whether the message meets a criteria to be deemed suspicious. In some embodiments, message meets the first criteria if a measure of similarity (e.g., string distance measure) meets a threshold value. For example, if any string distance measure determined for a list of trusted contacts (e.g., determined in 1202) is greater than a threshold value, the message is identified as potentially an impersonation attack message and it is determined that the message meets the first criteria.

In some embodiments, the message meets the first criteria if a sender of the message has not previously sent a message to a recipient identified in the message. In some embodiments, the message meets the first criteria if a recipient identified in the message has not previously sent a message to the sender of the message. In some embodiments, the message meets the first criteria if a spam detector, a virus detector, and/or a malware detector has detected that the message includes a spam, virus or malware.

In some embodiments, a total risk score determined using 906 of FIG. 9 is utilized to determine whether message meets the first criteria. For example, if a value of the measure of total risk of the sender is above a threshold value, the message is identified as meeting the first criteria.

If at 1204 it is determined that the message does not meet the first criteria, at 1206 it is determined to allow the message to be fully accessed by the recipient, if applicable. For example, because the sender of the message exactly matches the trusted contact or sender of the message is not similar to any trusted contact, the message is allowed to be delivered (e.g., by sending the message to a mail delivery server and indicating that the message is allowed to be delivered) to the recipient user. In some embodiments, the message is allowed to be accessed by the recipient without message filtering that would otherwise be performed if the message was identified as potentially a part of an impersonation attack. In some embodiments, the message is further analyzed prior to allowing it to be fully accessed by the recipient. For example, the message may be analyzed to identify whether it includes a virus, a spam, or a malware.

If at 1204 it is determined that the message does meet the first criteria, at 1208 the message is modified prior to sending a modified version of the message to a specified recipient of the message. For example, a warning message is added to one or more header fields and/or the body of the message (e.g., add warning message to subject of message, add warning message to modify sender address, etc.). The first risk analysis is performed before sending the modified version of the message. Sending the modified version may include delivering the modified version to the specified recipient (e.g., deliver to a mailbox of the specified recipient on server 106 of FIG. 1).

In some embodiments, modifying at least a portion of the message includes modifying (e.g., replacing, adding or removing/deleting) data included in a data field of the message that includes an identification of the sender of the message (e.g., modify an identifier of the sender). Examples of the identification of the sender includes a display name, an email address (e.g., "from" email address), a reply-to address, or any other identifier/identification of the sender specified in the message. The data field of the message may be included a header of the message. For example, the data field that includes the identification of the sender is a "From:" field, a "Reply-To:" field or a "Return-Path:" field of an email message header. The contents of the data field may be modified to provide a warning to a recipient, prevent a potential confusion of an identity of the sender of the message by the recipient of the message and/or prevent the recipient from responding to the message or sending a message to the sender of the message.

In some embodiments, the received message is modified to change, remove, and/or censure at least a portion of a content of the message (e.g., remove attachment, remove hyperlinks, remove a portion of the message content beyond a selected beginning body portion, etc.). For example, a message body section of an email message is modified to censure at least a portion of a content of the email message. In some embodiments, modifying the message includes inserting an inquiry associated with a verification of the sender of the message, wherein the inquiry requests a user response.

At 1210, a second risk analysis of the message is performed and it is determined whether the second risk analysis results in a determination that the message meets the second criteria. In some embodiments, the modified version of the message is sent to the specified recipient of the message (e.g., sent to a mailbox of the specified recipient on server 106 of FIG. 1) prior to a conclusion of the second risk analysis. For example, the modified version of the message is sent and delivered to a mailbox of the specified recipient of the message prior to the conclusion of the second risk analysis. In some embodiments, the second risk analysis concludes upon determination of whether the second risk analysis results in a determination that the message meets the second criteria.

In some embodiments in 1210, any of a plurality of different types of verification/security actions may be performed to further analyze and verify the message (e.g., verify an identity of the sender of the message). For example, it is determined whether a classification of the sender of the message requested and received from the specified recipient of the message matches an automatically identified classification of the sender, and it is determined the message meets the second criteria if a user response to the requested classification matches the automatically identified classification (e.g., see the process of FIG. 13A). In another example, an automatically generated reply message to a received message is sent the sender of the received message requesting verification of an identity of the sender of the message and it is determined the message meets the second criteria if the sender has provided a valid identity in response to the reply message (e.g., see the process of FIG. 14A).

If at 1210 it is determined that the second risk analysis results in a determination that the message meets the second criteria, at 1212, content of the message that was previously prevented from being accessed by the specified recipient is provided to the specified recipient of the message. The second risk analysis may be a more in-depth and/or resource intensive analysis of the message reserved for messages that fail the first risk analysis. For example, an original version of the message prior to the modification in 1208 is sent to the specified recipient of the message. This original version may be a duplicate message in addition to the initially provided modified version of the message (e.g., original version delivered as a new message to the specified recipient) or this original version may be a replacement message of the initially provided modified version of the message (e.g., initially provided modified message is deleted from mailbox of the specified recipient of the message and replaced with the original version). In some embodiments, the content of the message that was previously prevented from being accessed is included a new message sent to the specified recipient of the message.

If at 1210 it is determined that the second risk analysis results in a determination that the message does not meet the second criteria, at 1214 content of the message that was prevented from being accessed by the specified recipient remains not accessible by the specified recipient. In some embodiments, the message is deleted or quarantined. For example, after a period of time of message not meeting the second criteria and/or if it is determined during the second risk analysis that the message is potentially hazardous to a specified recipient of the message, the message is automatically deleted or quarantined to prevent access by the specified recipient to the entire message. In some embodiments, a notification is provided to an administrator. For example, the administrator is provided a warning about the message failing the second risk analysis.

Figure 13A:
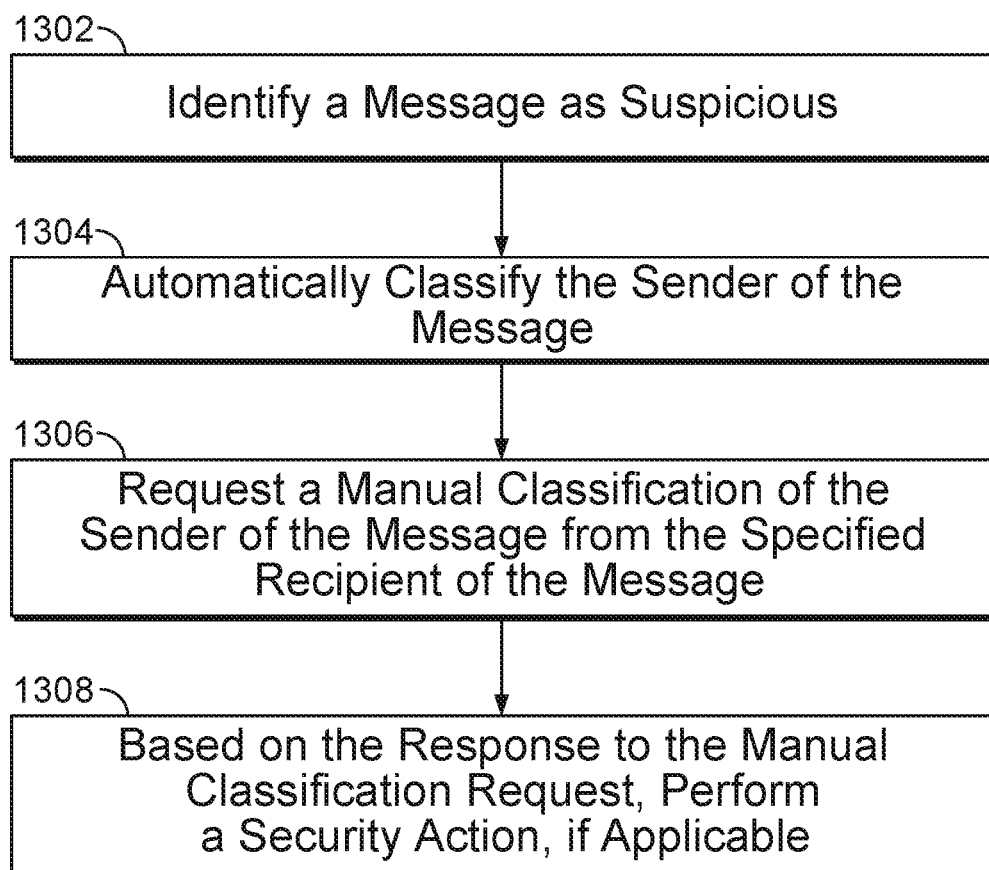
FIG. 13A is a flowchart illustrating an embodiment of a process for detecting misrecognition of a sender of a message by a recipient of the message.

FIG. 13A is a flowchart illustrating an embodiment of a process for detecting misrecognition of a sender of a message by a recipient of the message. The process of FIG. 13A may be at least in part implemented on analysis server 102, gateway 110, and/or message server 106 of FIG. 1. In some embodiments, at least a portion of the process of FIG. 13A is performed in one or more steps of the process of FIG. 2 and/or one or more steps of the process of FIG. 3. In some embodiments, at least a portion of the process of FIG. 13A is performed in one or more steps of the process of FIG. 12. For example, at least a portion of the process of FIG. 13A is performed in performing the first and/or second risk analysis of the process of FIG. 12.

At 1302, a message is identified as suspicious. For example, it is identified in 1008 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

In some embodiments, by basing the whether the message is suspicious on knowledge about trusted contacts of the specified recipient of the message, a message is only classified as suspicious and risky based on the likelihood that the recipient will confuse the sender with a trusted contact specific to the recipient. Otherwise, the risk may be marginal if the recipient does not know or trust the sender of the message since the sender is likely not impersonating someone that the recipient already knows. Thus a message is particularly dangerous if it is not from a trusted party, but the recipient thinks it is. In contrast, if the recipient knows that an email from an untrusted party is from an untrusted party, he or she is not as much at risk as he or she is not likely to feel compelled to comply with the requests or instructions in the message At 1304, the sender of the message is automatically classified. In some embodiments, classifying the sender includes identifying a classification/category of the sender. For example, a relationship classification/category of the sender with respect to the specified recipient of the message is automatically determined based on a property of an identifier of the sender (e.g., domain), previous message history between the sender and recipient, and/or other list or database (e.g., database of business contacts of the recipient). Examples of the classification of the sender include a college, a business partner, a friend/acquaintance, or unknown.

For example, if the sender is associated with the same domain as the recipient, then the sender is classified as a colleague classification. This classification may also be used if the email address of the sender is a known personal email address of a user with a colleague message address. This personal address may be determined using manual registration of such addresses by the account owner, as well as by identification of message traffic indicative of a work account being related to a personal account, such as having closely related display names and extensive forwarding of material from one account to the other. If the sender is a service provider or a client of an entity associated with the recipient, then the sender is classified as a business partner classification. This type of classification may be identified by detection of a sufficient volume of message traffic over time between the sender and the recipient, or from a database/list of recorded business contacts/relationships. In some embodiments, the sender is classified as a friend/acquaintance classification for a given sufficient volume of message traffic over time between the sender and the recipient but cannot be classified as a colleague or a business partner. If the sender cannot be classified as a colleague, business partner, or friend/acquaintance, the sender is classified as known/stranger.

In some embodiments, the sender of the message is automatically classified based on a list of trusted contacts tracked for the recipient (e.g., tracked using the process of FIG. 7). For example, a trusted contact in the stored list of trusted contacts may be associated with a classification identifier provided by a user and/or automatically determined. An identifier of the sender of the email may be utilized to locate a corresponding entry in the stored list of trusted contacts to identify its classification.

At 1306, a manual classification of the sender of the message is requested from the specified recipient of the message. For example, before the message is fully provided to the recipient, a classification of the sender of the message is requested from the user in order to verify the recipient's believed classification of the sender as compared to the automatically determined classification. In some embodiments, the message is modified to change, remove, or obfuscate (e.g., remove attachment, remove hyperlinks, hide phone numbers, only retain a beginning portion of contents of the message and hide ending portion of the message, etc.) at least a portion of the message to prevent the recipient from having full access to the message prior to verification of the recipient's knowledge about the sender of the message. In some embodiments, the message is modified to include selection choices corresponding to the classification options (e.g., different selectable HTML hyperlinks included in the message and selection of a particular hyperlink option sends a request to the unique address of the hyperlink that can be detected by a server to identify which classification option was selected based on the unique address of the request corresponding to the selection option). In some embodiments, if a recipient replies to the message to the sender prior to providing the classification, the reply message is held/quarantined at a mail server until it is determined that it is safe to send the message. Another classification option is to identify the sender as a spammer or malware attacker. Selection of this classification may result in the removal of the email and blocking of future messages from the sender.

Figure 13B:
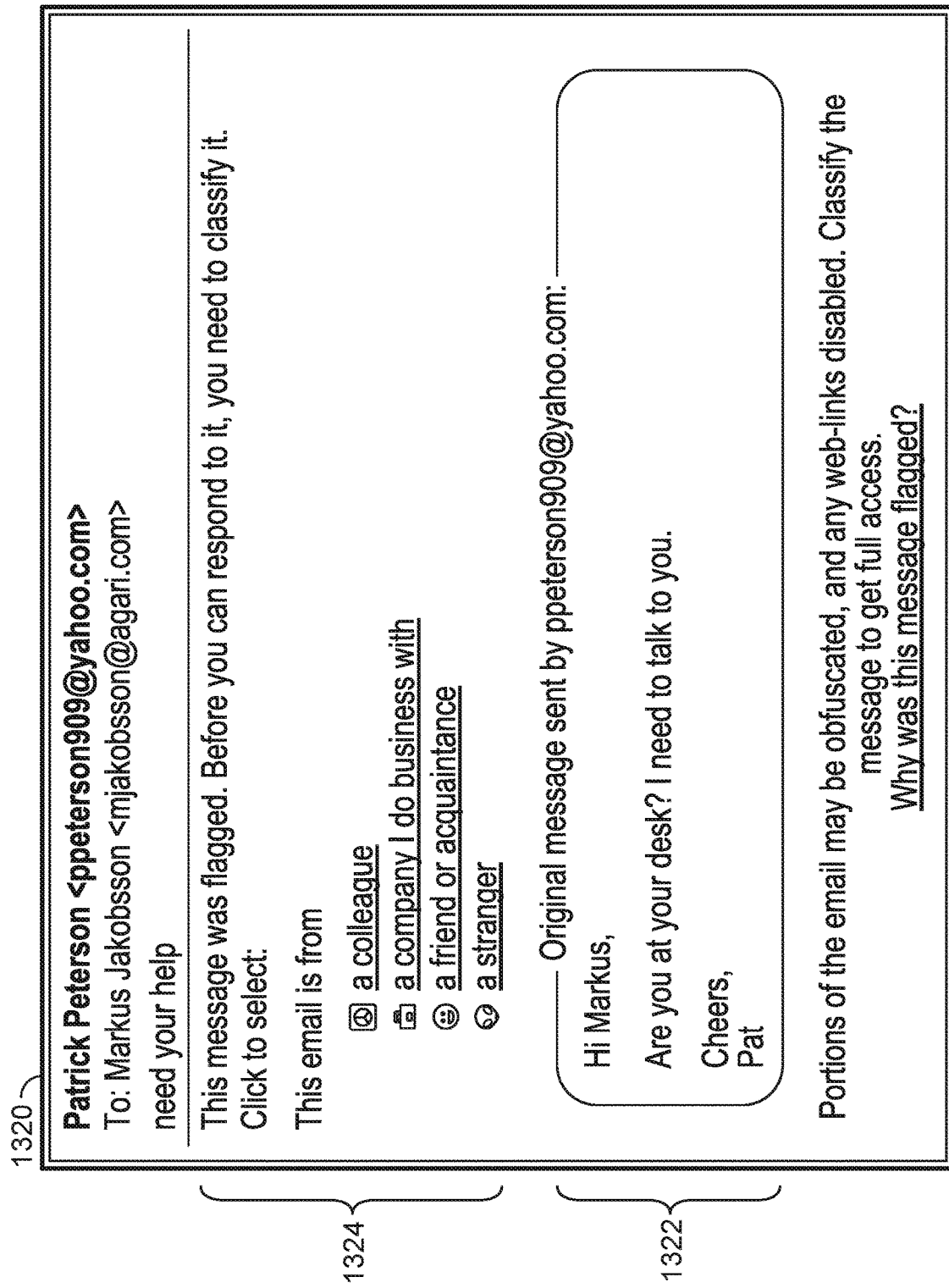
FIG. 13B shows an example of a modified message requesting manual classification of the sender of the message.

FIG. 13B shows an example of a modified message requesting manual classification of the sender of the message. Message 1320 includes contents of the original message 1322 as well as added selected choices 1324 that requests the recipient to classify the sender of the message.

Returning to FIG. 13A, at 1308, based on the response to the manual classification request, a security action is performed, if applicable. In some embodiments, if the manual classification response does not match the automatically determined classification, a security action is performed to warn the recipient about the mismatch and/or prevent the user from fully accessing or replying to the message. For example, the message may be deleted and replaced with a version of the message that has been modified (e.g., subject, sender display name, sender address, reply to address, and/or content of the message removed or modified with a warning indicator). In another example, the message may be deleted and quarantined for additional review by the recipient and/or an administrator. In some embodiments, in the event the sender of the message was correctly classified manually by the recipient and the automatic classification was incorrect, an opportunity is provided to add the sender of the message to the list of trusted contacts for the recipient and/or add an identifier of the sender (e.g., email address and display name) to an existing contact (e.g., as a secondary email address) in the list of trusted contacts. The sender may be added to the list of trusted contacts by the recipient, an administrator, or by the sender (e.g., by requiring the user to prove access to an account of an existing trusted contact).

Figure 14A:
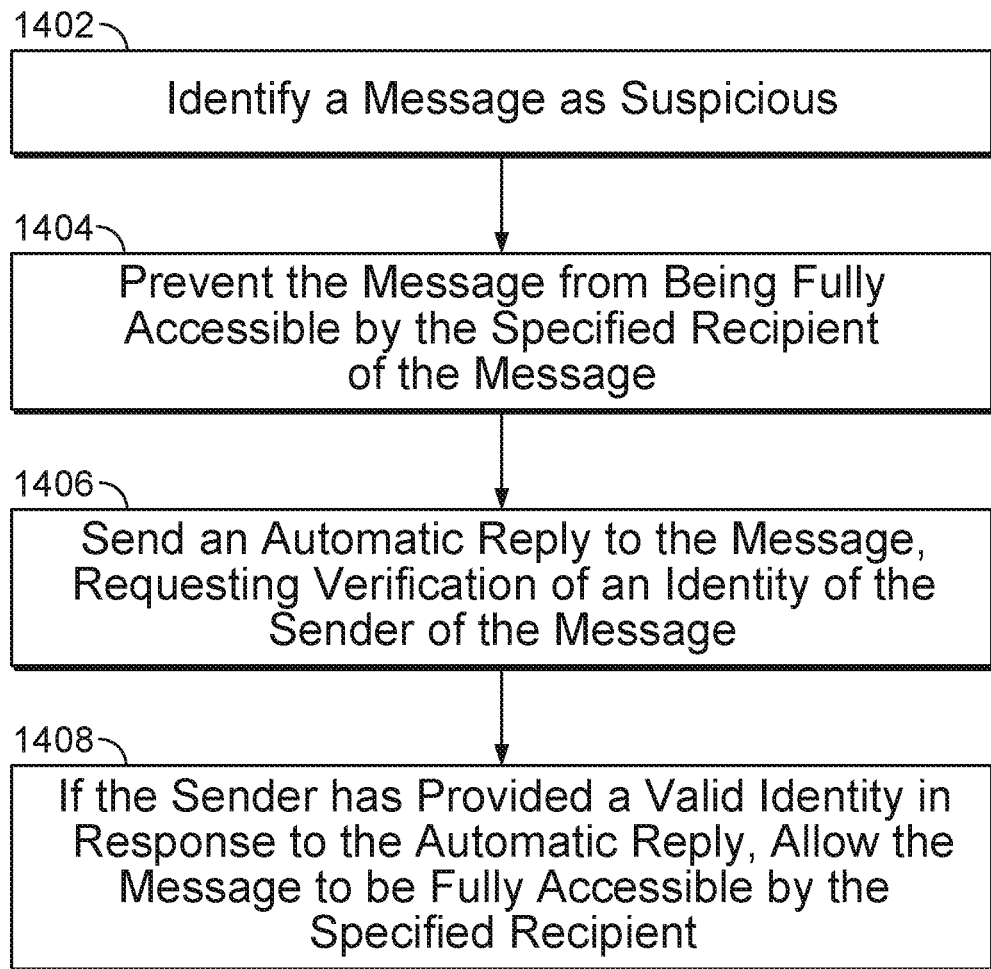
FIG. 14A is a flowchart illustrating an embodiment of a process for requiring a sender of a message to verify an identity of the sender.

FIG. 14A is a flowchart illustrating an embodiment of a process for requiring a sender of a message to verify an identity of the sender. The process of FIG. 14A may be at least in part implemented on analysis server 102, gateway 110, and/or message server 106 of FIG. 1. In some embodiments, at least a portion of the process of FIG. 14A is performed in filtering the message in 1006 and/or 1010 of FIG. 10. In some embodiments, at least a portion of the process of FIG. 14A is performed in one or more steps of the process of FIG. 12. For example, at least a portion of the process of FIG. 14A is performed in performing the first and/or second risk analysis of the process of FIG. 12. At least a portion of the process of FIG. 14A may be performed in one or more steps of the processes of FIG. 2 and/or FIG. 3. For example, it is performed as a security action in 212 of FIG. 2.

At 1402, a message is identified as suspicious. For example, it is identified in 1008 that a sender of the message is similar to a trusted contact based on a measure of similarity of a sender of the contact with a trusted contact of a particular identified recipient of the message. An example of a trusted contact is a contact that has been previously identified by the recipient (e.g., included in an address book of the recipient) or is a contact with whom the recipient has had at least a minimum amount of positive engagement (e.g., having exchanged emails at least twice, and at least two weeks apart) without a recent "negative engagement" (e.g., recipient has not recently marked a message from the contact as spam). In some embodiments, the message is identified as suspicious if a sender of the message has not previously sent a message to a recipient identified in the message. In some embodiments, the message is identified as suspicious if a recipient identified in the message has not previously sent a message to the sender of the message. In some embodiments, the message is identified as suspicious if a spam detector, a virus detector, and/or a malware detector has detected that the message includes a spam, virus, or malware.

At 1404, the message is prevented from being fully accessible by the specified recipient of the message. For example, at least a portion of the message is modified or removed. In another example, the message is quarantined and not delivered to the recipient.

At 1406, an automatic reply to the message is sent requesting verification of an identity of the sender of the message.

This verification attempt may be utilized to identify good emails from accounts that are not trusted, but which are nevertheless associated with trusted persons. For example, if one executive's name is John Adams, and another executive receives an email from a John Adams—but not the same account as to which she has a trust relationship—then this is a potentially deceptive email—but also an email that is potentially from another account (such as the personal account) of the trusted person. The reply message includes the message "Your email triggered an alert. Have you sent emails to the recipient using another email address? If so, please click here. Otherwise, click here." The first hyperlink (associated with the first occurrence of "here") would lead to a website where the visitor enters his or her "other" email address (e.g., trusted contact address), and a verification email is sent to that address. That verification email contains a challenge value, such as a secret string of alphanumeric characters, that the recipient has to copy and paste into the site where the email address was entered. The second hyperlink takes the user to a site where he or she is offered to solve a CAPTCHA, associate a phone number (e.g., by sending an SMS challenge value to the phone number), or perform another action that attackers are typically unwilling to perform.

FIG. 14B shows an example of an automatic reply message requesting verification of an identity of the sender of the message. Message 1420 informs the user that the sender's message has been quarantined and will not be delivered unless identity of the sender is established. Message 1420 instructs the sender to forward the automatic reply message to a second message account (e.g., account of trusted contact) that the sender has previously used to communicate with the recipient and using the second account, forward again the forwarded message to a verification system for verification of the possession of the second account.

Returning to FIG. 14A, the automatic reply to the message may be utilized to detect spoofing attempts. For example, the automatic reply is sent to a system of the sender to request verification that the sender identified in the message actually sent the message. For example, at least two installations of message security systems, where a first installation is associated with a first entity and a second installation is associated with a second entity, the second system identifies receipt of an email originating with a sender associated with the first system. The second system then sends an inquiry to the first system, where the inquiry contains information related to the email. The first system determines whether the email associated with the inquiry was sent from the indicated apparent sender, and generates a response to the second system. If the second system receives a negative response, then the email is not delivered to the intended recipient, or if it has already been delivered, then it is either removed from the inbox or a notification is sent to the recipient, warning the recipient of the email. In addition, a notification may be sent to an administrator associated with the second system. In some embodiments, a notification is also sent to an admin associated with the first system. If, on the other hand, the response to the inquiry is a positive response, then the email is delivered to the recipient. If an email has more than one recipient within the second system, then it is delivered to each such recipient. Here, the first and second systems may access emails in different ways. For example, the first system may correspond to an outbound collector of emails and the second system to an OAUTH access of one or more email boxes. The first system may also be an appliance controlling or relaying emails, or be an OAUTH-enabled method to access the various mailboxes (including the sent folder) of one or more users. In some embodiments, all communications between the two security systems are encrypted and authenticated.

At 1408, if the sender has provided a valid identity in response to the automatic reply in 1406, the message is allowed to be fully accessible by the specified recipient. For example, if the user has provided an established position of an alternate trusted account that can be trusted (e.g., account of trusted contact) or has otherwise provided or proved an identity of the sender, the message is allowed to be fully accessible. Making the message fully accessible may include allowing the message to be delivered and accessed by the recipient with all of its original content. This may also cause the sender (e.g., sender email address) to be whitelisted or associated with an increased trust value (e.g., add to trusted contacts). In some embodiments, the provided full access message includes a warning, bringing to the attention of the recipient that this is an email from a potential stranger.

If the sender does not provide a valid identity in response to the automatic reply in 906, the message may remain unable to be fully accessible by the specified recipient of the message. In some embodiments, the message is indicated to an administrator and/or deleted.

In some embodiments, if the reply to the address of the message is identified or unknown to be unattended (e.g., not monitored by a recipient user), the message is provided to the recipient in a modified form and/or with a warning.

Figure 15:
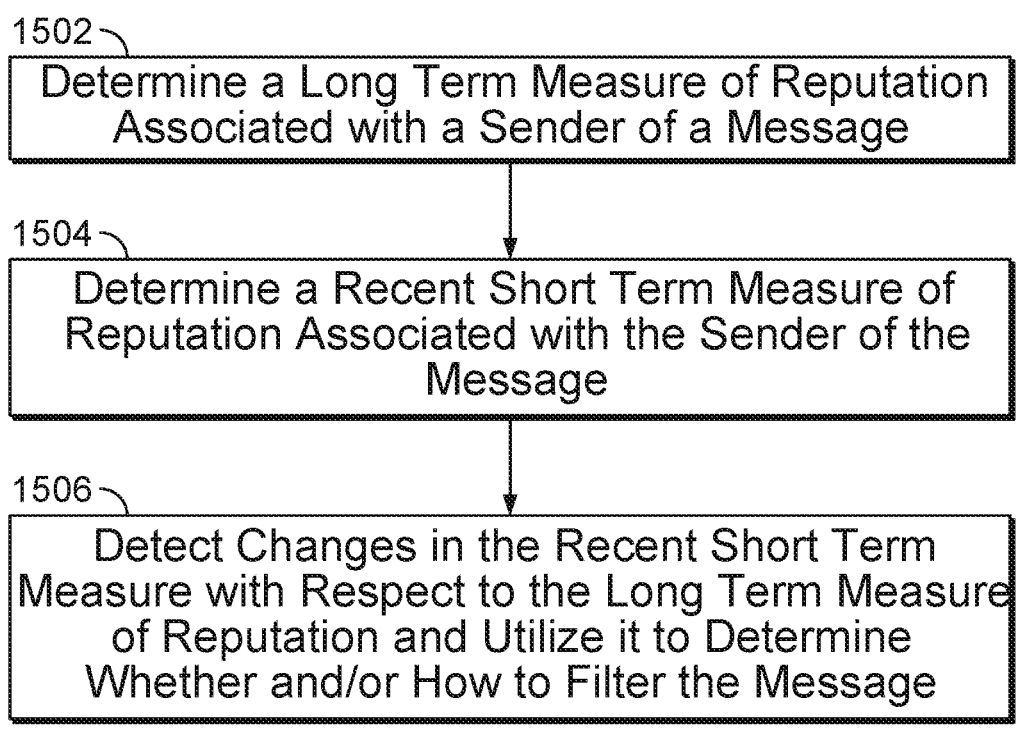
FIG. 15 is a flowchart illustrating an embodiment of a process for determining a change in historical reputation of a sender of a message.

FIG. 15 is a flowchart illustrating an embodiment of a process for determining a change in historical reputation of a sender of a message. The process of FIG. 15 may be at least in part implemented on analysis server 102, gateway 110, and/or message server 106 of FIG. 1. In some embodiments, at least a portion of the process of FIG. 15 is performed in filtering the message in 1006 and/or 1010 of FIG. 10. In some embodiments, at least a portion of the process of FIG. 15 is performed in one or more steps of the process of FIG. 12. For example, at least a portion of the process of FIG. 15 is performed in performing the first and/or second risk analysis of the process of FIG. 12. At least a portion of the process of FIG. 15 may be performed in one or more steps of the process of FIG. 2.

At 1502, a long term measure of reputation associated with a sender of a message is determined. The long term measure of reputation may be for a specific address and/or domain of the sender. For example, long term measure of reputation is determined based on the amount of historical message traffic between the sender (or network domain of the sender) and the recipient (or network domain of recipient). Large amounts of traffic may correspond to a high long term measure of reputation, unless there is a sufficient portion of the traffic that is flagged as undesirable (e.g., being spam, including virus/malware, etc.). Additionally, a long time period of traffic may correspond to a high long term measure of reputation, unless a sufficient portion is flagged as being undesirable. To the extent that it is available, a large open rate (e.g., the recipient opened the message) or a high response rate (e.g., whether replying to message or selecting links in message) also may correspond to a high long term measure of reputation, unless a sufficient portion is flagged as being undesirable. An example of a "sufficient" portion may mean that a fixed portion of the traffic, such as 2%. The long term measure of reputation may capture historical message traffic within several recent months. In some embodiments, when determining a long term measure of reputation for a domain, individual long term measures of reputation for accounts of the domain may be aggregated to determine the long term measure of reputation for the domain.

At 1504, a recent short term measure of reputation associated with the sender of the message is determined. The recent short term measure of reputation may be for a specific address and/or domain of the sender. The recent short term measure of reputation is determined using the same/similar factors as the long term measure of reputation but within a smaller time window. For example, the recent short term measure of reputation may capture historical message traffic within a day.

The recent short term measure of reputation may be low if a large portion (e.g., 5% of traffic within the time window) of message traffic between the sender (or network domain of the sender) and the recipient (or network domain of recipient) is associated with complaints, spam detection, the detection of unwanted URLs, or unwanted attachments. An unwanted URL/attachment is one that is judged likely to be associated with risk, e.g., using a blacklist or an anti-virus scan. Complaints may correspond to users reporting an email as spam or phish, or placing it in a spam folder. Complaints can either be local (only a very small number of users, such as less than 1% of recipients, report the message) or pervasive (a greater portion of users report the email, e.g., more than 1%).

At 1506, changes in the recent short term measure with respect to the long term measure of reputation are detected and utilized to determine whether and/or how to filter the message. For example, if the sender is associated with a low (bad) long term measure of reputation (e.g., below a threshold) and a low (bad) recent short term measure (e.g., below another threshold), the message from the sender is identified as suspicious and filtered (e.g., blocked and/or modified with a warning). In some embodiments, if the sender is associated with a high (good) long term measure of reputation (e.g., above a first threshold) but low (bad) recent short term measure (e.g., below a second threshold), the message from the sender is identified as likely taken over by a malicious attacker. For example, the message may be filtered (e.g., blocked and/or modified with a warning), may require manual review by an administrator, or require an action by the sender (e.g., require sender to respond to a challenge) prior allowing delivery of the message (e.g., modified message with warning).

In some embodiments, let Ri be a reputation associated with a receiver, and for concreteness, assume that this corresponds to a numeric value between 0 and 1, inclusive. Let Bi be a recent short term measure of reputation associated with an email E received by the same recipient. For concreteness, this is also a value between 0 and 1, inclusive. Here, i is a number corresponding to the recipient. Further, let G be the long term measure of reputation associated with the email E, and may be a number between 0 and 100, for example. The value SUM(Bi*Ri)/G is computed, where SUM corresponds to adding the entries associated with all recipients of E. If SUM(Bi*Ri)/G>t1, where t1 is a first threshold, then a first action is taken. This action may be to block emails from the sender of E, remove E from the inbox of all recipients, and determine whether any of the users who appear to have opened E have had their computers corrupted or credentials stolen. This can be determined by asking the user, by scanning the user's machine, or by reviewing logs of incoming/outgoing traffic to the user's machine, where this review is preferably automated. Further, the action may involve increasing Ri by 10% for each user who filed a response Bi indicative of a threat. If SUM(Bi*Ri)/G<t2, where t2<t1 then the reputation Ri of each user who filed a response Bi indicative of a threat is decreased, e.g., by 5%. If the number of users filing a response Bi is indicative of a threat within a time T of receipt of the email E, then the email is considered to be associated with pervasive badness, otherwise local badness.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for electronic message security risk analysis, comprising:
    determining a measure of influence of a sender entity for a message receiving entity based at least in part on an analysis of previous electronic messages sent by the sender entity;
    receiving an electronic message associated with the sender entity;
    utilizing the measure of influence of the sender entity to determine using a processor a security risk associated with the received electronic message, wherein the measure of influence is based at least in part on a relative level difference of organizational reporting relationship roles between the specific message receiving entity of the message and the specific sender entity according to an organizational reporting hierarchy, wherein utilizing the measure of influence of the sender entity to determine the security risk includes attributing an additional increase to the security risk of the received electronic message in response to an indication of the determined measure of influence exceeding a threshold; and
    in response to attributing the additional increased risk to the received electronic message due to the measure of influence, triggering a security action based on the additional increased risk.

2. The method of claim 1, wherein the measure of influence is based at least in part on a role of the sender entity within an organization.

3. The method of claim 1, wherein the measure of influence is based at least in part on a role of the message receiving entity within an organization.

4. The method of claim 1, wherein the measure of influence is based at least in part on a number of electronic messages included in a volume of the previous electronic messages sent by the sender entity to the message receiving entity within a specified period of time.

5. The method of claim 1, wherein the measure of influence is based at least in part on a number of different message recipients in a volume of the previous electronic messages sent by the sender entity.

6. The method of claim 1, wherein the measure of influence is based at least in part on one or more identified keywords in the previous electronic messages sent by the sender entity to the message receiving entity.

7. The method of claim 1, wherein the message receiving entity includes a plurality of individual recipients belonging to a common organization.

8. The method of claim 1, wherein the message receiving entity is an individual message recipient, the measure of influence quantifies a determined influence of the sender entity on the individual message recipient, the measure of influence is one of a plurality of measures of influence of the sender entity, and each of the plurality of measures of influence of the sender entity corresponds to a different individual message recipient.

9. The method of claim 1, wherein the measure of influence is based at least in part on a user provided specification of a relationship between the sender entity and the message receiving entity.

10. The method of claim 1, wherein determining the security risk associated with the received electronic message includes scaling an impersonation risk score based on the measure of influence, and the impersonation risk score is determined including by determining whether the electronic message appears as having been sent from the sender entity but is actually sent from a source not trusted to be associated with the sender entity.

11. The method of claim 10, wherein the electronic message appears as having been sent from the sender entity due to a similarity between a sender display name identified in the electronic message and a known display name of the sender entity.

12. The method of claim 10, wherein the electronic message is identified as having been sent from the source not trusted to be associated with the sender entity including by determining that a sender email address identified in the electronic message is not known to be associated with the sender entity.

13. The method of claim 1, wherein determining the security risk associated with the received electronic message includes determining whether the electronic message was sent from a message account belonging to a list of message accounts trusted to be associated with the sender entity.

14. The method of claim 13, wherein the list of message accounts trusted to be associated with the sender entity is at least in part identified by a user.

15. The method of claim 13, wherein the list of message accounts trusted to be associated with the sender entity is at least in part automatically identified based on the previous electronic messages sent by the sender entity.

16. The method of claim 13, wherein the list of message accounts trusted to be associated with the sender entity is at least in part automatically identified based on an identification of a service identified as being utilized by the sender entity and known to send electronic messages on behalf of the sender entity.

17. The method of claim 1, wherein determining the security risk includes determining a plurality of risk component scores and combining the plurality of risk component scores to determine an overall risk score of the security risk and at least one of the plurality of risk component scores is based at least in part on the measure of influence.

18. The method of claim 1, wherein the measure of influence is further based on a numerical magnitude value quantifying a magnitude of the specific relationship role based at least in part on the organizational reporting relationship between the specific message receiving entity of the message and the specific sender entity according to the organizational reporting hierarchy, wherein the measure of influence meeting the certain criteria comprises the numerical magnitude value exceeding a threshold associated with the organizational reporting hierarchy.

19. A system for electronic message security risk analysis, comprising:
a hardware processor; and a
memory coupled with the hardware processor, wherein the memory is configured to provide the hardware processor with instructions which, when executed, cause the hardware processor to:
determine a measure of influence of a sender entity for a message receiving entity based at least in part on an analysis of previous electronic messages sent by the sender entity;
receive an electronic message associated with the sender entity;
utilize the measure of influence of the sender entity to determine using a processor a security risk associated with the received electronic message, wherein the measure of influence is based at least in part on a relative level difference of organizational reporting relationship roles between the specific message receiving entity of the message and the specific sender entity according to an organizational reporting hierarchy, wherein utilizing the measure of influence of the sender entity to determine the security risk includes attributing an additional increase to the security risk of the received electronic message in response to an indication of the determined measure of influence exceeding a threshold; and
in response to attributing the additional increased risk to the received electronic message due to the measure of influence, trigger a security action based on the additional increased risk.

20. A computer program product, the computer program product being embodied in a non-transitory computer readable storage medium for electronic message security risk analysis and comprising computer instructions for:
determining a measure of influence of a sender entity for a message receiving entity based at least in part on an analysis of previous electronic messages sent by the sender entity;
receiving an electronic message associated with the sender entity;
utilizing the measure of influence of the sender entity to determine using a processor a security risk associated with the received electronic message, wherein the measure of influence is based at least in part on a relative level difference of organizational reporting relationship roles between the specific message receiving entity of the message and the specific sender entity according to an organizational reporting hierarchy, wherein utilizing the measure of influence of the sender entity to determine the security risk includes attributing an additional increase to the security risk of the received electronic message in response to an indication of the determined measure of influence exceeding a threshold; and
in response to attributing the additional increased risk to the received electronic message due to the measure of influence, triggering a security action based on the additional increased risk.

* * * * *